United States Patent [19]

Ogawa et al.

[11] Patent Number: 5,483,935
[45] Date of Patent: Jan. 16, 1996

[54] CONTROL SYSTEM FOR INTERNAL COMBUSTION ENGINES

[75] Inventors: Ken Ogawa; Yoshikazu Oshima; Yasunori Ehara; Kei Machida; Atsushi Kato, all of Wako, Japan

[73] Assignee: Honda Giken Kogyo Kabushiki Kaisha, Tokyo, Japan

[21] Appl. No.: 388,836

[22] Filed: Feb. 15, 1995

Related U.S. Application Data

[62] Division of Ser. No. 122,190, Sep. 17, 1993, Pat. No. 5,426,938.

[30] Foreign Application Priority Data

| Sep. 18, 1992 | [JP] | Japan | 4-275401 |
| Sep. 18, 1992 | [JP] | Japan | 4-275402 |
| Sep. 18, 1992 | [JP] | Japan | 4-275403 |
| Sep. 18, 1992 | [JP] | Japan | 4-275404 |

[51] Int. Cl.⁶ .................................................. F02D 43/04
[52] U.S. Cl. .................................................. 123/421; 123/684
[58] Field of Search .................................. 123/680–684, 123/417, 416, 421

[56] References Cited

U.S. PATENT DOCUMENTS

| 4,512,317 | 4/1985 | Pauwels et al. | 123/478 |
| 4,537,172 | 8/1985 | Kanehara et al. | 123/527 |
| 4,677,956 | 7/1987 | Hamburg | 123/520 |
| 4,886,026 | 12/1989 | Cook | 123/520 |
| 4,986,070 | 1/1991 | Abe | 60/285 |
| 5,143,040 | 9/1992 | Okawa et al. | 123/684 |
| 5,215,061 | 6/1993 | Ogawa et al. | 123/478 |
| 5,363,832 | 11/1994 | Suzumura et al. | 123/478 |

FOREIGN PATENT DOCUMENTS

| 0415590A1 | 3/1991 | European Pat. Off. . |
| 2-245441 | 10/1990 | Japan . |
| 3-59255 | 9/1991 | Japan . |

OTHER PUBLICATIONS

Patent Abstracts of Japan, Unexamined Applications, M. Field, vol. 14, No. 570, Dec. 18, 1990, The Patent Office Japanese Government, p. 158, M 1060, 2–245 442 (Hitachi).

*Primary Examiner*—Andrew M. Dolinar
*Attorney, Agent, or Firm*—Nikaido, Marmelstein, Murray & Oram

[57] ABSTRACT

A control system according to one aspect calculates a ratio of an actual amount of fuel supplied to the combustion chamber to the desired amount of fuel to be supplied to the combustion chamber, by taking into account at least an amount of evaporative fuel supplied to the combustion chamber, and sets the rate of change of the air-fuel ratio correction coefficient based on this ratio of the actual amount to the desired amount. A control system according to another aspect of the invention calculates an injected fuel ratio of an amount of fuel injected to an amount of total fuel to be supplied to the combustion chamber, and controls the ignition timing based on the injected fuel ratio and depending on operating conditions of the engine.

7 Claims, 35 Drawing Sheets

VHW0 DETERMINATION

- VHW0REF=CREF/65536×VHW +(65536−CREF)/65536×VHW0REF(n−1) (S41)
  - (IF:VHW0REF>VHW0HL) (S42)
    - [THEN]
      - VHW0=VHW0HL (S43)
    - [ELSE]
      - (IF:VHW0REF<VHW0LL) (S44)
        - [THEN]
          - VHW0=VHW0LL (S45)
        - [ELSE]
          - VHW0=VHW0REF (S46)
- →RETURN

FIG.9

QVAPER DETERMINATION

- READ INFORMATION ON VARIOUS ENGINE OPERATING PARAMETERS (S51)
- LPACT=LPLIFT−LP0 (S52)
- VHACT=VHW−VHW0 (S53)
- DETERMINE QBEM BY QBE MAP (S54)
- DETERMINE QHW BY QHW TABLE (S55)
- DETERMINE KTP BY KTP TABLE (S56)
- DETERMINE KPAP BY KPAP TABLE (S57)
- QBE=QBEM×KTP×KPAP (S58)
- KQ=QHW/QBE (S59)
- DETERMINE CBU BY CBU TABLE (S60)
- QHWD=QHW×ME (S61)
- →RETURN

FIG.10

|  | LPACT00 | ········ | LPACT15 |
|---|---|---|---|
| PBG00 | QBEM(00,00) | ········ | QBEM(00,15) |
| ⋮ | ⋮ | | ⋮ |
| PBG15 | QBEM(15,00) | ········ | QBEM(15,15) |

FIG.16

|  | ME0 | ············ | ME7 |
|---|---|---|---|
| PBA0 | $\tau p(0,0)$ | ············ | $\tau p(0,7)$ |
| ⋮ | ⋮ | | ⋮ |
| PBA7 | $\tau p(7,0)$ | ············ | $\tau p(7,7)$ |

FIG.17

| | ME0 | ............ | ME7 |
|---|---|---|---|
| PBA0 | Ba(0,0) | ............ | Ba(0,7) |
| ⋮ | ⋮ | | ⋮ |
| PBA7 | Ba(7,0) | ............ | Ba(7,7) |

FIG.18

| | ME0 | ............ | ME7 |
|---|---|---|---|
| PBA0 | Bb(0,0) | ............ | Bb(0,7) |
| ⋮ | ⋮ | | ⋮ |
| PBA7 | Bb(7,0) | ............ | Bb(7,7) |

TREQ DETERMINATION

- (IF:PGIN<PGINLM) (S91)
  - [THEN]
    - (FOR:k=1 TO 4 STEP 1)
      - TREQ(k)=Ti×KTOTAL(k) (S92)
  - [ELSE]
    - GAIRT=($\alpha$×Ti+$\beta$)×AFG×KTA (S93)
    - (FOR:k=1 TO 4 STEP 1)
      - GAIRB=MAIR×PGIN×(1/MBUT)+PGIN×AFB×(1/KTOTAL(k)) (S94)
      - GAIRG=GAIRT−GAIRB (S95)
      - TREQ(k)=(GAIRG×KTOTAL(k)×(1/AFG)−$\beta$)×(1/$\alpha$) (S96)
- →RETURN

FIG.20

VPR DETERMINATION

— DETERMINE KPUM BY KPU MAP (S101)

— DETERMINE KPUTW BY KPUTW TABLE (S102)

— DETERMINE KPUAST BY KPUAST TABLE (S103)

— DETERMINE KPUTC BY KPUTC TABLE (S104)

— KPUN=KPUM×KPUTW×KPUAST×KPUTC (S105)

◇ (IF:Ti×KTOTAL(1)×KPUN<Be×TWP(1)+Ae×TiLIM) (S106)
[THEN]
KPUN=(Be×TWP(1)+Ae×TiLIM)/(Ti×KTOTAL(1)) (S107)

◇ (IF:KPUN=1) (S108)

[THEN]

— QBUCMD=0 (S109)

[ELSE]

— QBUCMD=((Ti×α+β)×KTOTAL(1)×(1−KPUN))×(AFG/AGB)×(1/ME)×(1/DBU) (S110)

— DETERMINE VHCMD BY VHCMD TABLE (S111)

— →RETURN

FIG.21

| | ME00 | ........ | ME19 |
|---|---|---|---|
| PBA00 | KPUM(00,00) | ........ | KPUM(00,19) |
| ⋮ | ⋮ | | ⋮ |
| PBA16 | KPUM(16,00) | ........ | KPUM(16,19) |

FIG.28

| | QPUCMD00 | ........ | QPUCMD15 |
|---|---|---|---|
| PBA00 | LPUCMD(00,00) | ........ | LPUCMD(15,00) |
| ⋮ | ⋮ | | ⋮ |
| PBA15 | LPUCMD(00,15) | ........ | LPUCMD(15,15) |

FIG.30

LPARA DETERMINATION

— DETERMINE A BY A MAP (S151)

— DETERMINE B BY B MAP (S152)

— DETERMINE KA BY KA TABLE (S153)

— DETERMINE KB BY KB TABLE (S154)

◇ (IF:FEGR=1) (S155)

[THEN]

— DETERMINE KEA BY KEA MAP (S156)

— DETERMINE KEB BY KEB MAP (S157)

[ELSE]

— KEA=1.0 (S158)

— KEB=1.0 (S159)

◇ (IF:FBCAL=0) (S160)

[THEN]

— KPUG=(TREQ(1)/(Ti×KTOTAL(1))) (S161)

— DETERMINE KVA BY KVA TABLE (S162)

— DETERMINE KVB BY KVB TABLE (S163)

[ELSE]

— KVA=1.0 (S164)

— KVB=1.0 (S165)

— Ae=A×KA×KEA×KVA (S166)

— Be=B×KB×KEB×KVB (S167)

— →RETURN

FIG.31

| | TW0 | . . . . . . . . . . . . . . | TW6 |
|---|---|---|---|
| PBA0 | A(0,0) | . . . . . . . . . . . . . . | A(0,6) |
| ⋮ | ⋮ | | ⋮ |
| PBA6 | A(6,0) | . . . . . . . . . . . . . . | A(6,6) |

FIG.32

| | TW0 | . . . . . . . . . . . . . . | TW6 |
|---|---|---|---|
| PBA0 | B(0,0) | . . . . . . . . . . . . . . | B(0,6) |
| ⋮ | ⋮ | | ⋮ |
| PBA6 | B(6,0) | . . . . . . . . . . . . . . | B(6,6) |

FIG.35

|        | KEGR0    | ............ | KEGR4    |
|--------|----------|--------------|----------|
| PBA0   | KEA(0,0) | ............ | KEA(0,4) |
| ⋮      | ⋮        |              | ⋮        |
| PBA6   | KEA(6,0) | ............ | KEA(6,4) |

FIG.36

|        | KEGR0    | ............ | KEGR4    |
|--------|----------|--------------|----------|
| PBA0   | KEB(0,0) | ............ | KEB(0,4) |
| ⋮      | ⋮        |              | ⋮        |
| PBA6   | KEB(6,0) | ............ | KEB(6,4) |

FIG.41

KLAF DETERMINATION

- $\Delta KAF = KCMD(n-1) - KACT(n)$  (S211)
- ◇ (IF:IN LAST LOOP,FLAFFB=0)  (S212)
  [THEN]
  - $\Delta KAF(n) = \Delta KAF(n-1)$  (S213)
  - NITDC=0  (S214)
- ◇ (IF:NITDC=0)  (S215)
  [THEN]
  - GOSUB "GAIN COEFFICIENT DETERMINATION" (S216)
  - $KLAFP(n) = \Delta KAF(n) \times KP$  (S217)
  - $KLAFI(n) = \Delta KAF(n) \times KI + KLAF(n-1)$  (S218)
  - $KLAFD(n) = (\Delta KAF(n) - KAF(n-1)) \times KD$  (S219)
  - PERFORM LIMIT CHECK OF KLAFI  (S220)
  - $KLAF = KLAFP + KLAFI + KLAFD$  (S221)
  - NITDC=NI  (S222)
  - $\Delta KAF(n) = \Delta KAF(n-1)$  (S223)
  - PERFORM LIMIT CHECK OF KLAF  (S224)
  [ELSE]
  - NITDC=NITDC−1  (S225)
  - $KLAFP(n) = KLAFP(n-1)$  (S226)
  - $KLAFI(n) = KLAFI(n-1)$  (S227)
  - $KLAFD(n) = KLAFD(n-1)$  (S228)
  - $KLAF(n) = KLAF(n-1)$  (S229)
  - $\Delta KAK(n) = \Delta KAF(n-1)$  (S230)
- →RETURN

GAIN COEFFICIENT DETERMINATION
- (IF:FIDL=0) (S231)

[THEN]
- Aeg=(1−KPUG)+Ae×KPUG (S232)
- DETERMINE KP,KI,KD,NI BY Aeg−Me MAP (S233)

[THEN]
- KP=KPI (S234)
- KI=KII (S235)
- KD=KDI (S236)
- NI=NII (S237)

→RETURN

FIG.43

|  | Aeg0 | Aeg1 | Aeg2 | Aeg3 |
|---|---|---|---|---|
| Me2 | KP (0,2)<br>KI<br>KD<br>NI | (1,2) | (2,2) | (3,2) |
| Me1 | KP (0,1)<br>KI<br>KD<br>NI | (1,1) | (2,1) | (3,1) |
| Me0 | (0,0) | (1,0) | (2,0) | (3,0) |

CONTROL SYSTEM FOR INTERNAL COMBUSTION ENGINES

This is a divisional, of application Ser. No. 08/122,190 filed Sep. 17, 1993, now U.S. Pat. No. 5,426,938.

BACKGROUND OF THE INVENTION

1. Field of the Invention

This invention relates to a control system for internal combustion engines, and more particularly to a control system for an internal combustion engine equipped with an evaporative emission control system for purging (discharging) evaporative fuel generated from a fuel tank into an intake system of the engine to thereby control the emission of evaporative fuel into the air.

2. Prior Art

Conventionally, a control system for an internal combustion engine has been proposed, e.g. by U.S. Pat. No. 4,537,172, filed Oct. 21, 1983 (hereinafter referred to as "the first prior art system"), which comprises a fuel tank, a canister for adsorbing evaporative fuel generated from the fuel tank to temporarily store it therein, a purging passage connecting between the canister and an intake system of the engine, a flowmeter arranged in the purging passage for measuring a flow rate of a purged gas (mixture evaporative fuel and air), and a purge control valve arranged in the purging passage at a location downstream of the flowmeter for controlling the flow rate of purged gas.

According to the first prior art system, evaporative fuel generated from the fuel tank is temporarily stored in the canister, and the stored evaporative fuel is purged into the intake system of the engine as a fuel component for combustion to be burned in a combustion chamber of the engine together with fuel injected by a fuel injection valve. Further, according to this system, the flow rate of purged gas is controlled by means of the purge control valve arranged in the purging passage so as to control the air-fuel ratio of a mixture supplied to the combustion chamber to a desired value, to thereby prevent the emission of noxious components from the engine into the atmosphere.

Further, a control system for an internal combustion engine (hereinafter referred to as "the second prior art system") has already been proposed e.g. by Japanese Provisional Patent Publication (Kokai) No. 2-245441, in which a required amount of fuel for injection is calculated in response to an output from an air-fuel ratio sensor, and then the required amount of fuel is corrected by decreasing it by an amount of evaporative fuel purged per one rotation of the engine, to control the fuel injection amount based on results of this decremental correction.

Since the second prior art system corrects the required amount of fuel for injection by subtracting the amount of purged fuel therefrom, it is possible to prevent, to some extent, the air-fuel ratio of a mixture supplied to the combustion chamber from transiently deviating from a desired value even if the rotational speed of the engine is drastically changed.

Further, a method of controlling the fuel injection amount (hereinafter referred to as "the third prior art system") has already been proposed e.g. by Japanese Patent Publication (Kokoku) No. 3-59255, which comprises the steps of estimating an amount of fuel adhering to an inner wall surface of an intake pipe and an amount of fuel carried off from the adhering fuel through evaporation to be drawn into a combustion chamber, and determining a required fuel injection amount with these estimated amounts taken into account.

According to the third prior art system, the amount of fuel is corrected so as to compensate for the influence by fuel adhering to the inner wall surface of the intake pipe based on the above-mentioned estimated amounts, and the corrected amount of fuel is injected, so that a correct amount of fuel can be constantly supplied to the combustion chamber, which makes it possible to prevent, to some extent, the air-fuel ratio of a mixture supplied to the combustion chamber from being largely deviated from a desired value.

In the first prior art system, however, the flow rate of evaporative fuel contained in the purged gas varies as a function of the amount of fuel stored in the canister. It is difficult to estimate the amount of evaporative fuel stored in the canister, and hence it is impossible to calculate an accurate amount of purged evaporative fuel, so that even if the flow rate of purged gas is controlled by means of the purge control valve, it is impossible to accurately control the flow rate of purged evaporative fuel. Therefore, when the engine is in a transient state, e.g. when the flow rate of purged gas very largely increases or decreases, or when the engine operating condition drastically changes, the amount of evaporative fuel drawn into the combustion chamber cannot be accurately controlled so that it may be undesirably largely deviated from a desired value, which causes the air-fuel ratio of a mixture supplied thereto to deviate from a desired value, leading to degraded exhaust emission characteristics of the engine.

On the other hand, in the first prior art system, the fuel (gasoline) injected from the fuel injection valves is in a liquid state, and part of the injected fuel adheres to the inner wall surface of the intake pipe, depending on a degree of atomization thereof. On the other hand, the evaporative fuel is in a gaseous state, and hence it is directly drawn into the combustion chamber without adhering to the inner wall surface of the intake pipe. When evaporative fuel, which is directly supplied to the combustion chamber, is purged into the intake system in a large amount, the ratio of the injected fuel to the evaporative fuel actually supplied into the combustion chamber deviates from a desired value. That is, since the evaporative fuel, which is gaseous, is more flammable than the injected fuel, which is liquid, the degree of contribution of the evaporative fuel to combustion and the degree of contribution of the injected fuel to combustion largely deviate from respective desired values.

However, in the first prior art system, the air-fuel ratio feedback control is performed by controlling the total amount of injected fuel and evaporative fuel with the two types of fuel regarded as an indivisible component for combustion. Therefore, under such air-fuel ratio control with the two types of fuel regarded as the indivisible component, it is impossible to control the air-fuel ratio of a mixture to a desired value when evaporative fuel is drawn into the combustion chamber in a large amount.

Further, in the first prior art system, the air-fuel ratio feedback control is performed with the amount of evaporative fuel supplied to the combustion chamber taken into consideration. However, if a large amount of evaporative fuel is purged into the intake system, it is difficult to control the air-fuel ratio of a mixture to a desired value with high accuracy, which causes the emission of a large amount of noxious components such as HC into the atmosphere, resulting in degraded exhaust emission characteristics of the engine.

Further, when the engine has not been warmed up and a catalytic converter arranged in the exhaust system of the engine has not been activated, as is the case with the engine immediately after the start thereof, the engine is generally unable to perform good combustion. Therefore, there has been a strong demand for an engine exhibiting improved exhaust emission characteristics even when the engine is started at a low temperature.

In the second prior art system, there is a delay time period before the air-fuel ratio sensor becomes activated through to generate a proper output signal. Therefore, during the delay time period, it is impossible to calculate a required amount of fuel for injection. In short, it is impossible for the second prior art system to calculate an accurate amount of fuel actually required for injection all the time, particularly when the engine is started. Further, the second prior art system system does not contemplate a time lag caused by transport of fuel to the combustion chamber. Therefore, it is impossible to supply just an actually required amount of fuel to the combustion chamber, making it difficult to constantly control the air-fuel ratio to a desired value.

It is known that gasoline, which is injected fuel, and butane, which is a major component of evaporative fuel, have different stoichiometric air-fuel ratios (the stoichiometric air-fuel ratio of gasoline is approximately 14.6, while that of butane is approximately 15.5), so that the optimum ignition timing depends on the ratio (evaporative fuel ratio) of an amount of evaporative fuel to the total amount of fuel supplied to the combustion chamber.

FIG. 1 shows an example of the relationship between the evaporative fuel ratio (butane/(butane+gasoline)) and the optimum ignition timing θIG, provided that evaporative fuel is 100% butane, in which the solid line indicates the optimum ignition timing θIG assumed when the engine coolant temperature is 87° C. and the dot and chain line that assumed when the engine coolant temperature is 33° C.

As is clear from FIG. 1, as the evaporative fuel ratio increases, the optimum ignition timing θIG shifts in a retarding direction, with the shift degree also depending on the engine coolant temperature.

However, in the first and second prior art systems, the ignition timing θIG control is performed without taking the evaporative fuel ratio into consideration at all. Therefore, if the amount of evaporative fuel purged from the canister increases, the ignition timing deviates from the optimum ignition timing θIG in an advancing direction, which causes degraded exhaust emission characteristics and degraded driveability of the engine.

In the third prior art system, although the amount of fuel injected by the fuel injection valves is corrected so as to compensate for the influence by the adhering fuel, dynamic characteristics of the evaporative fuel purged from the canister, such as the time lag caused by transport of fuel to the combustion chamber, are not taken into consideration, making it impossible to constantly and accurately control the air-fuel ratio of a mixture to a desired value.

SUMMARY OF THE INVENTION

It is a first object of the invention to provide a control system for an internal combustion engine, which is capable of constantly controlling the air-fuel ratio of a mixture supplied to the engine to a desired value to thereby achieve further enhanced exhaust emission characteristics of the engine.

It is a second object of the invention provide a control system for an internal combustion engine, which is capable of performing the air-fuel ratio feedback control in a desired manner even if a large amount of evaporative fuel is purged into a intake passage of the engine.

It is a third object of the invention to provide a control system for an internal combustion engine, which is capable of properly controlling the ignition timing to prevent the exhaust emission characteristics and driveability of the engine from being degraded even if a large amount of evaporative fuel is purged into an intake passage of the engine.

It is a fourth object of the invention to provide a control system for an internal combustion engine, which is capable of controlling the emission of noxious components into the atmosphere to the minimum level even when a large amount of evaporative fuel is purged into an intake passage of the engine, or when the engine is in a warming-up condition where the catalytic converter has not been activated.

To attain the first and second objects, according to a first aspect of the invention, there is provided a control system for an internal combustion engine having an intake passage having an inner wall surface, a fuel tank, at least one fuel injection valve, at least one combustion chamber, and an evaporative emission control system, the evaporative emission control system including a canister for adsorbing evaporative fuel generated from the fuel tank, a purging passage connecting between the intake passage and the canister, a flowmeter arranged in the purging passage for generating an output indicative of a flow rate of a gas containing the evaporative fuel and purged through the purging passage into the intake passage, and a purge control valve for controlling the flow rate of the gas.

The control system according to the first aspect of the invention is characterized by comprising:

operating condition-detecting means for detecting operating conditions of the engine including at least the rotational speed of the engine and load on the engine;

purging flow rate-calculating means for calculating a value of the flow rate of the gas based on results of detection by the operating condition-detecting means;

concentration-calculating means for calculating concentration of evaporative fuel contained in the gas based on results of calculation by the purging flow rate-calculating means and the output from the flowmeter;

purged gas volume-calculating means for calculating a volume of the gas purged over a predetermined time period, based on the output from the flowmeter;

purged gas dynamic characteristic-determining means for calculating a parameter indicative of dynamic characteristics of the gas based on results of detection by the operating condition-detecting means;

first evaporative fuel amount-calculating means for calculating a total amount of evaporative fuel purged from the canister into the intake passage during a present cycle of operation of the engine, based on results of calculation by the purged gas dynamic characteristics-calculating means and results of calculation by the concentration-calculating means;

second evaporative fuel amount-calculating means for calculating an amount of evaporative fuel supplied to the combustion chamber of the engine during the present cycle of operation of the engine based on the total amount of evaporative fuel calculated by the first evaporative fuel amount-calculating means and the parameter indicative of the dynamic characteristics of the gas calculated by the purged gas dynamic characteristic-calculating means; and required fuel amount-determining means for determining an amount of fuel to be injected by each of the at least one fuel injection valve based on results of calculation by the second evaporative fuel amount-calculating means.

According to this control system of the first aspect of the invention, an amount of evaporative fuel supplied to the combustion chamber of a cylinder of the engine during the present cycle of operation of the engine is calculated while taking the concentration and dynamic characteristics of purged gas into account, and a required amount of fuel to be injected by the injection valve is determined based on the thus calculated amount of evaporative fuel. Therefore, it is possible to supply a desired amount of fuel corresponding to the flow rate and dynamic characteristics of the purged gas as well as the concentration of evaporative fuel contained therein to the combustion chamber, and hence to control the air-fuel ratio of a mixture supplied to the engine to a desired value even if the flow rate of purged gas may drastically increase or decrease or the operating conditions of the engine may drastically change, enabling the exhaust emission characteristics of the engine to be enhanced.

Preferably, the purged gas dynamic characteristic-calculating means includes delay time-calculating means for calculating a delay time required for the evaporative fuel purged from the canister to reach the combustion chamber after leaving the canister, direct evaporative fuel supply amount-calculating means for estimating an amount of evaporative fuel directly supplied to the combustion chamber, out of an amount of evaporative fuel purged into the intake passage during the present cycle of operation of the engine, and carry-off evaporative fuel supply amount-calculating means for estimating an amount of evaporative fuel carried off from evaporative fuel staying in the purging passage and the intake passage into the combustion chamber during the present cycle of operation of the engine.

More preferably, the direct evaporative fuel supply amount-calculating means and the carry-off evaporative fuel supply amount-calculating means estimate, respectively, the amount of evaporative fuel directly supplied to the combustion and the amount of evaporative fuel carried off from evaporative fuel staying in the purging passage and the intake passage into the combustion chamber, in a manner depending on the delay time calculated by the delay time-calculating means.

Preferably, the control system includes fuel injection amount-calculating means for calculating an amount of fuel to be injected into the intake passage based on results of detection by the operating condition-detecting means, first air amount-calculating means for calculating a first amount of air drawn into the combustion chamber during the present cycle of operation of the engine, based on results of calculation by the fuel injection amount-calculating means, second air amount-calculating means for calculating a second amount of air required for combustion of evaporative fuel supplied to the combustion chamber for the present cycle of operation of the engine, based on results of calculation by the second air amount-calculating means, a predetermined excess air ratio required by the engine, and a stoichiometric air-fuel ratio of the evaporative fuel, and a third air amount-calculating means for calculating a third amount of air by subtracting the second amount of air calculated by the second air amount-calculating means from the first amount of air calculated by the first air amount-calculating means; and the required fuel amount-determining means determines the required amount of fuel to be supplied to the combustion chamber based on results of calculation by the third air amount-calculating means.

According to this preferred embodiment, the required amount of fuel to be supplied to the combustion chamber is calculated based on the third amount of air calculated as above, which makes it possible to calculate the required amount with accuracy.

Preferably, the control system includes injected fuel dynamic characteristic-calculating means for calculating a parameter indicative of dynamic characteristics of fuel injected from the fuel injection valve, and the required fuel amount-determining means includes required fuel amount-correcting means for correcting the required amount of fuel to be supplied to the combustion chamber based on results of calculation by the injected fuel dynamic characteristic-calculating means.

According to this preferred embodiment, the required amount of fuel to be supplied to the combustion chamber is corrected depending on dynamic characteristics of injected fuel. Therefore, it is possible to supply a desired amount of fuel (an amount of injected fuel+an amount of evaporative fuel) to the combustion chamber in a manner suitable for the dynamic characteristics of injected fuel, and hence to eliminate adverse effects of a time lag in fuel supply control caused by transport of fuel, to thereby further improve the exhaust emission characteristics of the engine.

Preferably, the control system includes injected fuel ratio-calculating means for calculating a ratio of injected fuel to a total amount of fuel supplied to the combustion chamber, and the injected fuel dynamic characteristic-calculating means includes first dynamic characteristic-correcting means for correcting the parameter indicative of dynamic characteristics of the injected fuel based on results of calculation by the injected fuel ratio-calculating means.

Preferably, the engine includes an exhaust gas recirculation system for recirculating part of exhaust gases from the engine to the intake passage, and the injected fuel dynamic characteristic-calculating means includes second dynamic characteristic-correcting means for correcting the parameter indicative of dynamic characteristics of the injected fuel based on a rate of recirculation of the exhaust gases by the exhaust gas recirculation system.

According to these preferred embodiments, the parameter indicative of the dynamic characteristics of the injected fuel is corrected based on the ratio of injected fuel to the total amount of fuel to be supplied to the engine and/or the rate of recirculation of exhaust gases to the intake passage, which makes it possible to calculate the desired amount of fuel more accurately.

Preferably, the injected fuel dynamic characteristic-calculating means includes direct fuel supply ratio-calculating means for estimating an amount of injected fuel directly supplied to the combustion chamber, to a total amount of fuel injected from the fuel injection valve during the present cycle of of operation of the engine, and carry-off fuel supply ratio-calculating means for calculating a ratio of an amount of fuel carried off from fuel adhering to the inner wall surface of the intake passage to a total amount of fuel adhering to the inner wall surface of the intake passage during the present cycle of operation of the engine.

According to this preferred embodiment, the dynamic characteristics of injected fuel is reflected on the direct fuel supply ratio and the carry-off fuel supply ratio, whereby it is possible to supply a desired amount of fuel with more accuracy, and hence to further stabilize the air-fuel ratio of a mixture, leading to further enhanced exhaust emission characteristics of the engine.

To attain the first and second objects, according to a second aspect of the engine, there is provided a control system for an internal combustion engine having an intake passage having an inner wall surface, a fuel tank, at least one fuel injection valve, at least one combustion chamber, and an evaporative emission control system, the evaporative emission control system including a canister for adsorbing evaporative fuel generated from the fuel tank, a purging passage connecting between the intake passage and the canister, and a purge control valve for controlling a flow rate of a gas containing the evaporative fuel and purged through the purging passage into the intake passage, wherein the gas containing the evaporative fuel purged from the canister is supplied to the combustion chamber for combustion together with fuel injected by the fuel injection valve.

The control system according to the second aspect of the invention is characterized by comprising:

air-fuel ratio-detecting means for detecting an actual air-fuel ratio of an air-fuel mixture supplied to the engine;

operating condition-detecting means for detecting operating conditions of the engine including at least the rotational speed of the engine and load on the engine;

desired air-fuel ratio-calculating means for calculating a desired air-fuel ratio of the air-fuel mixture to be supplied to the engine based on results of detection by the operating condition-detecting means;

correction coefficient-calculating means for calculating an air-fuel ratio correction coefficient for correcting the desired air-fuel ratio in a feedback manner in response to the actual air-fuel ratio detected by the air-fuel ratio-detecting means;

desired fuel supply amount-calculating means for calculating a desired amount of fuel to be supplied to the combustion chamber based on results of detection by the operating condition-detecting means; and actual fuel ratio-calculating means for calculating a ratio of an actual amount of fuel supplied to the combustion chamber to the desired amount of fuel to be supplied to the combustion chamber, by taking into account at least an amount of the evaporative fuel supplied to the combustion chamber;

the correction coefficient-calculating means including change rate-setting means for setting a rate of change of the air-fuel ratio correction coefficient based on results of calculation of the actual fuel ratio-calculating means.

According to this second aspect of the invention, the ratio (actual fuel ratio) of an actual amount of fuel supplied to the combustion chamber to the desired amount of fuel to be supplied to the combustion chamber is calculated, by taking into account at least an amount of evaporative fuel supplied to the combustion chamber, and the rate of change of the air-fuel ratio correction coefficient is set based on this ratio of the actual amount to the desired amount. Therefore, even if a large amount of evaporative fuel is supplied to the engine, the air-fuel ratio of the mixture can be properly feedback-controlled to the desired air-fuel ratio to thereby avoid degradation of the exhaust emission characteristics of the engine.

Preferably, the control system includes injected fuel ratio-calculating means for calculating a ratio of an amount of fuel injected by the fuel injection valve, to a total amount of fuel supplied to the combustion chamber, carried-off fuel ratio-calculating means for calculating a ratio of an amount of fuel carried off from fuel adhering to the inner wall surface of the intake passage to a total amount of the fuel adhering to the inner wall surface, and the actual fuel ratio-calculating means calculates the actual fuel ratio based on the ratio of the injected fuel and the ratio of the amount of the carried-off fuel.

According to this preferred embodiment, the actual fuel ratio is calculated based on the ratio (injected fuel ratio) of an amount of fuel injected by the injection valve to a total amount of fuel supplied to the combustion chamber and the ratio (carried-off fuel ratio) of an amount of fuel carried off from adhering fuel to a total amount of adhering fuel, and therefore it is possible to calculate the actual fuel ratio more accurately.

Further preferably, the control system includes total fuel amount-calculating means for calculating a total amount of fuel to be supplied to the combustion chamber based on results of detection by the operating condition-detecting means, evaporative fuel amount-calculating means for calculating an amount of evaporative fuel drawn into the combustion chamber, and required fuel amount-determining means for determining an amount of fuel required to be injected by the fuel injection valve, based on results of calculation by the evaporative fuel amount-calculating means, and the injected fuel ratio-calculating means calculates the ratio of injected fuel based on results of calculation by the total fuel amount-calculating means and results of determination by the required final amount-determining means.

According to this preferred embodiment, the injected fuel ratio is calculated based on the total amount of fuel to be supplied to the combustion chamber, which is calculated based on operating conditions of the engine, and the required amount of fuel to injected by the fuel injection valve, which is calculated based on an amount of evaporative fuel drawn into the combustion chamber. Therefore, it is possible to calculate the injected fuel ratio with accuracy, and hence to enhance controllability of the engine.

Further preferably, the evaporative emission control system includes a flowmeter arranged in the purging passage, and wherein the amount of evaporative fuel supplied to the combustion chamber is determined at least based on an output from the flowmeter.

To attain the third object of the invention, according to a third aspect of the invention, there is provided a control system for an internal combustion engine having an intake passage, a fuel tank, at least one fuel injection valve, at least one combustion chamber, and an evaporative emission control system, the evaporative emission control system including a canister for adsorbing evaporative fuel generated from the fuel tank, a purging passage connecting between the intake passage and the canister, and a purge control valve for controlling a flow rate of a gas containing the evaporative fuel and purged into the intake passage.

The control system according to the third aspect of the invention is characterized by comprising:

injected fuel ratio-calculating means for calculating a ratio of an amount of fuel to be injected by the fuel injection valve to a total amount of fuel to be supplied to the combustion chamber;

operating condition-detecting means for detecting operating conditions of the engine including at least an engine coolant temperature; and ignition timing-controlling means for controlling ignition timing of the engine based on results of calculation by the injected fuel ratio-calculating means and results of detection by the operating condition-detecting means.

According to the control system of the third aspect of the invention, the ignition timing is determined based on the ratio of an amount of fuel to be injected to a total amount of fuel to be supplied to the combustion chamber, and operating conditions of the engine including at least the engine coolant temperature. Therefore, it is possible to constantly perform ignition at the optimum timing, and hence avoid degradation of exhaust emission characteristics and drivability of the engine even if a large amount of evaporative fuel is drawn into the combustion chamber.

Preferably, the operating condition-detecting means includes engine speed-detecting means for detecting the rotational speed of the engine, and load-detecting means for detecting load on the engine, and the control system includes total fuel amount-calculating means for calculating a total amount of fuel to be supplied to the combustion chamber, based on results of detection by the operating condition-detecting means, evaporative fuel amount-calculating means for calculating an amount of evaporative fuel drawn into the combustion chamber, and required fuel amount-calculating means for calculating an amount of fuel to be injected by the fuel injection valve, based on results of calculation by the evaporative fuel amount-calculating means, the injected fuel ratio-calculating means calculating the ratio of the amount of fuel to be injected by the fuel injection valve to the total amount of fuel to be supplied to the combustion chamber, based on results of calculation by the total fuel amount-calculating means and results of calculation by the required fuel amount-calculating means.

According to this preferred embodiment, the injected fuel ratio is calculated based on the total amount of fuel to be supplied to the combustion chamber, which is calculated based on operating conditions of the engine, and the required amount of fuel to injected by the fuel injection valve, which is calculated based on an amount of evaporative fuel drawn into the combustion chamber. Therefore, it is possible to perform ignition at the optimum timing with accuracy.

Preferably, the evaporative emission control system includes a flowmeter arranged in the purging passage, the injected fuel ratio-calculating means calculating the ratio of the amount of fuel to be injected by the fuel injection valve to the total amount of fuel to be supplied to the combustion chamber, at least based on an output from the flowmeter.

To attain the fourth object of the invention, according to a fourth aspect of the invention, there is provided a control system for an internal combustion engine having an intake passage, a fuel tank, at least one fuel injection valve, at least one combustion chamber, and an evaporative emission control system, the evaporative emission control system including a canister for adsorbing evaporative fuel generated from the fuel tank, a purging passage connecting between the intake passage and the canister, and a purge control valve for controlling a flow rate of a gas containing the evaporative fuel and purged from the canister into the intake passage.

The control system according to the fourth aspect of the invention is characterized by comprising:

operating condition-detecting means for detecting operating conditions of the engine including at least the rotational speed of the engine and load on the engine;

injected fuel amount-calculating means for calculating an amount of fuel to be injected by the fuel injection valve, based on results of detection by the engine operating condition-detecting means;

ratio-calculating means for calculating a ratio of the amount of fuel to be injected by the fuel injection valve to an amount of fuel to be purged from the canister into the intake passage, based on results of detection by the engine operating condition-detecting means;

purge control means for controlling operation of the purge control valve based on results of calculation by the ratio-calculating means; and injected fuel amount-decreasing means for decreasing the amount of fuel to be injected by the fuel injection valve, based on results of calculation by the ratio-calculating means, the ratio-calculating means including limit-setting means for setting a limit of the ratio corresponding to a lower limit of an amount of fuel which can be injected by the fuel injection valve while maintaining a linear relationship between a time period over which the fuel injection valve is opened and the amount of fuel to be injected by the injection valve.

According to the control system of the fourth aspect of the invention, an amount of fuel to be injected by the injection valve and the ratio of the amount of fuel to be injected to the amount of fuel to be purged from the canister are calculated based on operating conditions of the engine, and based on this ratio, the purge control valve is controlled and at the same time the amount of fuel to be injected is decreased.

By the way, normally, the opening period of the fuel injection valve and the fuel injection amount maintains linear relationship, i.e. one is proportional to the other. However, it is known that if the valve opening period of the fuel injection valve becomes extremely short, the linear relationship cannot be maintained any longer. Therefore, assuming that the linear relationship is no longer maintained, even if the fuel injection amount and the amount of evaporative fuel purged are determined based on the above-mentioned ratio alone, there is a fear that fuel cannot be supplied to the engine in such a ratio of amounts of injected fuel and purged evaporative fuel.

Therefore, in this fourth aspect of the invention, the ratio-calculating means includes limit-setting means for setting the limit of the ratio corresponding to a lower limit of injected fuel, which makes it possible to constantly supply injected fuel and purged evaporative fuel in amounts calculated based on the ratio of the amount of fuel to be injected to the amount of fuel to be purged. Therefore, even if a large amount of evaporative fuel is purged, the air-fuel ratio can be accurately controlled, and hence the emission of noxious components can be effectively controlled.

FIG. 2A to FIG. 2C show exhaust emission characteristics of an engine depicted in relation to a ratio of an amount of butane to a total amount of fuel (gasoline+butane) assuming that the evaporative fuel is mainly composed of butane, the engine rotational speed is 1500 rpm, the engine coolant temperature is 33° C., and the air-fuel ratio of a mixture is set to a stoichiometric air-fuel ratio. In the figures, the abscissa designates the ratio of the amount of butane to the total amount of fuel (gasoline+butane), while the ordinate designates an emission (ppm) of HC for FIG. 2A, an emission (ppm) of NOx for FIG. 2B, and an emission (%) of CO for FIG. 2C. As is clear from FIG. 2A to FIG. 2C, as the ratio of the amount of butane increases, the emission of noxious components HC, NOx and CO decreases, and particularly with HC shown in FIG. 2A, this tendency is markedly noticeable.

Therefore, it is preferred that the engine includes an exhaust passage, and a catalytic converter arranged in the exhaust passage, the operating condition-detecting means including at least warmed-up condition-detecting means for detecting a warmed-up condition of the engine, and activated state-detecting means for detecting an activated state of the catalytic converter, and that the ratio-calculating means includes determining means for determining the ratio of the amount of fuel to be injected by the fuel injection valve to the amount of fuel to be purged from the canister into the intake passage, at least based on results of detection by the warmed-up condition-detecting means and results of detection by the activated state-detecting means.

According to this preferred embodiment, the ratio-calculating means determines the ratio of the amount of fuel to be injected to the amount of fuel to be purged depending on at least results of detection by the warmed-up condition-detecting means and the activated state-detecting means, which makes it possible to increase the ratio of the amount of butane to the total amount of fuel particularly when the engine is started at a low temperature, leading to reduced emission of the noxious components from the engine.

The above and other objects, features and advantages of the invention will become more apparent from the following detailed description taken in conjunction with the accompanying drawings.

BRIEF DESCRIPTION OF THE DRAWINGS

FIG. 9 shows a flowchart of a QVAPER-determining routine;

FIG. 10 shows a QBE map;

FIG. 16 shows a τp map;

FIG. 17 shows a Ba map;

FIG. 18 shows a Bb map;

FIG. 20 shows a flowchart of a VPR-determining routine;

FIG. 21 shows a KPU map;

FIG. 28 shows an LPUCMD map;

FIG. 30 shows a flowchart of an LPARA-determining routine;

FIG. 31 shows an A map;

FIG. 32 shows a B map;

FIG. 35 shows a KEA map;

FIG. 36 shows a KEB table;

FIG. 41 shows a flowchart of a KLAF-determining routine;

FIG. 43 shows an Aeg-PBA map;

DETAILED DESCRIPTION

The invention will now be described in detail with reference to the drawings showing embodiments thereof.

Figure 1:
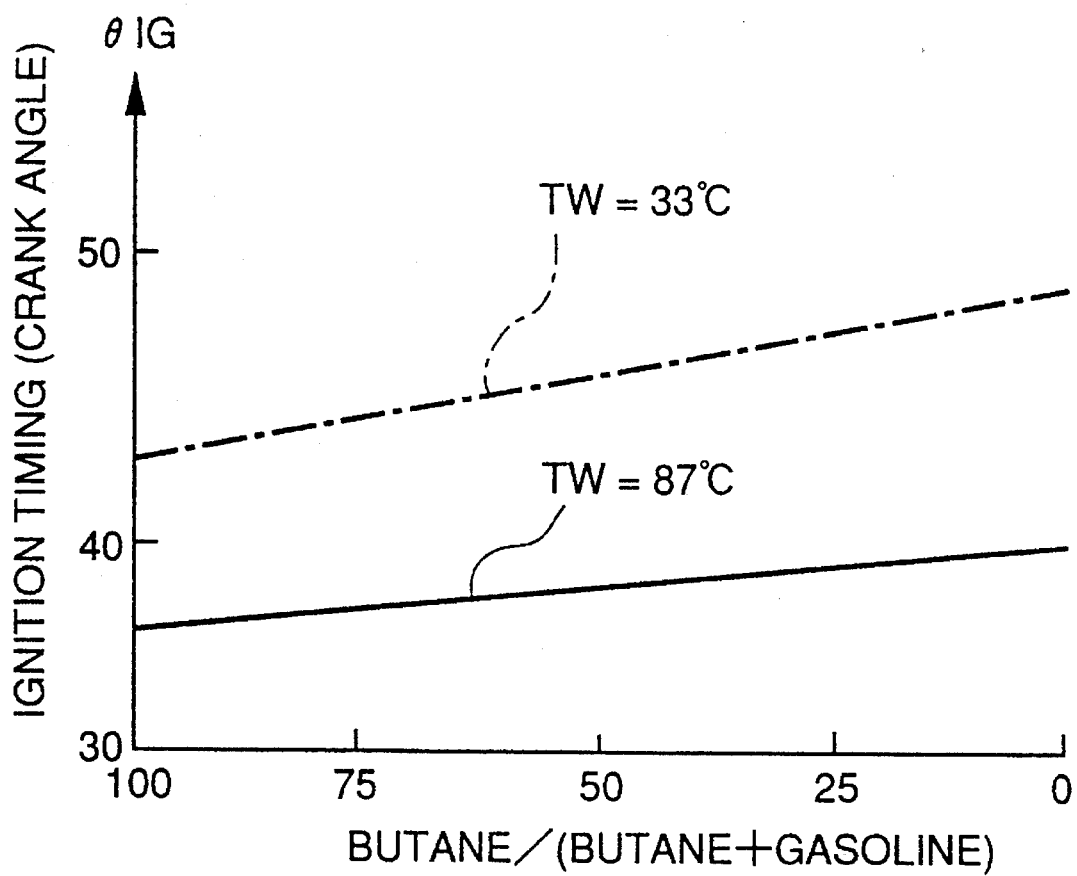
FIG. 1 is a diagram showing the relationship between the evaporative fuel ratio and the optimum ignition timing.
Figure 2A:
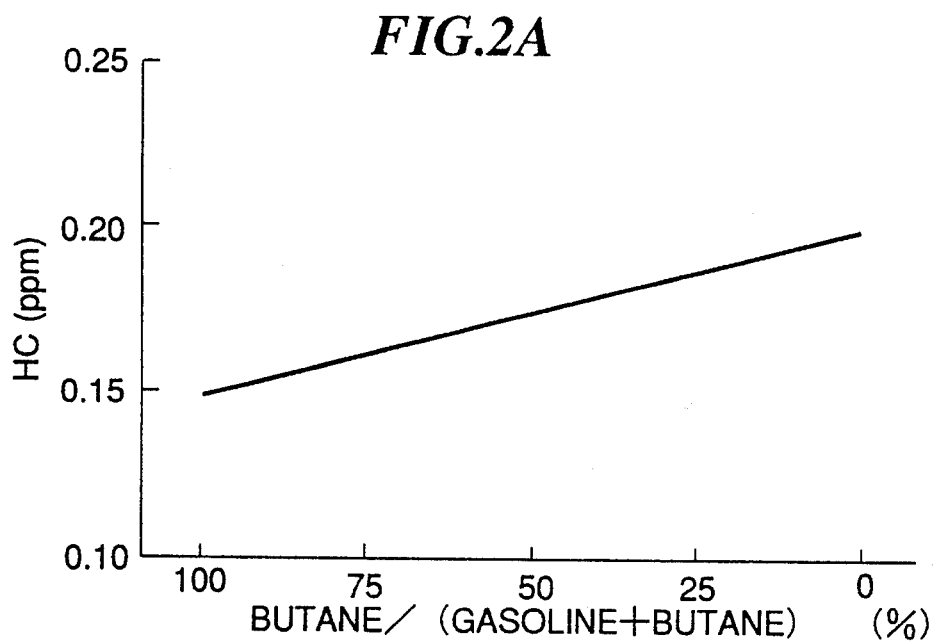
FIG. 2A is a diagram showing the relationship between the ratio of an amount of butane to a total amount of fuel (gasoline+butane), and exhaust emission characteristics (in respect of HC) of an internal combustion engine.
Figure 2B:
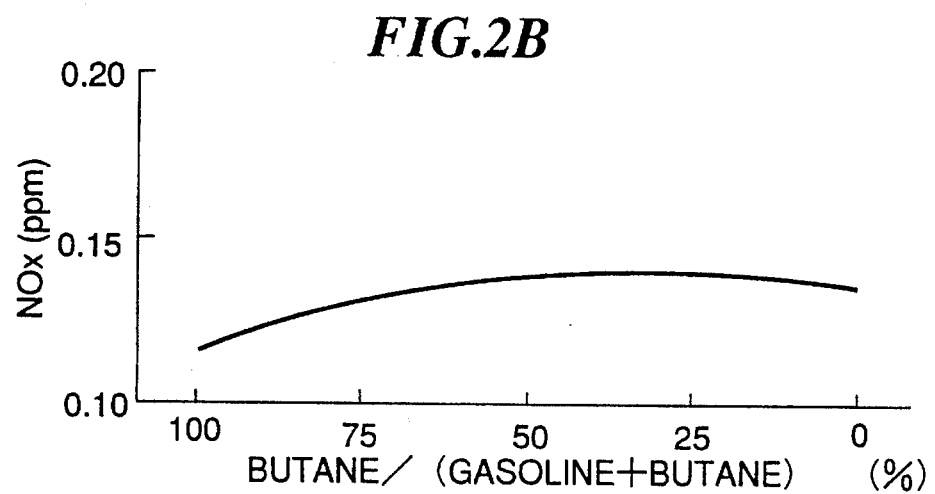
FIG. 2B is a diagram showing the relationship between the ratio of an amount of butane to a total amount of fuel (gasoline+butane), and exhaust emission characteristics (in respect of NOx) of same.
Figure 2C:
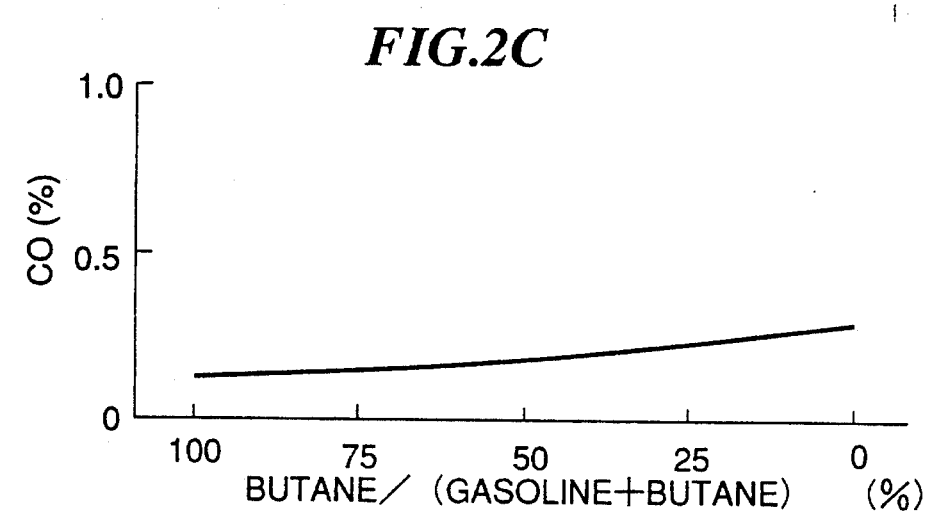
FIG. 2C is a diagram showing the relationship between the ratio of an amount of butane to a total amount of fuel (gasoline+butane), and exhaust emission characteristics (in respect of CO) of same.
Figure 3:
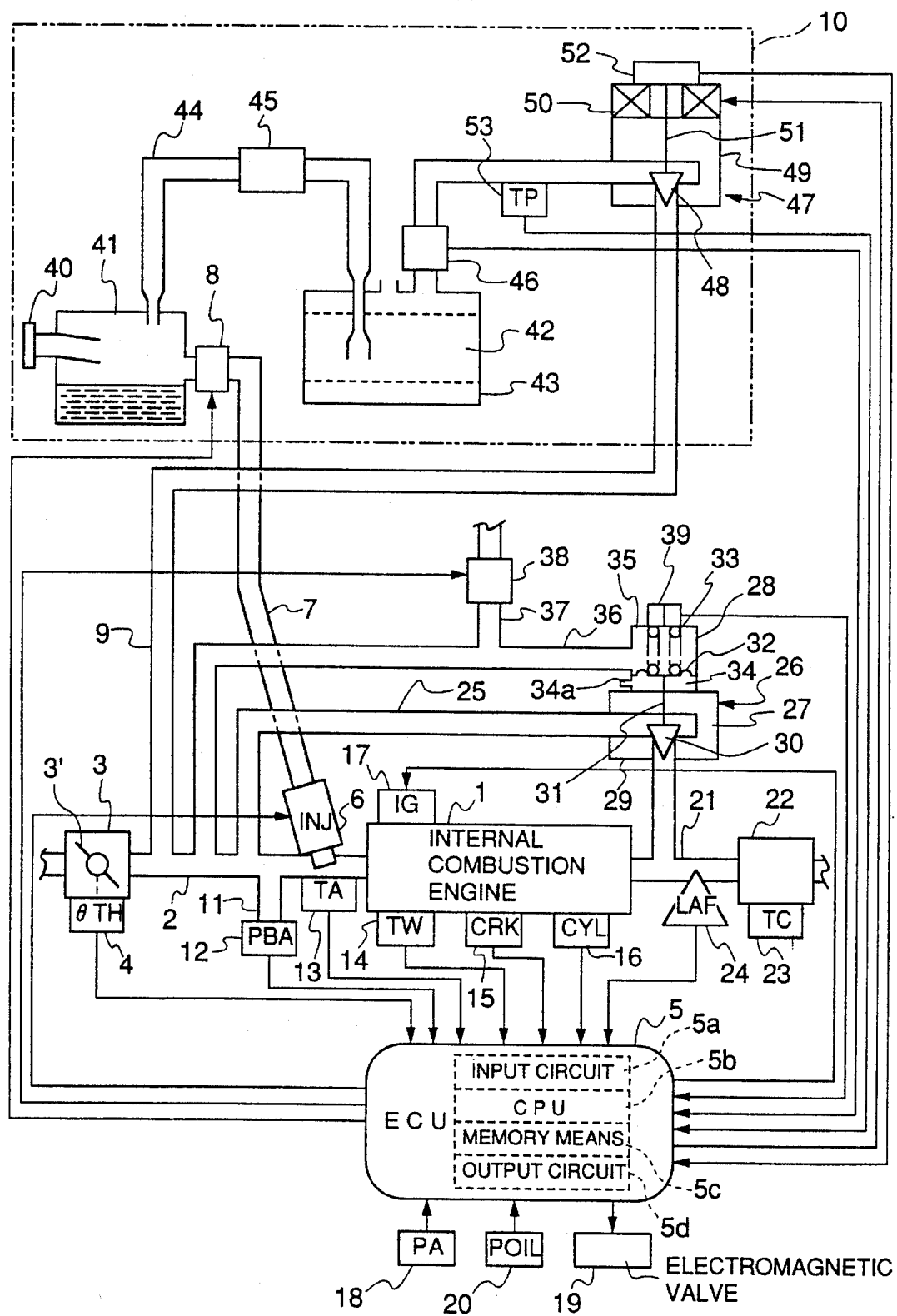
FIG. 3 is a diagram showing a control system for an internal combustion engine, according to an embodiment of the invention.

Referring first to FIG. 3, there is illustrated the whole arrangement of a control system for an internal combustion engine according to an embodiment of the invention.

In the figure, reference numeral 1 designates a DOHC straight type four-cylinder engine (hereinafter simply referred to as "the engine"), each cylinder being provided with a pair of intake valves, not shown, and a pair of exhaust valves, not shown. This engine is constructed such that it is capable of changing the operating characteristics of the intake valves and exhaust valves, for example, the valve opening period and the valve lift (generically referred to hereinafter as "the valve timing") between a high speed valve timing (hereinafter referred to as "the high speed V/T") adapted to a high engine speed region and a low speed valve timing (hereinafter referred to as "the low speed V/T") adapted to a low engine speed region.

Connected to an intake port, not shown, of the cylinder block of the engine 1 is an intake pipe 2 across which is arranged a throttle body 3 accommodating a throttle valve 3' therein. A throttle valve opening (θTH) sensor 4 is connected to the throttle valve 3' for generating an electric signal indicative of the sensed throttle valve opening and supplying same to an electric control unit (hereinafter referred to as "the ECU 5").

Fuel injection valves 6, only one of which is shown, are inserted into the intake pipe 2 at locations intermediate between the cylinder block of the engine 1 and the throttle valve 3' and slightly upstream of respective intake valves, not shown. The fuel injection valves 6 are connected to a fuel pump 8 via a fuel supply pipe 8 and electrically connected to the ECU 5 to have their valve opening periods controlled by signals therefrom.

A purging passage 9 opens into the intake pipe 2 at a location downstream of the throttle valve 3' for connecting the intake pipe 2 to an evaporative emission control system 10, referred to hereinafter.

Further, an intake pipe absolute pressure (PBA) sensor 12 is provided in communication with the interior of the intake pipe 2 via a conduit 11 opening into the intake pipe 2 at a location downstream of the purging passage 9 for supplying an electric signal indicative of the sensed absolute pressure within the intake pipe 2 to the ECU 5.

An intake air temperature (TA) sensor 13 is inserted into the intake pipe 2 at a location downstream of the conduit 11 for supplying an electric signal indicative of the sensed intake air temperature TA to the ECU 5.

An engine coolant temperature (TW) sensor 14 formed of a thermistor or the like is inserted into a coolant passage filled with a coolant and formed in the cylinder block, for supplying an electric signal indicative of the sensed engine coolant temperature TW to the ECU 5.

A crank angle (CRK) sensor 15 and a cylinder-discriminating (CYL) sensor 16 are arranged in facing relation to a camshaft or a crankshaft of the engine 1, neither of which is shown.

The CRK sensor 15 generates a CRK signal pulse whenever the crankshaft rotates through a predetermined angle (e.g. 30 degrees) smaller than half a rotation (180 degrees) of the crankshaft of the engine 1, while the CYL sensor 16 generates a pulse (hereinafter referred to as "the CYL signal pulse") at a predetermined crank angle of a particular cylinder of the engine, both of the CRK signal pulse and the CYL signal pulse being supplied to the ECU 5.

Each cylinder of the engine has a spark plug 17 electrically connected to the ECU 5 to have its ignition timing controlled by a signal therefrom. Further, an atmospheric pressure (PA) sensor 18 is arranged at a suitable location of the engine 1 for supplying an electric signal indicative of the sensed atmospheric pressure (PA) to the ECU 5.

Further, connected to an output circuit 5d of the ECU 5 is an electromagnetic valve 19 for making changeover of the valve timing, which has opening and closing operations thereof controlled by the ECU 5. The electromagnetic valve 19 selects either high or low hydraulic pressure applied to a valve timing changeover device, not shown. Responsive to this high or low hydraulic pressure selected, the valve timing changeover device operates to change the valve timing to either the high speed V/T or the low speed V/T. The hydraulic pressure applied to the valve timing changeover device is detected by a hydraulic pressure (oil pressure) (Poil) sensor 20 which supplies a signal indicative of the sensed hydraulic pressure to the ECU 5.

A catalytic converter (three-way catalyst) 22 is arranged in an exhaust pipe 21 connected to an exhaust port, not shown, of the engine 1 for purifying noxious components, such as HC, CO, NOx, which are present in exhaust gases.

A catalyst temperature (TC) sensor, which is formed of a thermistor or the like, is inserted into a wall of the catalytic converter 22 for supplying a signal indicative of the sensed temperature of a catalyst bed of the catalytic converter 22 to the ECU 5.

A linear output type air-fuel ratio sensor (hereinafter referred to as "the LAF sensor") 24 is arranged in the exhaust pipe 21 at a location upstream of the catalytic converter 22. The LAF sensor 24 supplies an electric signal which is substantially proportional to the concentration of oxygen present in the exhaust gases to the ECU 5.

An exhaust gas recirculation passage 25 is arranged between the intake pipe 2 and the exhaust pipe 21 such that it bypasses the engine 1. The exhaust gas recirculation passage 25 has one end thereof connected to the exhaust pipe 21 at a location upstream of the LAF sensor 24 (i.e. on the engine side of same), and the other end thereof connected to the intake pipe 2 at a location upstream of the PBA sensor 12 and at the same time downstream of the purging passage 9.

An exhaust gas circulation control valve (hereinafter referred to as "the EGR control valve") 26 is arranged in an intermediate portion of the exhaust gas recirculation passage 25. The EGR valve 26 is comprised of a casing 29 defining a valve chamber 27 and a diaphragm chamber 28 therein, a valving element 29 in the form of a wedge arranged in the valve chamber 27, which is vertically movable so as to open and close the exhaust gas recirculation passage 25, a diaphragm 32 connected to the valving element 30 via a valve stem 31, and a spring 33 urging the diaphragm 32 in a valve-closing direction. The diaphragm chamber 32 is divided by the diaphragm 32 into an atmospheric pressure chamber 34 on the valve stem side and a negative pressure chamber 35 on the spring side.

The atmospheric pressure chamber 34 is communicated to the atmosphere via an air inlet port 34a, while the negative pressure chamber 35 is connected to one end of a negative pressure-introducing passage 36. The negative pressure-introducing passage 36 has the other end thereof connected to the intake pipe 2 at a location between the purging passage 9 and the other end of the exhaust gas recirculation passage 25, for introducing the absolute pressure PBA (negative pressure) into the negative pressure chamber 35. The negative pressure-introducing passage 36 has an air-introducing passage 37 connected to an intermediate portion thereof, and the air-introducing passage 37 has a pressure control valve 38 arranged in an intermediate portion thereof. The pressure control valve 38 is an electromagnetic valve of a normally-closed type, and negative pressure prevailing within the negative pressure-introducing passage 38 is controlled by the pressure control valve 38, whereby a predetermined level of negative pressure is created within the negative pressure chamber 35.

A valve opening (lift) sensor (hereinafter referred to as "the L sensor for EGR") 39 is provided for the EGR valve 26, which detects an operating position (lift amount) of the valving element 30 thereof, and supplies a signal indicative of the sensed lift amount to the ECU 5. In addition, the EGR control is performed after the engine has been warmed up (e.g. when the engine coolant temperature TW is equal to or higher than a predetermined value).

The evaporative emission control system 10 comprises a fuel tank 41 equipped with a filler cap 40 which is opened at the time of refueling, a canister 43 accommodating activated carbon 42 as an adsorbent for adsorbing evaporative fuel generated from the fuel tank 41 for temporary storage therein, an evaporative fuel-guiding passage 44 connecting between the canister 43 and the fuel tank 41, and a two-way valve 45 formed of a positive pressure valve and a negative pressure valve, neither of which is shown, and arranged in the evaporative fuel-guiding passage 45.

The evaporative emission control system 10 further includes a hot wire type flowmeter (hereinafter simply referred to as "the flowmeter") 46, and a purge control valve 47, which are arranged in the purging passage 9 at a location close to the canister 43, and at a location downstream of the flowmeter 46, respectively.

The flowmeter 46 has a platinum wire, not shown, and utilizes the phenomenon that when the platinum wire heated by conduction of electricity is exposed to a stream of a gas, the temperature thereof lowers to decrease the electric resistance thereof. It has an output characteristic dependent on the concentration, flow rate, etc. of evaporative fuel, and supplies an electric signal having a level varying with these parameters.

The purge control valve 47 is an electromagnetic valve of a normally-open type which is comprised of a valving element 48 in the form of a wedge which is vertically movable to open and close the purging passage 9, a casing 49 accommodating the valving element 48, a solenoid 50 which electromagnetically drives the valving element 48 via a valve stem 51 in a vertical direction, and a valve lift sensor (hereinafter referred to as "the PRG L sensor") 52 connected to the valve stem 51. The solenoid 50 is electrically connected to the ECU 5 to be supplied with an electric signal therefrom to perform duty-control of the valve lift amount of the valving element 48 based on the electric signal. The PRG L sensor 52 detects the valve lift amount of the 48 valving element and supplies an electric signal indicative of the sensed valve lift amount to the ECU 5.

A purging temperature (TP; temperature of purged gas) sensor 53 is arranged in the purging passage 9 at a location between the flowmeter 46 and the purge control-valve 47 for supplying an electric signal indicative of the sensed purging temperature TP to the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as the "the CPU") 5b, memory means 5c (including a ring buffer, not shown) formed of a ROM storing various operational programs which are executed by the CPU 5b, and various maps and tables, referred to hereinafter, and a RAM for storing results of calculations therefrom, etc., the aforementioned output circuit 5d which outputs driving signals to the fuel injection valves 6, the spark plugs 17, the fuel pump 8, the electromagnetic valve 19, the solenoid 50, etc. respectively.

Figure 4:
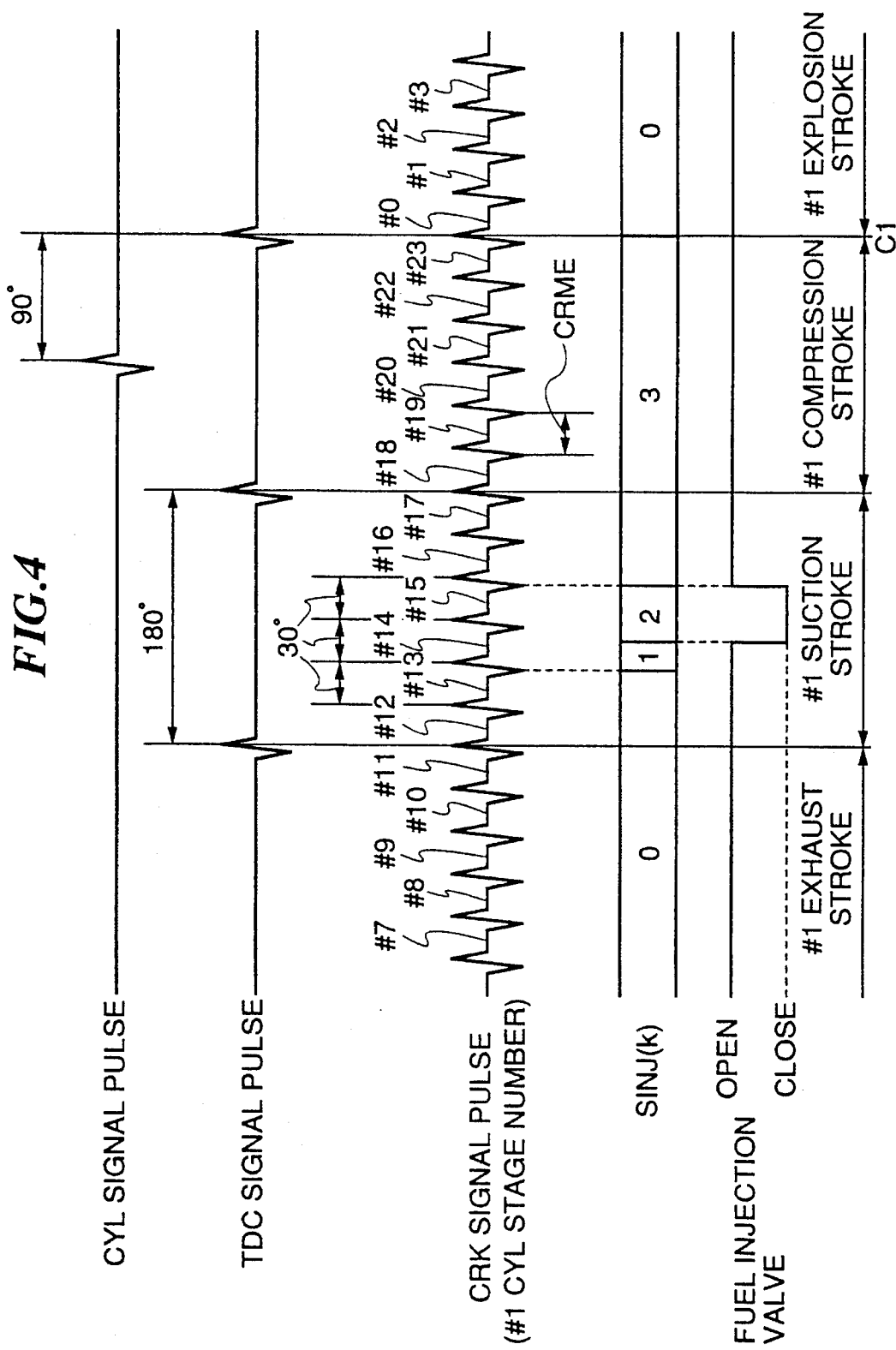
FIG. 4 shows a timing chart showing CYL signal pulses, TDC signal pulses, CRK signal pulses, a status number SINJ(k) and the operative state of the fuel injection valve.

FIG. 4 shows a timing chart showing the relationship in timing between the CRK signal pulses from the CRK sensor 15, the CYL signal pulses from the CYL sensor 16, TDC signal pulses, and injection timing of fuel by the fuel injection valves 6.

Twenty-four CRK signal pulses are generated per two rotations of the crankshaft at regular intervals, i.e. whenever the crankshaft rotates through 30 degrees starting from the top dead center position of any of the four cylinders (#1 to #4 CYL). The ECU 5 generates a TDC signal pulse in synchronism with a CRK signal pulse generated at the top dead center position of each cylinder. The TDC signal pulses generated sequentially indicate reference crank angle positions of the respective cylinders and are each generated whenever the crankshaft rotates through 180 degrees. The ECU 5 measures time intervals of generation of the CRK signal pulses to calculate CRME values, which are added together over a time period of generation of two TDC signal pulses i.e. over a time period of one rotation of the crankshaft to calculate a ME value, and then calculates the engine rotational speed NE, which is the reciprocal of the ME value.

CYL signal pulses are generated as briefly described above, at a predetermined crank angle position of a particular cylinder (cylinder #1 in the illustrated example), e.g. when the #1 cylinder is in a position 90 degrees before a TDC position thereof corresponding to the end of the compression stroke of the cylinder, to thereby allot a particular cylinder number (e.g. #1 CYL) to a TDC signal pulse generated immediately after the CYL signal pulse is generated.

The ECU 5 detects crank angle stages (hereinafter referred to as "the stages") in relation to the reference crank angle position of each cylinder, based on the TDC signal pulses and the CRK signal pulses. More specifically, the ECU 5 determines, for instance, that the #1 cylinder is in a #0 stage when a CRK signal pulse is generated, which corresponds to a TDC signal pulse generated at the end of compression stroke of the #1 cylinder and immediately following a CYL signal pulse. The ECU sequentially determines thereafter that the #1 cylinder is in a #1 stage, in a #2 stage . . . and in a #23 stage, based on CRK signal pulses generated thereafter.

Further, an injection stage of a cylinder at which injection should be started is set depending on operating conditions of the engine, more particularly by executing an injection stage-determining routine, not shown. Further, a valve opening period (fuel injection period TOUT) is controlled by the use of a status number (SINJ(k)) determined in relation to the injection stage.

More specifically, the status number SINJ(k) is set to "2" during the valve opening period of a fuel injection valve, and changed to "3" immediately after termination of injection. The status number SINJ(k) is reset to "0" simultaneously when the explosion stroke starts, to set the fuel injection valve 6 into a standby state for injection. Thereafter, when the cylinder reaches the next injection stage (e.g. the #13 stage), the status number SINJ(k) is set to "1", and after an injection delay time period dependent on the fuel injection period TOUT elapses, the status number SINJ(k) is set to "2" again to start fuel injection via the fuel injection valve 6. After termination of fuel injection, the status number SINJ(k) is set to "3", and upon start of the explosion stroke, it is reset to "0" again. In the present embodiment, as will be described hereinafter with reference to FIG. 39, an amount (TWP) of fuel adhering to the inner wall surface of the intake pipe 2 is calculated when SINJ(k)=3, and then the fuel injection period TOUT is calculated, taking the adhering amount TWP of fuel into account. The injection delay time period (corresponding to the time period over which the status number SINJ(k) is equal to "1") is provided for controlling the injection timing such that the termination of fuel injection is synchronous with generation of a CRK signal pulse. By provision of the predetermined injection delay time period, the start of fuel injection is controlled to a desired timing to thereby control the fuel injection time period as desired.

Next, details of fuel amount control, air-fuel ratio control, and ignition timing control carried out by the control system according to the present embodiment will be described.

[I] Fuel amount control

In this embodiment, an amount of evaporative fuel purged from the canister 43 is accurately calculated, and further, a required amount of fuel to be injected by the fuel injection valve is calculated with the amount of evaporative fuel taken into account. Then, a final fuel injection amount to be supplied to the cylinder is determined with the amount TWP of fuel adhering to the wall surface of the intake pipe 2 taken into account.

Further, in the present embodiment, the ratio of an amount of injected fuel to an amount of purged evaporative fuel supplied to the engine is determined, to thereby determine a valve lift command value LPUCMD supplied to the purge control valve 47.

The fuel amount control will now be described in detail by dividing it into an evaporative fuel-processing procedure and an adhering fuel-dependent correction processing procedure, with reference to FIG. 5 to FIG. 28 and FIG. 29 to FIG. 39, respectively. In these figures and also in those figures of the air-fuel ratio control and the ignition timing control described hereinbelow, each control routine is expressed according to a program notation defined in JIS X 0128, i.e. by the use of SPD (Structured Programing Diagrams).

[A] Evaporative fuel processing

Figure 5:
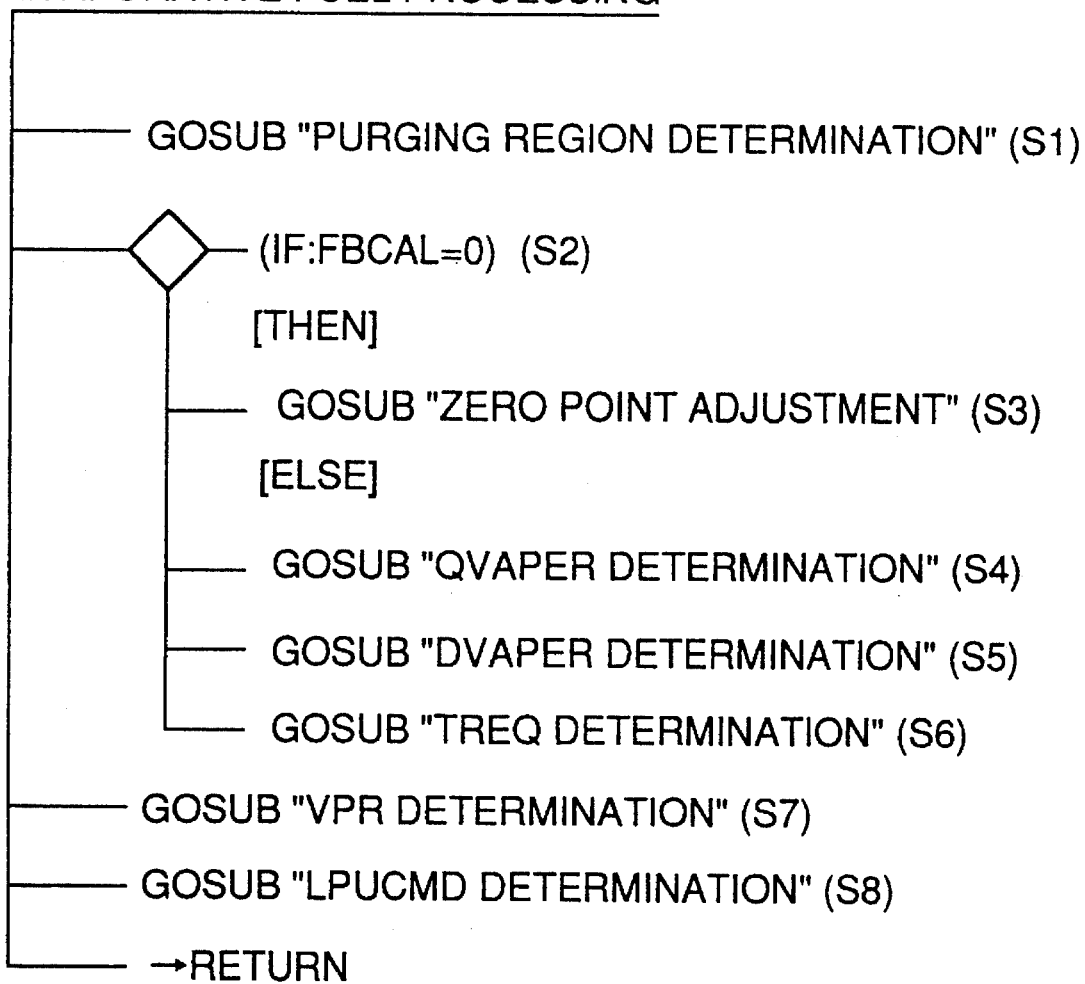
FIG. 5 shows a flowchart of an evaporative fuel processing routine.

FIG. 5 shows a main routine for carrying out evaporative fuel processing control.

First, at a step S1, it is determined whether or not the engine is in a purging region, by executing a purging region-determining subroutine. In the purging-region-determining subroutine, at least when the engine is determined to be in the purging region, the control system is set to a mode for calculating the mass of evaporative fuel purged from the canister 43. In this connection, it is known that evaporative fuel purged from the canister 43 is composed nearly solely of butane. Therefore, in the present embodiment, the control operations are executed on the assumption that evaporative fuel consists of 100% butane. That is, at least when the engine is determined to be in the purging region, a flag FBCAL is set to "1" to set the control system to a butane mass-calculating mode for calculating the mass of butane as the mode for calculating the mass of evaporative fuel.

Next, at a step S2, it is determined whether or not the flag FBCAL is equal to "0". If FBCAL=0, which means that the control system is set to a mode other than the butane mass-calculating mode, the program proceeds to a step S3, where a zero point-adjusting routine is executed to effect zero point adjustments of the flowmeter 46 and the operating position of the valving element 48 of the purge control valve 47, followed by the program proceeding to a step S7.

On the other hand, if it is determined at the step S2 that FBCAL is equal to "1", which means that the control system is set to the butane mass-calculating mode, a QVAPER-determining routine, a DVAPER-determining routine, and a TREQ-determining routine are executed at steps S4 to S6, respectively, followed by the program proceeding to the step S7. More specifically, in the QVAPER-determining routine, a volume QVHD of purged gas (air+butane) purged over a predetermined time period and the concentration CBU of butane present in the purged gas are calculated. In the DVAPER-determining routine, the mass PGIN of butane drawn into the cylinder during the suction stroke of the present cycle is calculated, based on dynamic characteristics of the purged gas, described hereinafter. Further, in the TREQ-determining routine, a required fuel injection period TREQ over which the fuel injection valve 6 should be opened during the suction stroke of the present cycle is calculated, followed by the program proceeding to the step S7.

Then, at the step S7, a VPR-determining routine is executed to calculate an injection fuel decremental coefficient KPUN dependent on the amount of evaporative fuel, in dependence on operating conditions of the engine, and at the same time a desired output voltage VHCMD of the flowmeter 46 is calculated. Finally, at a step S8, an LPUCMD-determining routine is executed to determine the valve lift command value LPUCMD for the valving element 48 of the purge control valve 47, followed by terminating the program.

The subroutines of the steps S1 to S8 will now be described in detail in the order of the step numbers.

(1) Purging region determination (at the step S1 of the FIG. 5)

Figure 6:
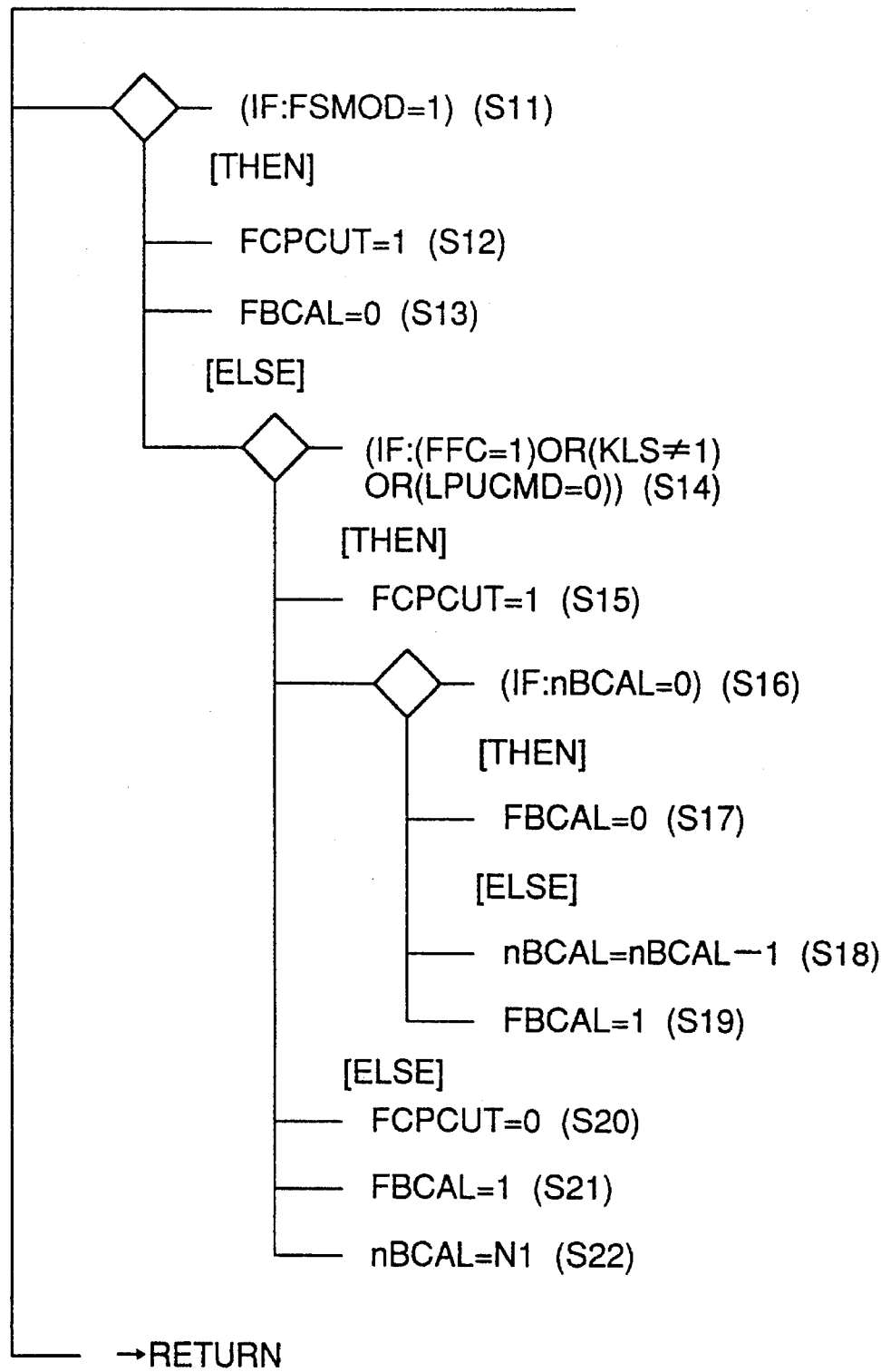
FIG. 6 shows a flowchart of a purging region-determining routine.

FIG. 6 shows a purging region-determining routine, which is executed in synchronism with generation of each TDC signal pulse.

First, at a step S11, it is determined whether or not a flag FSMOD is equal to "1", i.e. whether the engine is in a starting mode. The determination as to whether the engine is in the starting mode or not is effected by determining whether a starter switch, not shown, of the engine has been turned on, and at the same time the engine rotational speed NE is equal to or lower than a predetermined starting speed (cranking speed).

If the flag FSMOD is equal to "1", it is judged that the engine is in the starting mode, and then a flag FCPCUT is set to "1" at a step S12. More specifically, the solenoid 50 is energized to close the purge control valve 47 to thereby inhibit purging of evaporative fuel. Then, the flag FBCAL is set to "0" at a step S13 to inhibit the butane weight calculation, followed by terminating the routine and returning to the FIG. 5 main routine.

On the other hand, if the flag FSMOD is equal to "0", i.e. if the engine is in a basic operating mode, the program proceeds to a step S14, where it is determined whether a flag FFC is equal to "1", which means that the engine is under fuel cut, or whether a leaning correction coefficient KLS is equal to a predetermined value other than "1", or whether the valve lift command value LPUCMD for the purge control valve 47 is equal to "0". Whether the engine is under fuel cut is determined based on the engine rotational speed NE and the valve opening θTH of the throttle valve 3', more specifically, by executing a fuel cut-determining routine, not shown. The leaning correction coefficient KLS is set to "1" when the engine is not in a leaning region in which the air-fuel ratio of a mixture supplied to the engine should be controlled to a lean value, whereas when the engine is in the leaning region, it is set to a predetermined value smaller than "1", which is dependent on the leaning region. Further, the valve lift command value LPUCMD is determined by executing the LPUCMD-determining routine (see FIG. 26) mentioned at the step S8 of the FIG. 5 main routine. If none of the three conditions is satisfied, i.e. if FFC is equal to 0, KLS is equal to 1, and LPUCMD is not equal to 0, the program proceeds to a step S20, where a flag FCPCUT is set to "0", whereby the solenoid 50 is deenergized to open the purge control valve 47 to allow evaporative fuel to be purged into the intake pipe 2, and then the program proceeds to a step S21. At the step S21, the flag FBCAL is set to "1" to set the control system to the butane mass-calculating mode, and then a count value nBCAL of a delay counter (first delay counter), not shown, for butane mass calculation is set to a predetermined value N1 (e.g. 16) at a step S22, followed by terminating the routine. The first delay counter is provided for compensation for a time period required to elapse before the flow rate of the purged gas is actually reduced to zero after the satisfaction of the purge-cut conditions (FCPCUT= 1) in the basic operating mode of the engine. That is, it is provided to cope with a time lag in the purge control. If any of the three conditions of the step S14 is satisfied in a subsequent loop, the program proceeds to a step S15, where the flag FCPCUT is set to "1" to inibit purging of evaporative fuel. Then, at a step S16, it is determined whether or not the count value nBCAL of the first delay counter is equal to "0". If the count value nBCAL is not equal to "0", the program proceeds to a step S18, where the count value nBCAL is decreased by a decremental value of 1, and the flag FBCAL is set to "1" at a step S19, followed by terminating the routine. If the count value nBCAL becomes equal to "0" in a subsequent loop, the flag FBCAL is set to "0" to inhibit calculation of the mass of purged butane (evaporative fuel), followed by terminating the routine and returning to the FIG. 5 main routine.

Thus, even if the purge-cut conditions are satisfied to set the flag FCPCUT to "1", the butane mass calculation continues to be carried out over a predetermined time period, to cope with the time lag in the purge control, which makes it possible to achieve enhanced controllability.

(2) Zero point adjustment (at the step S3 of FIG. 5)

Figure 7:
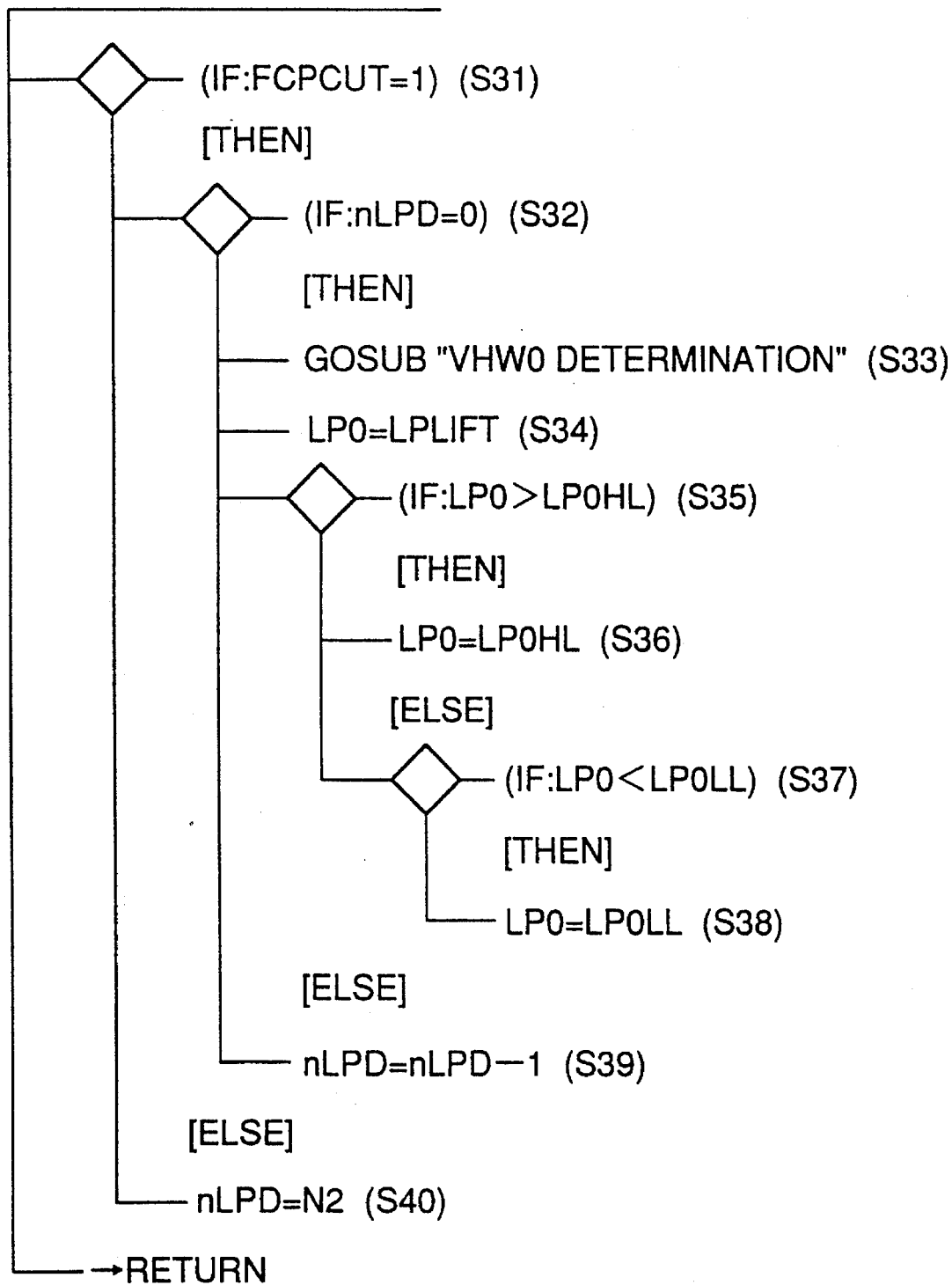
FIG. 7 shows a flowchart of a zero point-adjusting routine.

FIG. 7 shows a zero point-adjusting routine, which is executed in synchronism with generation of false signal pulses e.g. at time intervals of 10 msec from a timer, not shown, incorporated in the ECU 5.

First, at a step S31, it is determined whether or not the flag FCPCUT is equal to "1", i.e. whether or not purging of evaporative fuel is inhibited. If the flag FCPCUT is not equal to "1", i.e. if the evaporative fuel is being purged, the program proceeds to a step S40, where a count value nLPD of a delay counter (second delay counter), not shown, for calculation of a zero point learned value is set to a predetermined value N2 (e.g. 4), followed by terminating the routine. On the other hand, if it is determined at the step S31 that the flag FCPCUT is equal to "1", which means that the evaporative fuel is being purged, the program proceeds to a step S32, where it is determined whether or not the count value nLPD of the second delay counter is equal to "0". In the first loop to pass this step, the count value nLPD is not equal to "0", so that the program proceeds to a step S39, where the count value nLPD is decreased by a decremental value of 1, followed by terminating the routine. On the other hand, if the count value nLPD becomes equal to "0" in a subsequent loop, the program proceeds to a step S33, where a VHWO-calculating routine is executed to perform the zero point adjustment of the flowmeter 46.

Figure 8:
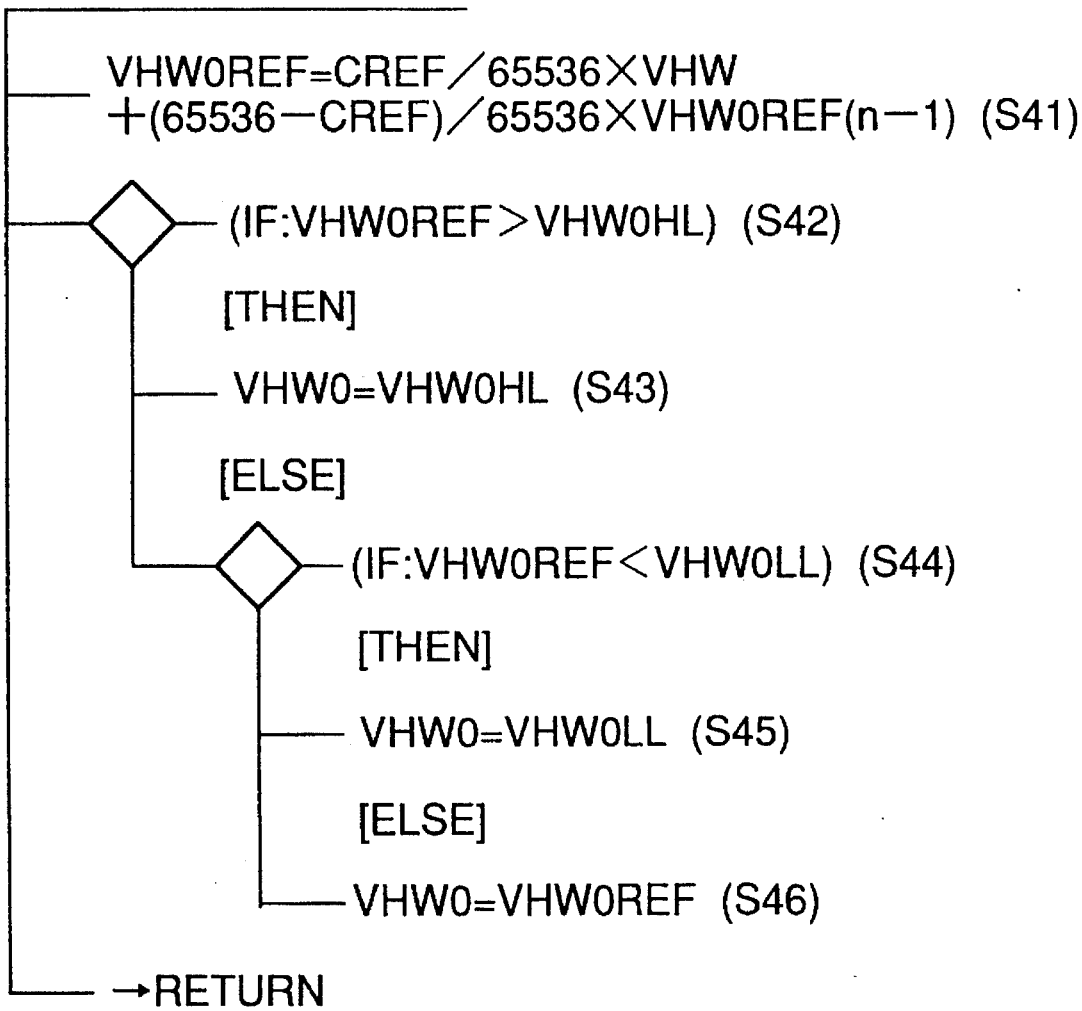
FIG. 8 shows a flowchart of a VHW0-determining routine.

More specifically, as shown in FIG. 8, the zero point learned value VHW0REF is calculated at a step S41 by the use of Equation (1):

$$VHW0REF=(CREF/65536) \times VHW+[(65536-CREF)/65536] \times VHW0REF(n-1) \quad (1)$$

where CREF represents a variable suitably selected from a range of 1 to 65536 depending on the internal temperature of the flowmeter 46, and VHW0REF(n-1) represents the immediately preceding value of the zero point learned value VHW0REF. By learning a value of the output voltage VHW from the flowmeter 46 on the basis of the immediately preceding value VHW0REF(n-1) when the purging of the evaporative fuel is inhibited, the zero point learned value VHW0REF is updated. Therefore, the zero point learned value VHW0REF represents an average value of the output voltage VHW assumed when the purge cut is performed, which varies with aging of the flowmeter 46.

Then, at steps S42 to S46, the limit check of the zero point learned value VHW0REF is performed, followed by terminating the routine. More specifically, at a step S42, it is determined whether or not the zero point learned value VHW0REF is higher than a predetermined upper limit value VHW0HL. If VHW0REF>VHW0HL, the zero point VHW0 of the flowmeter 46 is set to the predetermined upper limit value VHW0HL at a step S43, whereas if VHW0REF≦VHW0HL, the program proceeds to a step S44, where it is determined whether or not the zero point learned value VHW0REF is lower than a predetermined lower limit value VHW0LL. If VHW0REF<VHW0LL, the zero point VHW0 is set to the predetermined lower limit value VHW0LL at a step S45, whereas if VHW0REF≧VHW0LL, the zero point VHW0 is set to the zero point learned value VHW0REF calculated by the use of Equation (1), followed by terminating the zero point adjustment and returning to the FIG. 7 zero point adjusting routine.

Then, the program proceeds to a step S34 of the FIG. 7 routine, an actual value of the valve lift amount (i.e. detected valve lift value) LPLIFT of the PRG L sensor 52 is set to a zero point LP0 thereof. Then, at step S35 to S38, a limit check of the zero point LP0 is performed, followed by terminating the zero point adjustment. More specifically, at a step S35, it is determined whether or not the zero point LP0 is larger than a predetermined upper limit value LP0HL. If LP0>LP0HL, the zero point LP0 is set to the predetermined upper limit value LP0HL at a step S36, whereas if LP0≦LP0HL, the program proceeds to a step S37, where it is determined whether or not the zero point LP0 is smaller than a predetermined lower limit value LP0LL. If LP0<LP0LL, the zero point LP0 is set to the predetermined lower limit value LP0LL at a step S38, followed by terminating the zero point adjustment of the PRG L sensor 52 and returning to the FIG. 5 main routine.

(3) QVAPER determination (determination of the concentration CBU of butane and the volume QHWD of purged gas) (at the step S4 of FIG. 5)

FIG. 9 shows a QVAPER-determining routine, which is executed in synchronism with generation of each TDC signal pulse.

First, at a step S51, the ECU 5 stores into the memory means 5c information on engine operating parameters, such as the engine rotational speed NE, the intake pipe absolute pressure PBA, the atmospheric pressure PA, the purging temperature TP, the detected valve lift value LPLIFT of the) PRG L sensor 52, and the output voltage VHW from the flowmeter 46.

Then, at a step S52, a net or actual valve lift value LPACT (=LPLIFT–LP0) of the PRG L sensor 52 is calculated, and then at a step S53, a net or actual output voltage VHACT (=VHW–VHW0) from the flowmeter 46 is calculated.

Then, at a step S54, a QBE map is retrieved to determine a first basic flow rate value QBEM.

The QBE map is set, e.g. as shown in FIG. 10 such that map values QBEM (00, 00) to QBEM (15, 15) are provided in a manner corresponding to predetermined values PBG00 to PBG15 of negative pressure (gauge pressure) within the intake pipe 2 as a difference between the atmospheric pressure PA and the intake pipe absolute pressure PBA, and predetermined values LPACT00 to LPACT15 of the net valve lift value LPACT of the PRG L sensor 52. The first basic flow rate value QBEM is calculated based on the intake pipe negative pressure PBG and the net valve lift value LPACT by the use of Equation (2) based on known Bernoulli's equation, and the map values QBEM are determined based on the predetermined values of the intake pipe negative pressure PBG and the net valve lift valve LPACT:

$$QBEM = A\sqrt{(2PBG/\rho)} \qquad (2)$$

where A represents an area of opening of the purge control valve 47, which is determined as a function of the net valve lift valve LPACT, and ρ a fluid density. The first basic flow rate value QBEM is determined by retrieving the QBEM map, and additionally by interpolation, if required.

Then, at a step S55, a QHW table is retrieved to determine a second basic flow rate value QHW.

Figure 11:
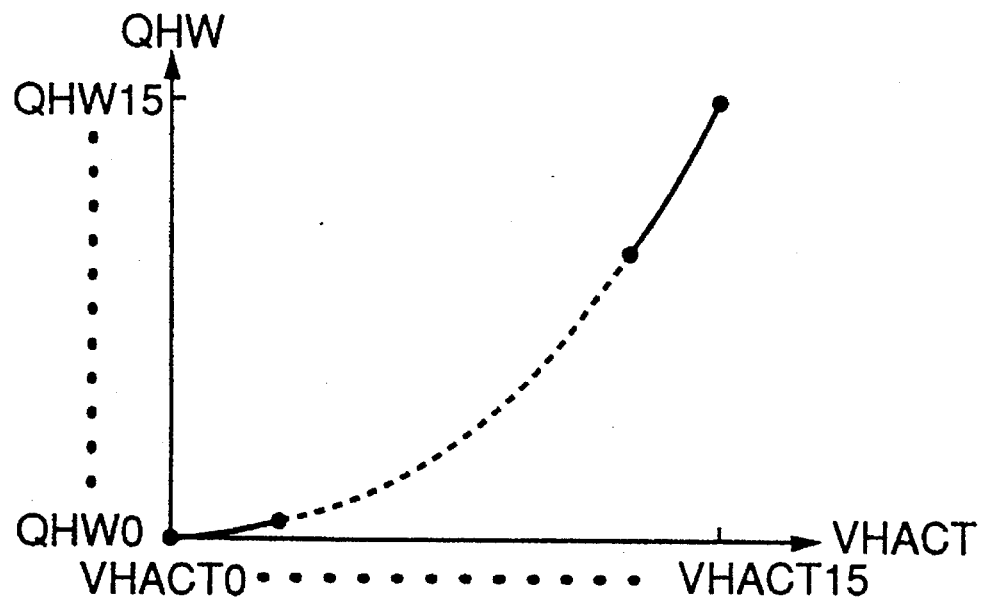
FIG. 11 shows a QHW table.

The QHW table is set, e.g. as shown in FIG. 11, such that table values QHW0 to QHW15 are provided in a manner corresponding to predetermined values VHACT0 to VHACT15 of the net output voltage from the flowmeter 46. The second basic flow rate value QHW is calculated based on the net output voltage VHACT from the flowmeter 46 by the use of Equation (3) based on known King's equation. The table values QHW are thus determined based on the net output voltage VHACT:

$$QHW = A' \times \{[(VHACT)^2 - R \times C]/(R \times B)\}^2 \qquad (3)$$

where A' represents the inner diameter of the purging passage 9, R the electric resistance of the platinum wire of the flowmeter 46, B and C constants dependent on the temperature and properties of the fluid (purged gas), the size of the platinum wire, etc. The second basic flow rate value QHW is determined by retrieving the QHW table, and additionally by interpolation, if required.

Then, the program proceeds to a step S56, where a KTP table is retrieved to determine a purging temperature-dependent correction coefficient KTP for the first basic flow rate value QBEM.

Figure 12:
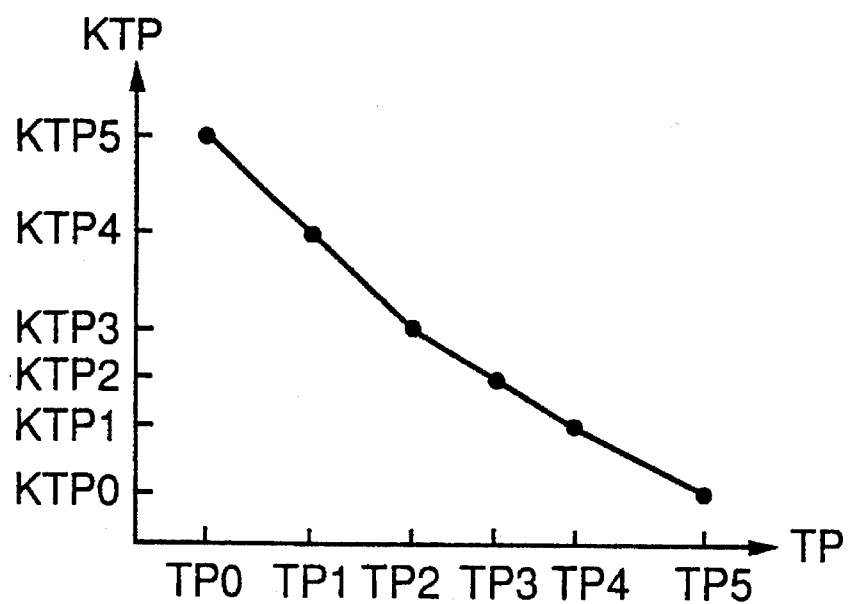
FIG. 12 shows a KTP table.

The KTP table is set, e.g. as shown in FIG. 12, such that table values KTP0 to KTP5 are provided in a manner corresponding Co predetermined values TP0 to TP5 of the purging temperature TP. The purging temperature-dependent correction coefficient KTP is determined by retrieving the KTP table, and additionally by interpolation, if required.

Then, the program proceeds to a step S57, where a KPAP table is retrieved to determine an atmospheric pressure-dependent correction coefficient KPAP for the first basic flow rate value QBEM.

Figure 13:
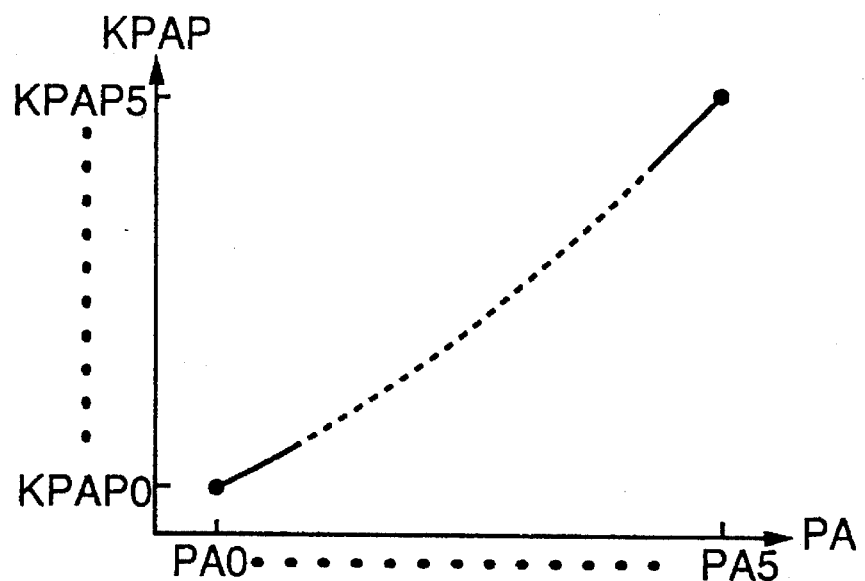
FIG. 13 shows a KPAP table.

The KPAP table is set, e.g. as shown in FIG. 13, such that table values KPAP0 to KPAP5 are provided in a manner corresponding to predetermined values PA0 to PA5 of the purging temperature TP. The atmospheric pressure-dependent correction coefficient KPAP is determined by retrieving the KPAP table, and additionally by interpolation, if required.

Then, the program proceeds to a step S58, where a first flow rate value QBE is calculated by the use of Equation (4), and then at a step S59, the ratio of a second flow rate value QHW (which is equal to the second basic flow rate value) to the first flow rate value QBE, i.e. the flow rate ratio KQ, is calculated:

$$QBE = QBEM \times KTP \times KPAP \qquad (4)$$

$$KQ = QHEW/QBE \qquad (5)$$

Then, at a step S60, a CBU table is retrieved to determine the concentration CBU of butane present in the purged gas.

Figure 14:
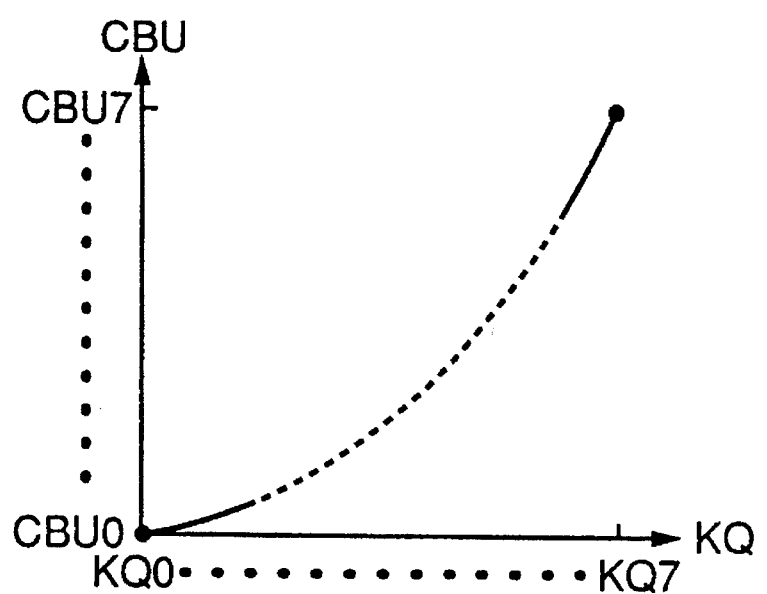
FIG. 14 shows a CBU table.

The CBU table is set, e.g. as shown in FIG. 14, such that table values CBU0 to DBU7 are provided in a manner corresponding to predetermined values KQ0 to KQ7 of the flow rate ratio KQ. The butane concentration CBU is determined by retrieving the CBU table, and additionally by interpolation, if required. As described above, the first flow rate value QBE is calculated by the use of Equation (2) based on Bernoulli's equation, while the second flow rate value QHW is calculated by the use of Equation (3) based on King's equation. The second flow rate value QHW is based on the net output voltage VHACT from the flowmeter 46, which varies with the butane concentration CBU of the purged gas. Accordingly, the first flow rate value QBE and the second flow rate value QHW assume values varying along different curves with the butane concentration CBU. Therefore, the relationship between the flow rate value ratio KQ and the butane concentration CBU is stored in the form of the CBU table into the memory means in advance, and the CBU table is retrieved to determine the butane concentration CBU.

Then, the volume QHWD of purged gas is calculated by the use of Equation (6) over a time period between two adjacent TDC signal pulses (since the engine is a four-cylinder four-cycle type, fuel injection is performed upon generation of each TDC signal pulse), followed by terminating the routine:

$$QHWD = QHW \times ME \qquad (6)$$

Thus, the volume QHWD of the purged gas passing through the purge control valve 47 per the time period determined by generation of two adjacent TDC signal pulses is accurately calculated.

(4) DVAPER determination (determination of the mass of butane) (at the step S5 of FIG. 3)

Figure 15:
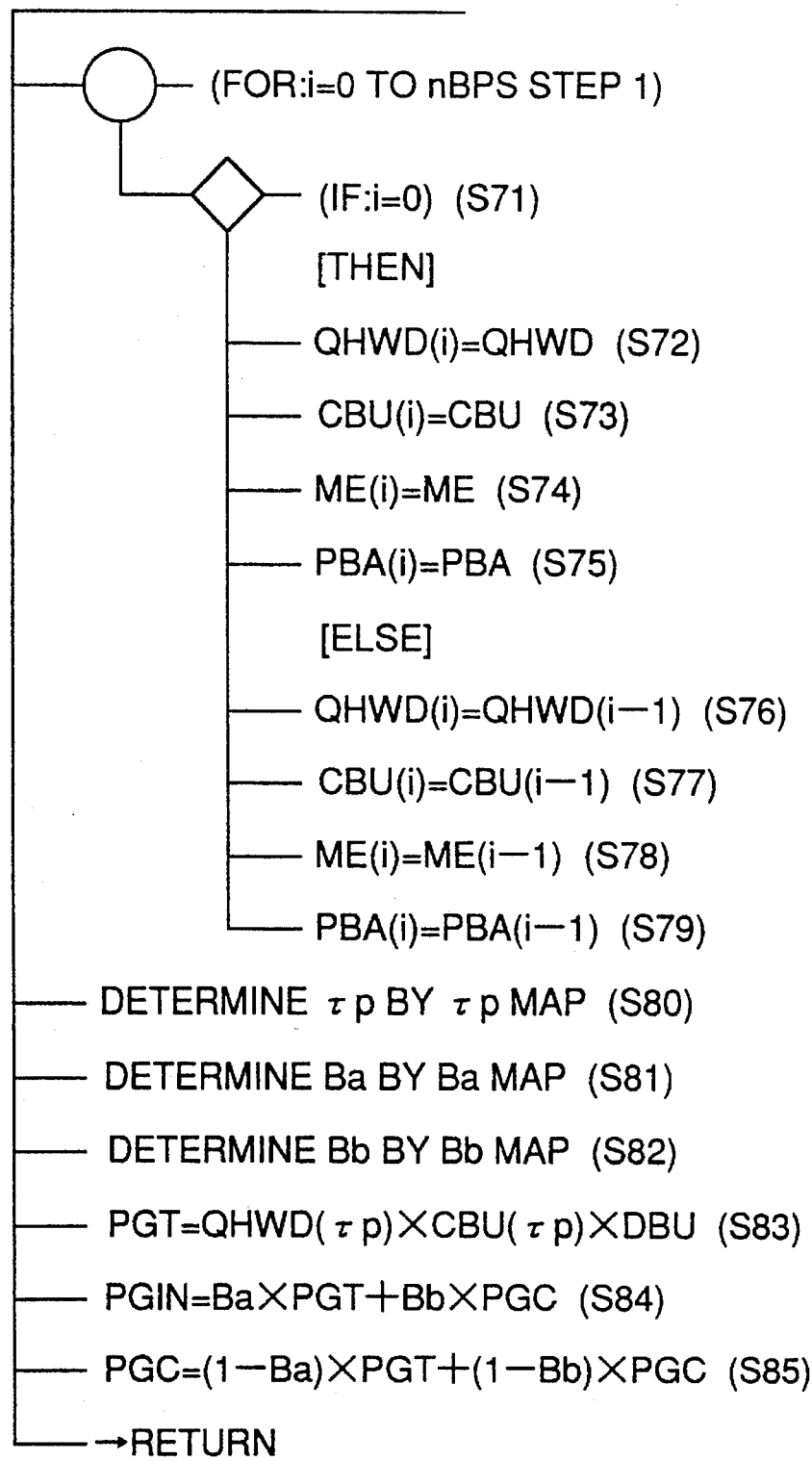
FIG. 15 shows a flowchart of a DVAPER-determining routine.

FIG. 15 shows a DVAPER-determining routine for calculating the mass of butane, by taking the dynamic characteristics of purged gas into consideration, which is executed in synchronism with generation of each TDC signal pulse.

First, at steps S71 to S79, the volume QHWD(i) of purged gas, the butane concentration CBU(i), the ME(i) value, and the intake pipe absolute pressure PBA(i) are sequentially calculated for each cylinder, and stored into the ring buffer. More specifically, the ring buffer BPS is comprised of sections each having a number i (i=0 to n (e.g. n=15)) allotted thereto. The volume QHWD(i) of purged gas, the butane concentration CBU(i), the ME(i) value, and the intake pipe absolute pressure PBA(i) are calculated per each number i of the ring buffer BPS. More specifically, it is determined at a step S71 whether or not the number i of the present section of the ring buffer BPS is equal to "0" or not. If i=0, as shown in the steps S72 to S75, the present values of the volume QHWD of the purged gas, the butane concentration CBU, the ME value, and the intake pipe absolute pressure PBA are stored into the buffer section of i=0. If the number i of the present buffer section is not equal to 0, as shown in steps S76 to S79, the volume QHWD(i−1) of purged gas, the butane concentration CBU(i−1), the ME(i−1) value and the intake pipe absolute pressure PBA(i−1) stored in the buffer section having the immediately preceding number i−1 are stored into the buffer section having the number i (i=1 to n).

Then, a delay time period τp before the purged butane reaches the combustion chamber of the engine 1 after it leaves the canister is calculated.

If the delay time period τp is given as a function of the amount of intake air passing through the purging passage 9. More specifically, the τp map is set, e.g. as shown in FIG. 16, such that map values τp(0,0) to τp(7,7) are provided in a manner corresponding to predetermined values PBA0 to PBA7 of the intake pipe absolute pressure PBA and predetermined values ME0 to ME7 of the reciprocal of the engine rotational speed NE. The delay time period τp is determined by retrieving the τp map, and additionally by interpolation, if required.

Then, at a step S81, a butane direct supply ratio Ba corresponding to the delay time period τp is determined by retrieving a Ba map.

The Ba map is set, e.g. as shown in FIG. 17, such that map values Ba(0,0) to Ba(7,7) are provided in a manner corresponding to predetermined values PBA0 to PBA7 of the intake pipe absolute pressure PBA and predetermined values ME0 to ME7 of the reciprocal of the engine rotational speed NE. The butane direct supply ratio Ba means the ratio of an amount of butane as evaporative fuel directly drawn into the combustion chamber of the engine to an amount of butane drawn into the intake pipe 2 from the canister 43 during the present cycle. The butane direct supply ratio Ba is determined by retrieving the Ba map, and additionally by interpolation, if required.

Then, at a step S82, a butane carry-off ratio Bb corresponding to the delay time period τp is determined by retrieving a Bb map.

The Bb map is set, e.g. as shown in FIG. 18, such that map values Bb(0,0) to Bb(7,7) are provided in a manner corresponding to predetermined values PBA0 to PBA7 of the intake pipe absolute pressure PBA and predetermined values ME0 to ME7 of the reciprocal of the engine rotational speed NE. The butane carry-off ratio Bb means the ratio of an amount of butane as evaporative fuel drawn into the combustion chamber of the engine during the present cycle to an amount of butane having stayed in the intake pipe, etc. up to the immediately preceding cycle. The butane carry-off ratio Bb is determined by retrieving the Bb map, and additionally by interpolation, if required.

Then, at a step S83, a mass PGT of butane in the purged gas flowing through the purge control valve 47 when the delay time period τp assumes the calculated value is calculated by the use of Equation (7):

$$PGT = QHWD(\tau p) \times CBU(\tau p) \times DBU \tag{7}$$

where DBU represents a butane density (=2.7 kg/cm$^3$) under the standard state (0° C., 1 atm.). The volume QHWD of purged gas is multiplied by the butane concentration CBU and the butane density DBU, to thereby calculate the total mass PGT of butane present in the purged gas.

At a step S84, a mass PGIN of butane drawn into the combustion chamber of the engine 1 (drawn-in butane) is calculated by the use of Equation (8):

$$PGIN = Ba \times PGT + Bb \times PGC \tag{8}$$

where PGC represents the mass of butane staying within the path of purged gas such as the intake pipe 2, and is initially set to "0". The first term Ba×PGT on the right side represents the mass of butane directly drawn into the combustion chamber, out of butane purged during the present cycle, and the second term Bb×PGC on the right side represents the mass of butane drawn into the combustion chamber during the present cycle, out of butane having stayed within the intake pipe etc. up to the immediately preceding cycle. The mass PGIN of butane drawn into the combustion chamber is obtained by adding together both the masses of butane supplied to the combustion chamber in different manners.

Then, the mass PGC of staying butane is calculated by the use of Equation (9), followed by terminating the routine and returning to the FIG. 5 main routine:

$$PGC = (1-Ba) \times PGT + (1-Bb) \times PGC \tag{9}$$

where the first term (1–Ba)×PGT on the right side represents the mass of butane staying within the intake pipe 2 etc., out of butane purged during the present cycle, and the second term (1–Bb)×PGC on the right side represents the mass of butane staying within the intake pipe 2 etc. even after the present cycle, out of butane having stayed within the intake pipe 2 etc. up to the immediately preceding cycle. The mass PGC of staying butane is obtained by adding together both the masses.

(5) Determination of a required time period TREQ for opening the fuel injection valve (required fuel injection time period) (at the step S6 of FIG. 5)

Figure 19:
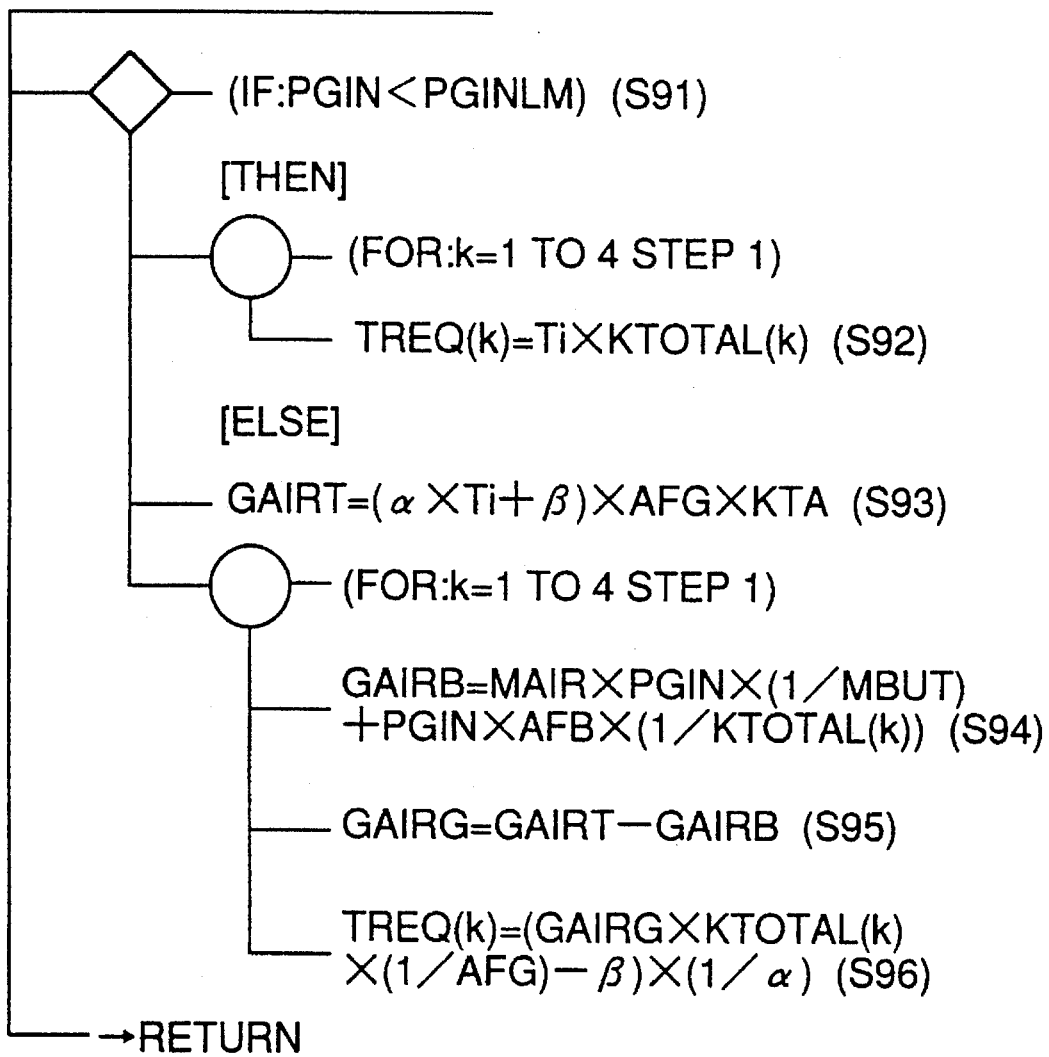
FIG. 19 shows a flowchart of a TREQ-determining routine.

FIG. 19 shows a TREQ-determining routine, which is executed in synchronism with generation of each TDC signal pulse.

First, at a step S91, it is determined whether or not the mass PGIN of drawn-in butane is smaller than a predetermined lower limit value PGINLM. If PGIN< PGINLM, it is judged that the mass PGIN of drawn-in butane is negligible or zero, and the required fuel injection time period (i.e. the required amount of gasoline to be drawn into the combustion chamber) TREQ(k) is sequentially calculated for each cylinder (#1 CYL to #4 CYL) by the use of Equation (10):

$$TREQ(k) = Ti \times KTOTAL(k) \tag{10}$$

where Ti represents a basic fuel injection period calculated when the engine is in the basic operating mode, which is obtained by multiplying a TiM value determined according to the engine rotational speed NE and the intake pipe absolute pressure PBA by an exhaust gas recirculation (EGR)-dependent correction coefficient KEGR. The EGR-dependent correction coefficient KEGR corrects the fuel injection period (or amount) when the EGR valve 26 is in operation, and is set to a predetermined value dependent on the valve opening of the EGR valve 26. In determining the TiM value, there is used a TiM map, which is comprised of two maps for the low speed V/T and the high speed V/T, both stored in the memory means 5c (ROM).

Further, KTOTAL(k) represents the product of various correction coefficients (intake air temperature-dependent correction coefficient KTA, after-start correction coefficient KAST, desired air-fuel ratio coefficient KCMD, etc.) determined depending on operating conditions of the engine, and is obtained for each cylinder.

On the other hand, if PGIN≧PGINLM, i.e. if the mass of butane drawn into the combustion chamber is not negligibly small, the program proceeds to a step S93, where the total mass GAIRT of air drawn into the combustion chamber during the present cycle is calculated by the use of Equation (11):

$$GAIRT = (\alpha \times Ti + \beta) \times AFG \times KTA \tag{11}$$

where Ti (=TiM×KEGR) represents the basic fuel injection period under the standard state, described above, α and β constants, AFG a stoichiometric air-fuel ratio of gasoline (which is approximately equal to 14.6) and KTA the intake air temperature-dependent correction coefficient. In calculating the total mass GAIRT of air by Equation (11), it is assumed that a fuel injection amount Y to be injected is linearly approximate to the basic fuel injection period Ti so that the latter can stand for the former. That is, in the above equation, it is assumed that the fuel injection amount Y can be expressed as (α×Ti+β).

Then, at steps S94 et seq., the mass (hereinafter referred to as "the air mass for butane") GAIRB of air to be consumed for combustion of butane, the mass (hereinafter referred to as "the air mass for gasoline") GAIRG of air to be consumed for combustion of gasoline, and the required fuel injection time period TREQ(k) are calculated for each cylinder.

More specifically, at a step S94, the air mass for butane GAIRB is calculated by the use of Equation (12):

$$GAIRB=(MAIR \times PGIN)/MBUT+(PGIN \times AFB)/KTOTAL(k) \quad (12)$$

where FLAIR represents the molecular weight (=28.8) of air, MBUT a molecular weight of butane (=57), AFB a stoichiometric air-fuel ratio (which is approximately equal to 15.5) of butane, and (1/KTOTAL(k)) the excess air ratio $\lambda$.

The first term (MAIR×PGIN)/MBUT on the right side represents the mass of air accompanying the mass PGIN of drawn-in butane, and the second term (PGIN× AFB)/KTOTAL(k)) on the right side represents the mass of air necessary for combustion of butane. The air mass for butane GAIRB to be consumed by combustion of butane is calculated by adding together these masses.

Further, at a step S95, the air mass GAIRG for butane is subtracted from the total air mass GAIRT to calculate the air mass for gasoline GAIRG by the use of Equation (13):

$$GAIRG=GAIRT-GAIRB \quad (13)$$

Then, finally at a step S96, the required fuel injection time period TREQ(k) is calculated, followed by terminating the routine and returning to the FIG. 5 main routine.

The required fuel injection time period TREQ(k) is considered to be substantially proportional to the required amount YREQ(k) of gasoline to be injected by the fuel injection valve 6, and hence the required amount GAIRG of air for combustion of gasoline is calculated, similarly to the step S93, by the use of Equation (14):

$$GAIRG=[(\alpha \times TREQ(k)+\beta) \times AFG]/KTOTAL(k) \quad (14)$$

From the Equation (14), Equation (15) is obtained, by the use of which the required fuel injection time period TREQ(k) can be calculated:

$$TREQ(k)=[(GAIRG \times KTOTAL(k))/AFG-\beta]/\alpha \quad (15)$$

Thus, the required amount of fuel to be supplied to the combustion chamber by injection during the present cycle is obtained as a function of the fuel injection time period.

(6) VPR determination (determination of the injected fuel decremental coefficient KPUN and the desired output voltage VHCMD from the flowmeter 46) (at the step S7 of FIG. 5)

FIG. 20 shows a VPR-determining routine, which is executed in synchronism with generation of each TDC signal pulse.

At steps S101 to S105, the injection fuel decremental coefficient KPUN is calculated. The injection fuel decremental coefficient decreases the amount of fuel (gasoline) to be injected by the fuel injection valve 6, in view of the fact that butane as evaporative fuel is purged into the intake pipe 2 from the canister 43. First, at a step S101, a basic injected fuel decremental coefficient KPUM is determined by retrieving a KPU map.

The KPU map is set, e.g. as shown in FIG. 21, such that map values KPUM(0,0) to KPUM(16,19) are provided in a manner corresponding to predetermined values PBA0 to PBA16 of the intake pipe absolute pressure PBA and predetermined values ME00 to ME19 of the reciprocal of the engine rotational speed NE. The basic injection fuel decremental coefficient KPUM is determined by retrieving the KPU map, and additionally by interpolation, if required. In this connection, the coefficient KPUM is set to "1" when the flag FBCAL is equal to "0" inhibit the butane mass calculation.

Then, at a step S102, an engine coolant temperature-dependent correction coefficient KPUTW is determined by retrieving a KPUTW table.

Figure 22:
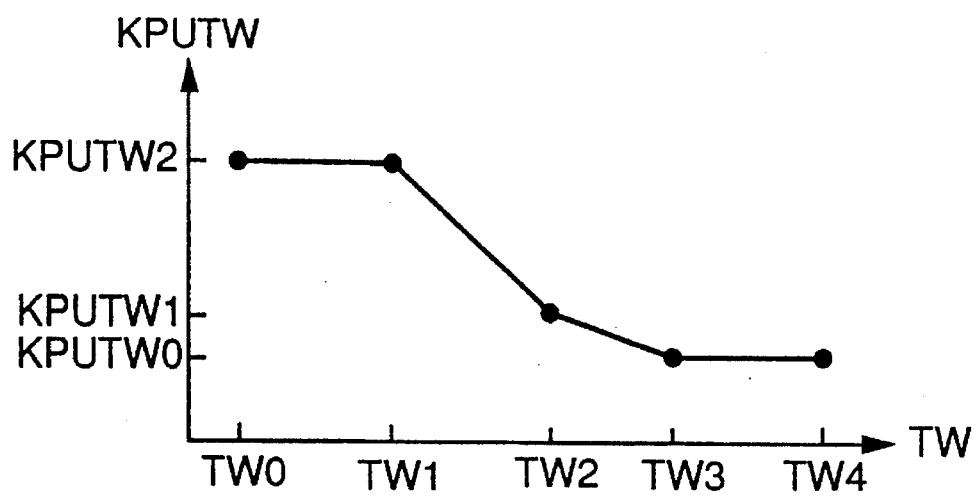
FIG. 22 shows a KPUTW table.

The KPUTW table is set, e.g. as shown in FIG. 22, such that table values KPUTW0 to KPUTW2 are provided in a manner corresponding to predetermined values TW0 to TW4 of the engine coolant temperature TW.

As shown in FIG. 22, according to the KPUTW table, the correction coefficient KPUTW is set to a larger value as the engine coolant temperature is lower, so as to allow a larger amount of fuel to be drawn into the combustion chamber, e.g. when the engine is started at a low temperature. The correction coefficient KPUTW is determined by retrieving the KPUTW table, and additionally by interpolation, if required. In this connection, the coefficient KPUTW is also set to "1" when the flag FBCAL is equal to "0".

Then, at a step S103, an after-start correction coefficient KPUAST is determined by retrieving a KPUAST table.

Figure 23:
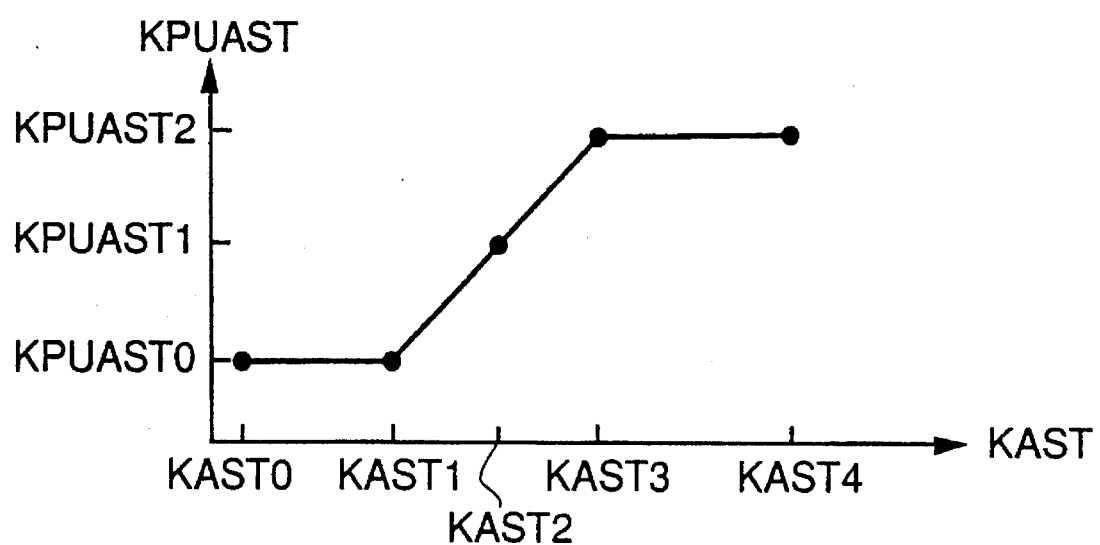
FIG. 23 shows a KPUAST table.

The KPUAST table is set, e.g. as shown in FIG. 23, such that table values KPUAST0 to KPUAST2 are provided in a manner corresponding to predetermined values KAST0 to KAST4 of an after-start enriching coefficient KAST. The after-start enriching coefficient KAST increases an amount of fuel supplied to the engine immediately after the start of the engine, which is set to a smaller value as time elapses after the start of the engine, and when the engine is in a normal operating condition, it is set to "1.0". As is clear from FIG. 23, when the after-start enriching coefficient KAST is large, i.e. when the fuel injection period is longer than at the start of the engine, the after-start correction coefficient KPUAST is set to a larger value. The after-start correction coefficient KPUAST is determined by retrieving the KPUAST table and additionally by interpolation, if required. In this connection, the correction coefficient KPUAST is set to "1" when FBCAL=0.

Then, at a step S104, a catalyst bed temperature-dependent correction coefficient KPUTC is determined by retrieving a KPUTC table.

Figure 24:
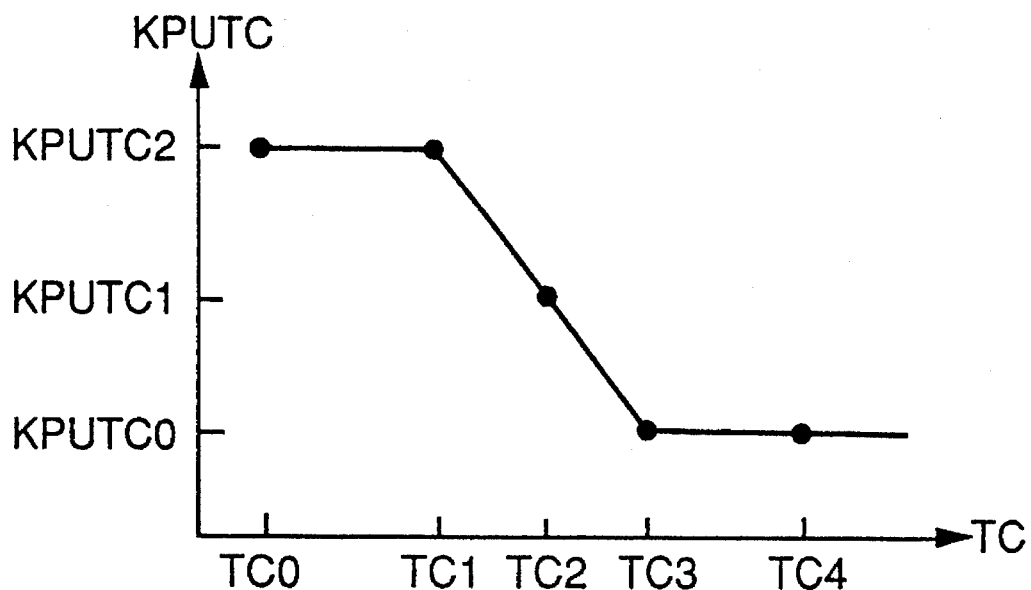
FIG. 24 shows a KPUTC table.

The KPUTC table is set, e.g. as shown in FIG. 24, such that table values KPUTC0 to KPUTC2 are provided in a manner corresponding to predetermined values TC0 to TC4 of the temperature TC of the catalyst bed. As shown in FIG. 24, according to the KPUTC table, the catalyst bed temperature-dependent correction coefficient KPUTC is set to a smaller value as the catalyst bed temperature TC increases so that the catalyst bed becomes more activated. This correction coefficient KPUTC is determined by retrieving the KPUTC table and additionally by interpolation, if required. This correction coefficient KPUTC is also set to "1" when FBCAL=0.

Then, at a step S105, the injection fuel decremental coefficient KPUN is obtained by multiplying the basic injection fuel decremental correction coefficient KPUM, the engine coolant temperature-dependent correction coefficient KPUTW, the after-start correction coefficient KPUAST, and the catalyst bed temperature-dependent correction coefficient KPUTC:

$$KPUN=KPUM \times KPUTW \times KPUAST \times KPUTC \quad (16)$$

Thus, except for the case where the flag FBCAL is equal to "0", i.e. when the butane mass calculation is inhibited, the engine temperature-dependent correction coefficient KPUTW, the after-start correction coefficient KPUAST and the catalyst bed temperature-dependent correction coefficient KPUTC are set to larger values immediately after the start of the engine than when the engine is in normal operation. Accordingly, a large amount of purged gas mainly composed of butane which is lighter than gasoline can be supplied to the combustion chamber immediately after the start of the engine at a low temperature, to thereby achieve excellent combustibility at a low engine temperature, and hence to achieve improved exhaust emission characteristics.

Then, at a step S106, limit check of an amount of gasoline injected by the fuel injection valve 6 is performed for the #1 cylinder as a representative of all the cylinders. More specifically, whether or not the valve opening period of the fuel injection valve 6 obtained by multiplying the required amount (Ti× KTOTAL(1)) of gasoline to be injected into the #1 cylinder by the injection fuel decremental correction coefficient KPUN is shorter than a predetermined lower value is determined by determining whether or not Equation (17) is satisfied:

$$Ti \times KTOTAL(1) \times KPUN < Be \times TWP(1) + Ae \times TiLIM \qquad (17)$$

The left side of the equation represents the fuel injection period from which a predetermined amount of fuel is subtracted, depending upon an amount of evaporative fuel, and the first term on the right side represents an amount of fuel carried off into the combustion chamber during the present cycle, out of the adhering fuel amount TPW, and the second term on the right side represents the minimum amount of fuel directly drawn into the combustion chamber out of the amount of fuel injected during the present cycle. Be represents a final carry off ratio of gasoline, which means the ratio of an amount of fuel carried off from fuel (gasoline) adhering to the inner wall surface of the intake pipe 2 and drawn into the combustion chamber during the present cycle, to an amount of the fuel adhering to the inner wall surface of the intake pipe 2. Ae represents a final direct supply ratio of gasoline, which means the ratio of an amount of fuel injected and directly drawn into the combustion chamber during the present cycle to an amount of fuel injected from the fuel injection valve 6 during the present cycle. These final carry-off ratio and direct supply ratio of gasoline are determined by an LPARA-determining routine described hereinafter with reference to FIG. 30. TWP represents an amount of fuel adhering to the inner wall surface of the intake pipe 2, which is determined by executing a TWP-determining routine hereinafter described with reference to FIG. 39. TiLIM represents a predetermined lower limit value, which is a lower limit of the fuel injection period below which the linear relationship between the fuel injection period and the fuel injection amount Y is no longer maintained. More specifically, the fuel injection period is normally linear to the fuel injection amount. However, if the fuel injection period becomes extremely short, the above-mentioned linear relationship cannot be maintained any longer, so that the fuel injection amount may become uncontrollable. To avoid this inconvenience, the predetermined lower limit TiLIM is set to the lower limit of the fuel injection period below which the linear relationship between the fuel injection time period and the fuel injection amount Y cannot be maintained.

If Equation (17) is satisfied, the lower limit of the injection fuel decremental correction coefficient KPUN is calculated by the use of Equation (18) at a step S107:

$$KPUN = (Be \times TWP(1) + Ae \times TiLIM)/(Ti \times KTOTAL(1)) \qquad (18)$$

Then, at a step S108, it is determined whether or not the injection fuel decremental correction coefficient KPUN is equal to "1". If KPUN is equal to "1", it means that the flag FBCAL is equal to "0" to inhibit the butane mass calculation, so that a desired flow rate QBUCMD of butane is set to "0" at a step S109, followed by the program proceeding to a step S111.

On the other hand, if KPUN is not equal to "1", the program proceeds to a step S110, where the desired flow rate QBUCMD of butane as evaporative fuel, i.e. a desired flow rate of butane per unit time is calculated by the use of Equation (19):

$$QBUCMD = (Ti \times \alpha + \beta) \times KTOTAL(1) \times (1 - KPUN) \times (AFG/AFB) \times (1/ME) \times (1/DBU) \qquad (19)$$

Then, at a step S111, a desired output voltage VHCMD from the flowmeter 46 is determined by retrieving a VHCMD table.

Figure 25:
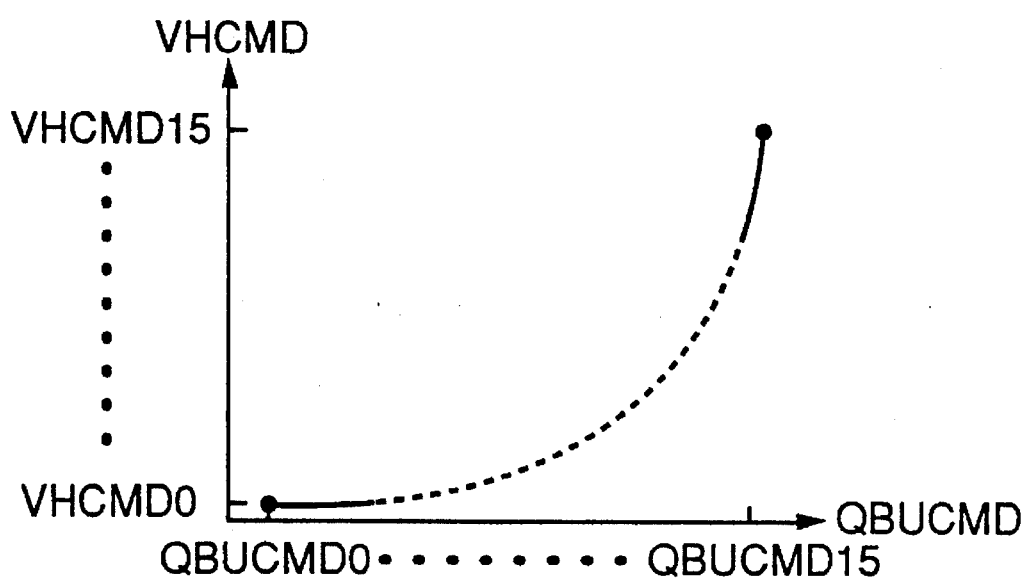
FIG. 25 shows a VHCMD table.

The VHCMD table is set, e.g. as shown in FIG. 25, such that table values VHCMD0 to VHCMD15 are provided in a manner corresponding to predetermined values QBUCMD0 to QBUCMD15 of the desired flow rate QBUCMD. The desired output voltage VHCMD from the flowmeter 46 is determined by retrieving the VHCMD table, and additionally by interpolation, if required.

Thus, the flow rate of purged gas is feedback-controlled based on the desired output voltage VHCMD from the flowmeter 46, enabling the canister 43 to maintain the desired adsorbing capability thereof without suffering supersaturation.

(7) Determination of the valve lift command value LPUCMD (at the step S8 of FIG. 5)

Figure 26:
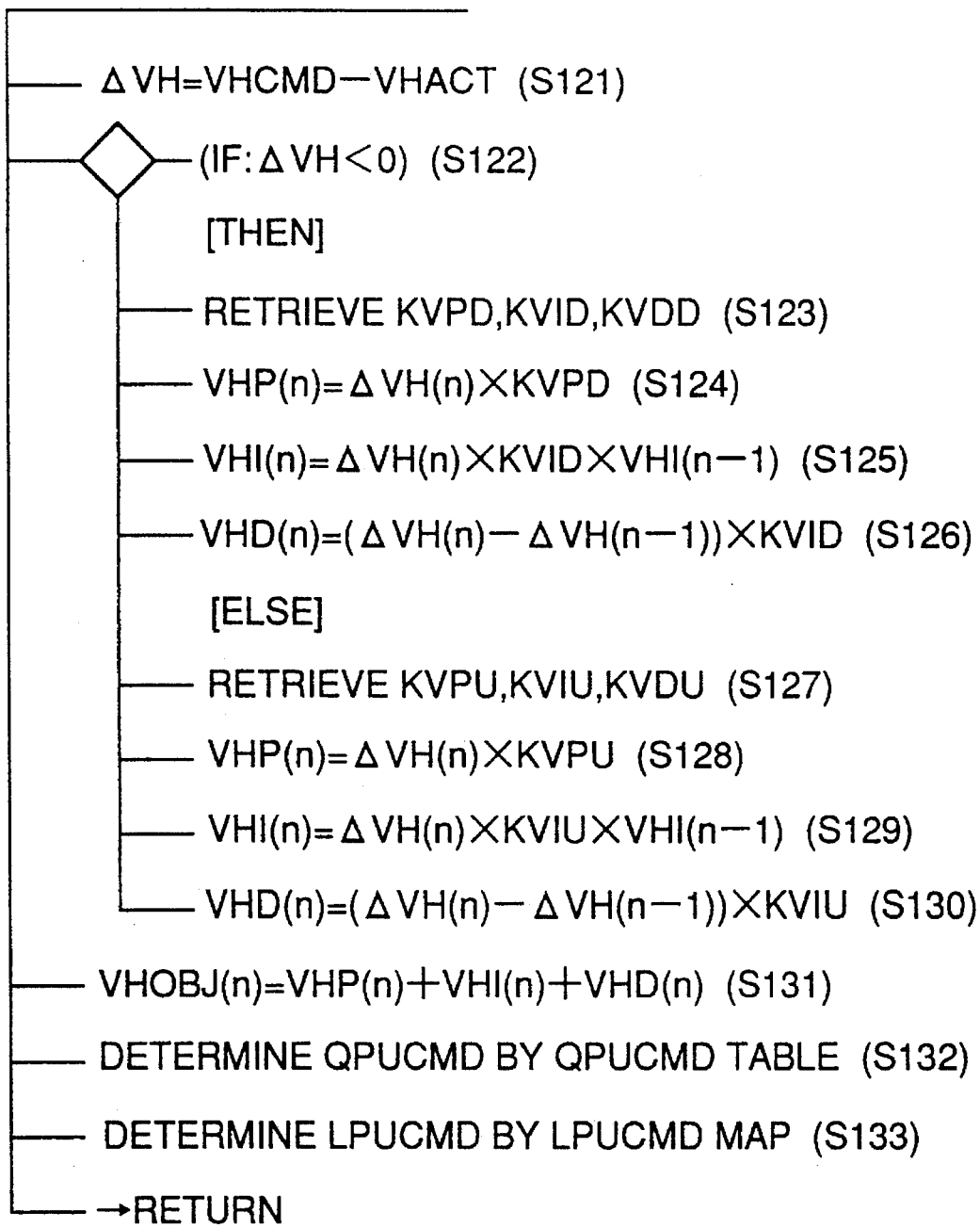
FIG. 26 shows a flowchart of a LPUCMD-determining routine.

FIG. 26 shows the aforementioned LPUCMD-determining routine, which is executed in synchronism with generation of each TDC signal pulse.

First, at a step S121, there is calculated a difference ΔVH between the desired output voltage VHCMD (obtained at the step S111 of FIG. 20) and the output voltage (detected output voltage) VHACT from the flowmeter 46. Then, at a step S122, it is determined whether or not the difference ΔVH is lower than "0".

This determination contemplates a difference in the valve opening characteristic between when the purge control valve 47 is controlled to increase the flow rate of purged gas and when it is controlled to decrease same. The difference ΔVH results from the use of a spring, not shown, which urges the valving element 48 of the purge control valve 47 in a valve-closing direction. Accordingly, depending on the difference Δ VH, different rates of change (gain) of the valve lift command value LPUCMD are calculated to feedback-controL the flow rate of purged gas.

More specifically, when the difference ΔVH is smaller than "0", i.e. when the purge control valve 47 is controlled in a flow rate-decreasing direction, determinations are made of control parameters for determining a rate of change in the valve lift command value LPUCMD, i.e. a proportional term (P-term) correction coefficient KVPD, an integral term (I-term) correction coefficient KVID, and a differential term (D-term) correction coefficient KVDD, for decreasing the flow rate of purged gas, at a step S123 by retrieving a KVPD map, a KVID map, and a KVDD map. The KVPD map, the KVID map, and the KVDD map are each set such that predetermined map values are provided in a manner corresponding to predetermined values of the engine rotational speed NE and predetermined values of the intake pipe absolute pressure PBA. These control parameters are determined by retrieving these maps according to these operating parameters of the engine, and additionally by interpolation, if required.

Then, at steps S124 to S126, desired correction values VHP(n), VHI(n), and VHD(n) for the P-term, I-term, and D-term are calculated by the use of Equations (20) to (22), respectively:

$$VHP(n) = \Delta VH(n) \times KVPD \quad (20)$$

$$VHI(n) = \Delta VH(n) \times KVID + VHI(n-1) \quad (21)$$

$$VHD(n) = (\Delta VH(n) - \Delta VH(n-1)) \times KVDD \quad (22)$$

On the other hand, if the difference $\Delta VH$ is equal to or larger than "0", the program proceeds to a step S127, where determinations are made of control parameters for determining a rate of change in the valve lift command value LPUCMD, i.e. a proportional term (P-term) correction coefficient KVPU, an integral term (I-term) correction coefficient KVIU, and a differential term (D-term) correction coefficient KVDU, for increasing the flow rate of purged gas, by retrieving a KVPU map, a KVIU map, and a KVDU map. The KVPU map, the KVIU map, and the KVDU map are each set, similarly to the above KVPD map, KVID map and KVDD map, such that predetermined map values are provided in a manner corresponding to predetermined values of the engine rotational speed NE and predetermined values of the intake pipe absolute pressure PBA. These control parameters are determined by retrieving these maps according to the operating parameters of the engine, and additionally by interpolation, if required.

Then, at steps S128 to S130, desired correction values VHP(n), VHI(n), and VHD(n) for the P-term, I-term, and D-term are calculated by the use of Equations (23) to (25), respectively:

$$VHP(n) = \Delta VH(n) \times KVPU \quad (23)$$

$$VHI(n) = \Delta VH(n) \times KVIU + VHI(n-1) \quad (24)$$

$$VHD(n) = (\Delta VH(n) - \Delta VH(n-1)) \times KVDU \quad (25)$$

Then, at a step S131, a desired correction value VHOBJ(n) of the output voltage from the flowmeter 46 is calculated by adding together these desired correction values VHP(n), VHI(n), and VHD(n) by the use of Equation (26):

$$VHOBJ(n) = VHP(n) + VHI(n) + VHD(n) \quad (26)$$

Then, at a step S132, a desired purging flow rate QPUCMD is determined by retrieving a QPUCMD table.

Figure 27:
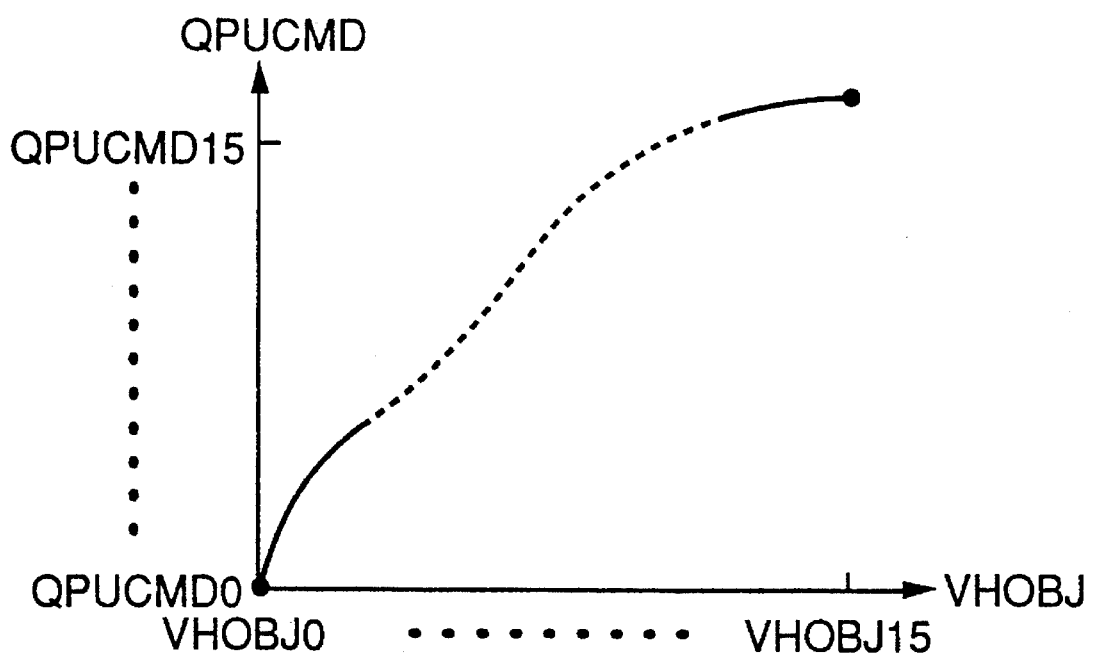
FIG. 27 shows a QPUCMD table.

The QPUCMD table is seE, e.g. shown in FIG. 27, such that table values QPUCMD0 to QPUCMD15 are provided in a manner corresponding to predetermined values VHOBJ0 to VHOBJ15 of the above desired correction value VHOBJ. The desired purging flow rate QPUCMD is determined by retrieving the QPUCMD table and additionally by interpolation, if required.

Then, at a step S133, the valve lift command value LPUCMD for the purge control valve 47 is determined by retrieving an LPUCMD map, followed by terminating the program.

The LPUCMD map is set, e.g. as shown in FIG. 28, such that map values LPUCMD(00,00) to LPUCMD(15,15) are provided in a manner corresponding to predetermined values PBA00 to PBA15 of the intake pipe absolute pressure PBA and predetermined values QPUCMD00 to QAPUCMD15 of the desired purging flow rate. The valve lift command value LPUCMD is determined by retrieving the LPUCMD map, and additionally by interpolation, if required.

Thus, the valve lift command value LPUCMD is determined based on the desired purging flow rate QPUCMD, whereby the valving element 48 is lifted to open the purge control valve 47 according to the valve lift command value LPUCMD to allow a desired amount of purged gas to be supplied to the engine.

[A] Adhering fuel-dependent correction processing

The required fuel injection period TREQ(k) (see FIG. 19) determined by the evaporative fuel processing described heretofore does not take into account the influence of an amount of gasoline as injected fuel adhering to the inner wall surface of the intake pipe 2 before being supplied to the combustion chamber. Therefore, a desired fuel injection period TNET(k) must be determined with the adhering fuel taken into consideration.

Next, the adhering fuel-dependent correction processing will be described in detail.

Figure 29:
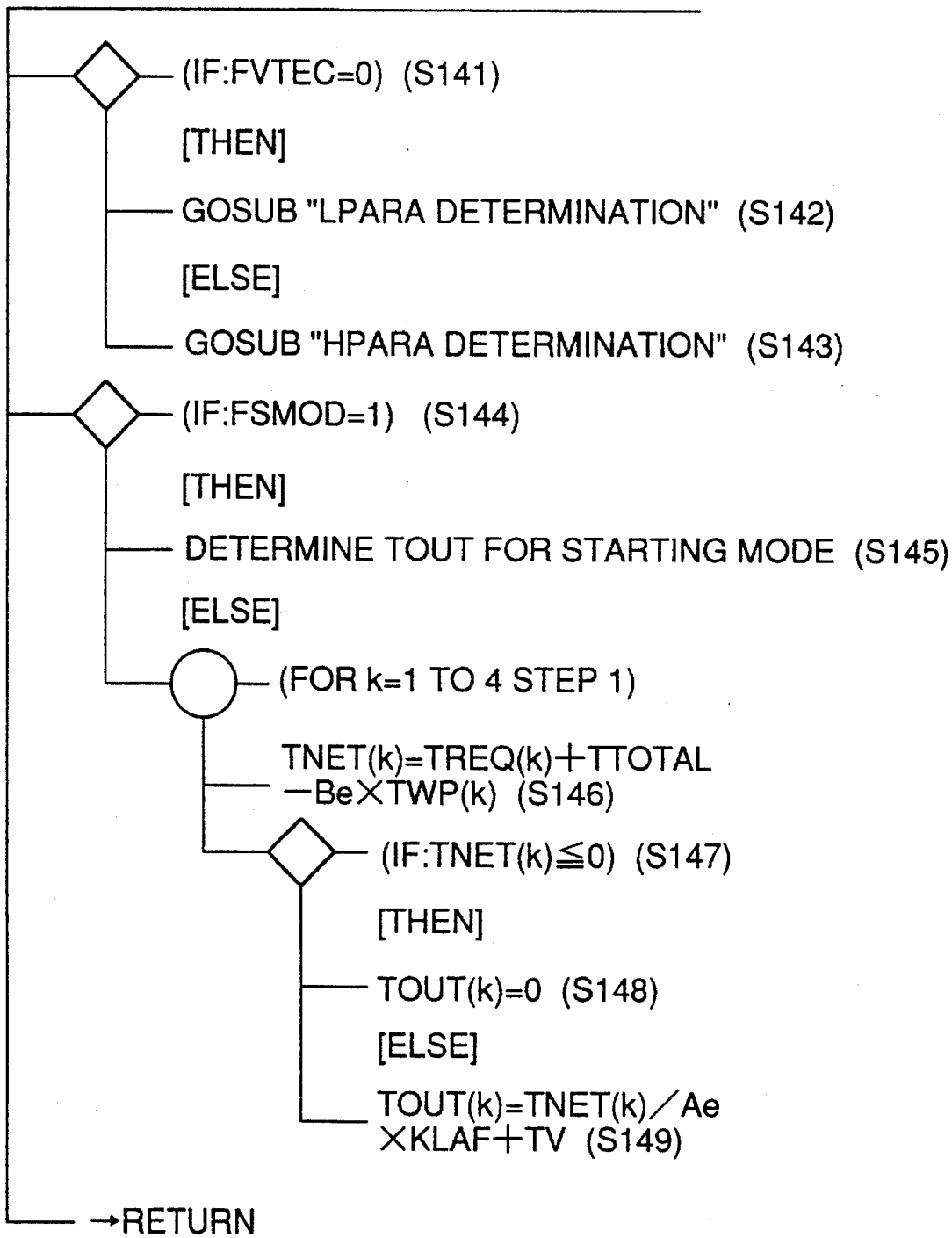
FIG. 29 shows a flowchart of an adhering fuel-dependent correction routine.

FIG. 29 shows a routine for carrying out the adhering fuel-dependent correction processing, which is executed in synchronism with generation of each TDC signal pulse.

First, at a step S141, it is determined whether or not a flag FVTEC is equal to "0", i.e. whether the valve timing is selected to the low speed V/T. If FVTEC=0, i.e. if it is determined that the valve timing is selected to the low speed V/T, the LPARA-determining routine is performed to determine adhering fuel-determining parameters suitable for the low speed V/T, i.e. a value of the final direct supply ratio Ae and a value of the final carry-off ratio Be of gasoline as injected fuel for use in fuel injection control during the low speed V/T.

FIG. 30 shows an LPARA-determining routine for determining the above-mentioned adhering fuel-determining parameters, which is executed in synchronism with generation of each TDC signal pulse.

First, at a step S151, a basic direct supply ratio A is determined by retrieving an A map.

The A map is set, e.g. as shown in FIG. 31, such that map values A(0,0) to A(6,6) are provided in a manner corresponding to predetermined values PBA0 to PBA6 of the intake pipe absolute pressure PBA and predetermined values TW0 to TW6 of the engine coolant temperature TW. The basic direct supply ratio A is determined by retrieving the A map, and additionally by interpolation, if required.

Then, at a step S152, a basic carry-off ratio B is determined by retrieving a B map.

The B map is set similarly to the A map, e.g. as shown in FIG. 32, such that map values B(0,0) to B(6,6) are provided in a manner corresponding to predetermined values PBA0 to PBA6 of the intake pipe absolute pressure PBA and predetermined values TW0 to TW6 of the engine coolant temperature TW. The basic carry-off ratio B is determined by retrieving the B map, and additionally by interpolation, if required.

Then, at a step S153, an engine speed-dependent correction coefficient KA for the final direct supply Ae is determined by retrieving a KA table.

Figure 33:
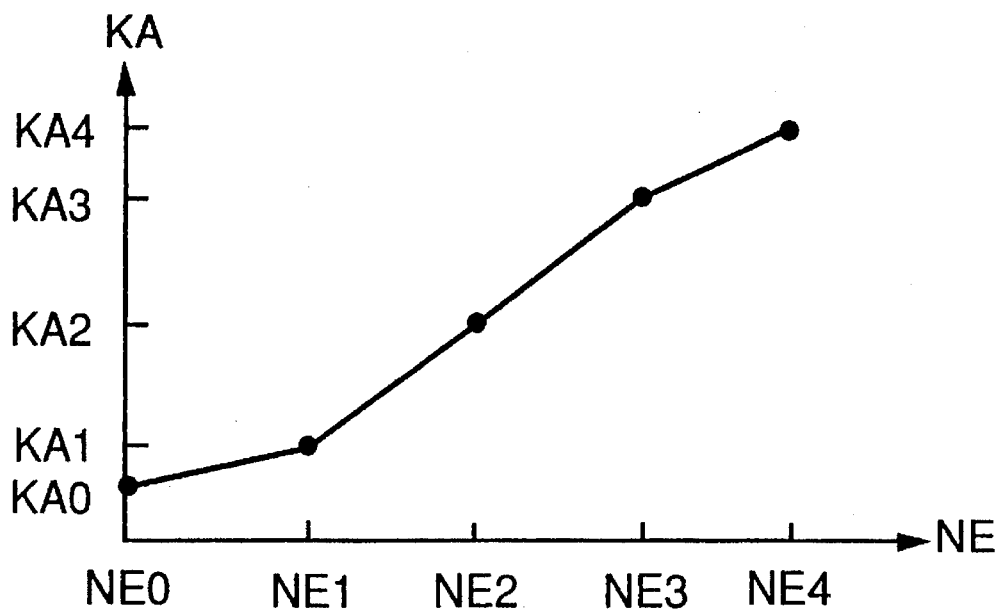
FIG. 33 shows a KA table.

The KA table is set, e.g. as shown in FIG. 33, such that table values KA0 to KA4 are provided in a manner corresponding to predetermined values NE0 to NE4 of the engine rotational speed NE. The engine speed-dependent correction coefficient KA is determined by retrieving the KA table, and additionally by interpolation, if required.

Then, at a step S154, an engine speed-dependent correction coefficient KB for the final carry-off ratio Be is determined by retrieving a KB table.

Figure 34:
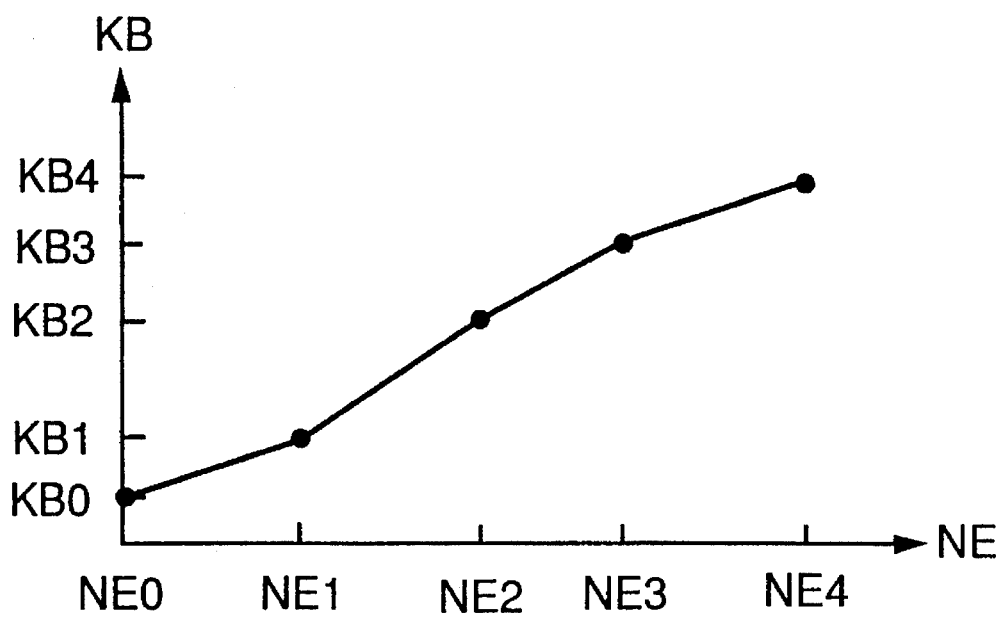
FIG. 34 shows a KB table.

The KB table is set similarly to the KA table, e.g. as shown in FIG. 34, such that table values KB0 to KB4 are provided in a manner corresponding to predetermined values NE0 to NE4 of the engine rotational speed NE. The engine speed-dependent correction coefficient KB is determined by retrieving the KB table, and additionally by interpolation, if required.

Then, at a step S155, it is determined whether or not a flag FEGR is equal to "1", i.e. whether or not the engine is in an EGR-performing region. Whether the engine is in the EGR-performing region is determined by determining whether the engine coolant temperature TW is above a predetermined value to be assumed when the engine has been warmed up, more specifically, by executing an EGR-performing region-determining routine. If FEGR=1, i.e. if the engine is determined to be in the EGR-performing region, the program proceeds to a step S156, where an EGR-dependent correction coefficient KEA for the final direct supply ratio Ae is determined by retrieving a KEA map.

The KEA map is set, e.g. as shown in FIG. 35, such that map values KEA(0,0) to KEA(6,4) are provided in a manner corresponding to predetermined values PBA0 to PBA6 of the intake pipe absolute pressure PBA and predetermined values KEGR0 to KEGR4 of the EGR-dependent correction coefficient KEGR. The EGR-dependent correction coefficient KEA is determined by retrieving the KEA map, and additionally by interpolation, if required.

Then, at a step S157, an EGR-dependent correction coefficient KEB for the final carry-off ratio Be is determined by retrieving a KEB map.

The KEB map is set, e.g. as shown in FIG. 36, such that map values KEB(0,0) to KEB(6,4) are provided in a manner corresponding to predetermined values PBA0 to PBA6 of the intake pipe absolute pressure PBA and predetermined values KEGR0 to KEGR4 of the EGR-dependent correction coefficient KEGR. The EGR-dependent correction coefficient KEB is determined by retrieving the KEB map, and additionally by interpolation, if required.

If FEGR=0, i.e. if it is determined that the engine is not in the EGR-performing region, the EGR-dependent correction coefficients KEA, KEB are both set to "1.0" at steps S158 and S159, respectively.

Then, the program proceeds to a step S160, where it is determined whether the flag FBCAL is equal to "1", i.e. whether the control system is in the butane mass-calculating mode. If FBCAL=1, i.e. if the control system is in the butane mass-calculating mode in which butane as evaporative fuel is supplied to the intake pipe 2 via the purging passage 9, the program proceeds to a step S161, where an injection fuel ratio KPUG, i.e. the ratio of the required fuel injection period TREQ to a fuel injection period (Ti×KTOTAL) required when the purging flow rate is equal to "0" is calculated by the use of Equation (27):

$$KPUG=TREQ(1)/(Ti\times KTOTAL(1)) \quad (27)$$

In the equation, (1) represents the #1 cylinder, i.e. this calculation is carried out only for the #1 cylinder as a representative of all the four cylinders.

Then, at steps S162 and S163, butane-dependent correction coefficients KVA and KVB for the final direct supply ratio Ae and the final carry-off ratio Be are calculated. These correction coefficients are employed to compensate for a variation in the fluid properties of injected fuel or gasoline (gasoline) due to the fact that butane is mixed with air in the intake pipe in various concentrations. That is, these correction coefficients correct the direct supply ratio and the carry-off supply ratio in a manner responsive to a change in dynamic characteristics of injected fuel (gasoline) caused by inclusion of butane.

More specifically, at a step S162, the butane-dependent correction coefficient KVA for the final direct supply ratio Ae is determined by retrieving a KVA table.

Figure 37:
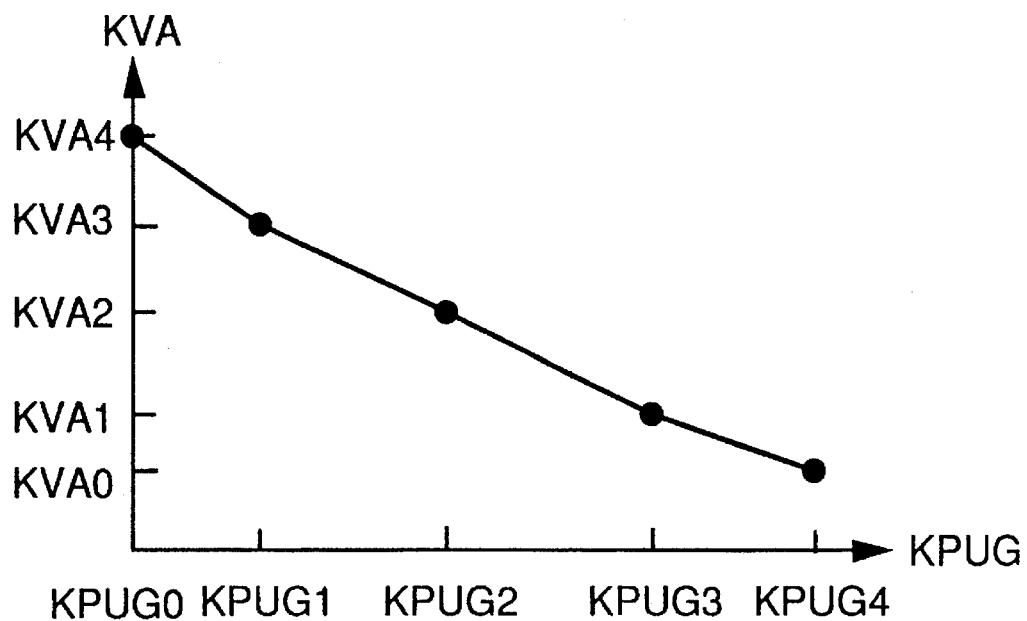
FIG. 37 shows a KVA table.

The KVA table is set, e.g. as shown in FIG. 37, such that table values KVA0 to KVA4 are provided in a manner corresponding to predetermined values KPUG0 to KPUG4. The butane correction coefficient KVA is determined by retrieving the KVA table, and additionally by interpolation, if required.

Then, at a step S163, the butane-dependent correction coefficient KVB for the final carry-off ratio Be is determined by retrieving a KVB table.

Figure 38:
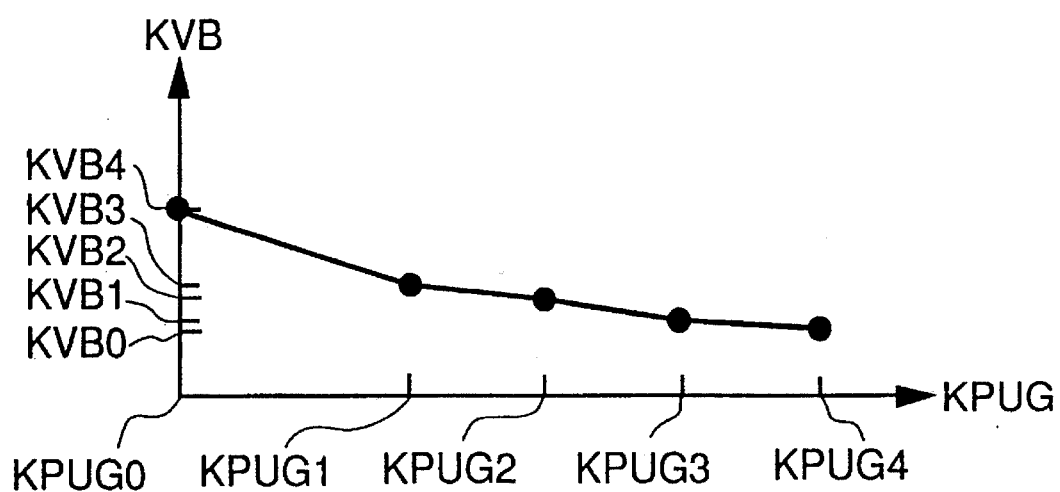
FIG. 38 shows a KVB table.

The KVB table is set, e.g. as shown in FIG. 38, such that table values KVB0 to KVB4 are provided in a manner corresponding to predetermined values KPUG0 to KPUG4 of the injected fuel ratio KPUG. The butane correction coefficient KVB is determined by retrieving the KVB table and additionally by interpolation, if required.

On the other hand, if the flag FBCAL is equal to "0", which means that the control system is in a butane mass calculation-inhibiting mode in which no butane or evaporative fuel is purged into the intake pipe 2. Therefore, the butane-dependent correction coefficients KVA and KVB are both set to "1.0" at steps S164 and S165, respectively.

Then, at steps S166 and S167, the final direct supply ratio Ae and the final carry-off ratio Be are calculated by the use of Equations (28) and (29), respectively, followed by terminating the routine and returning to the FIG. 29 main routine:

$$Ae=A\times KA\times KEA\times KVA \quad (28)$$

$$Be=B\times KB\times KEB\times KVB \quad (29)$$

Then, if it is determined at the step S141 of FIG. 29 that the flag FVTEC is equal to "1". The program proceeds to a step S143, where a HPARA-determining routine, not shown, is executed to determine adhering fuel-determining parameters suitable for the high speed V/T, i.e. a value of the final direct supply ratio Ae and a value of the final carry-off ratio Be of gasoline as injected fuel for use in fuel injection control during the high speed V/T.

Then, the program proceeds to a step S144, where it is determined whether or not a flag FSMOD is equal to "1". If FSMOD=1, it is judged that the engine is in the starting mode, and then the program proceeds to a step S145, where a final fuel injection period TOUT suitable for the starting mode is calculated by the use of Equation (30):

$$TOUT=TiCR\times K1+K2 \quad (30)$$

where TiCR represents a basic fuel injection period suitable for the starting mode, which is determined, similarly to the aforementioned TiM value, according to the engine rotational speed NE and the intake pipe absolute pressure PBA. A TiCR map used for determining a TiCR value is stored into the ROM of the memory means 5c.

K1 and K2 represent other correction coefficients and correction variables, respectively, which are set depending on operating conditions of the engine to such values as optimize operating characteristics of the engine, such as fuel consumption and accelerability.

On the other hand, if the flag FSMOD is equal to "0", i.e. if the engine is in the basic operating mode, steps S146 et seq. are executed for each of the cylinders (#CYL to #4CYL).

More specifically, first, with respect to the #1 cylinder, the desired fuel injection period TNET(k) is calculated by the use of Equation (31).

$$TNET(k)=TREQ(k)+TTOTAL-Be\times TWP(k) \quad (31)$$

where TTOTAL represents the sum of all addend correction coefficients (e.g. atmospheric pressure-dependent correction coefficient TPA) which are determined based on engine operating parameter signals from various sensors. However, a so-called ineffective time period TV elapsed before the fuel injection valve 6 opens is not included therein. TWP(k) represents an amount (estimated) of fuel adhering to the inner wall surface of the intake pipe 2 calculated according to a routine described hereinafter with reference to FIG. 39, and hence (Be×TWP(k)) represents an amount of fuel carried off from the adhering fuel into the combustion chamber. This carried-off amount of the adhering fuel need not be newly supplied by injection, and hence is subtracted from the required amount of fuel TREQ(k) according to Equation (31).

At a step S147, it is determined whether or not the desired fuel injection period TNET(k) is smaller than "0". If TNET≦0, the final fuel injection period TOUT is set to "0" to forcibly interrupt the fuel supply at a step S148, followed by terminating the program. If TNET>0, the final fuel injection period TOUT is calculated by the use of Equation (32):

$$TOUT(k)=TNET(k)/(Ae \times KLAF)+TV \qquad (32)$$

where KLAF represents an air-fuel ratio correction coefficient determined based on the output from the LAF sensor 24, and TV the aforementioned ineffective time period of the fuel injection valve 6.

By opening the fuel injection valve 6 over the final fuel injection period TOUT calculated by Equation (32), fuel is supplied to the combustion chamber in an amount of (TNET(k)×KLAF+Be×TWP(k)).

Thus, the fuel injection period is calculated for the #1 cylinder, and then the steps S146 to S149 are carried out similarly for the #2 cylinder to #4 cylinder as well to determine the final fuel injection period TOUT for all the cylinders.

Figure 39:
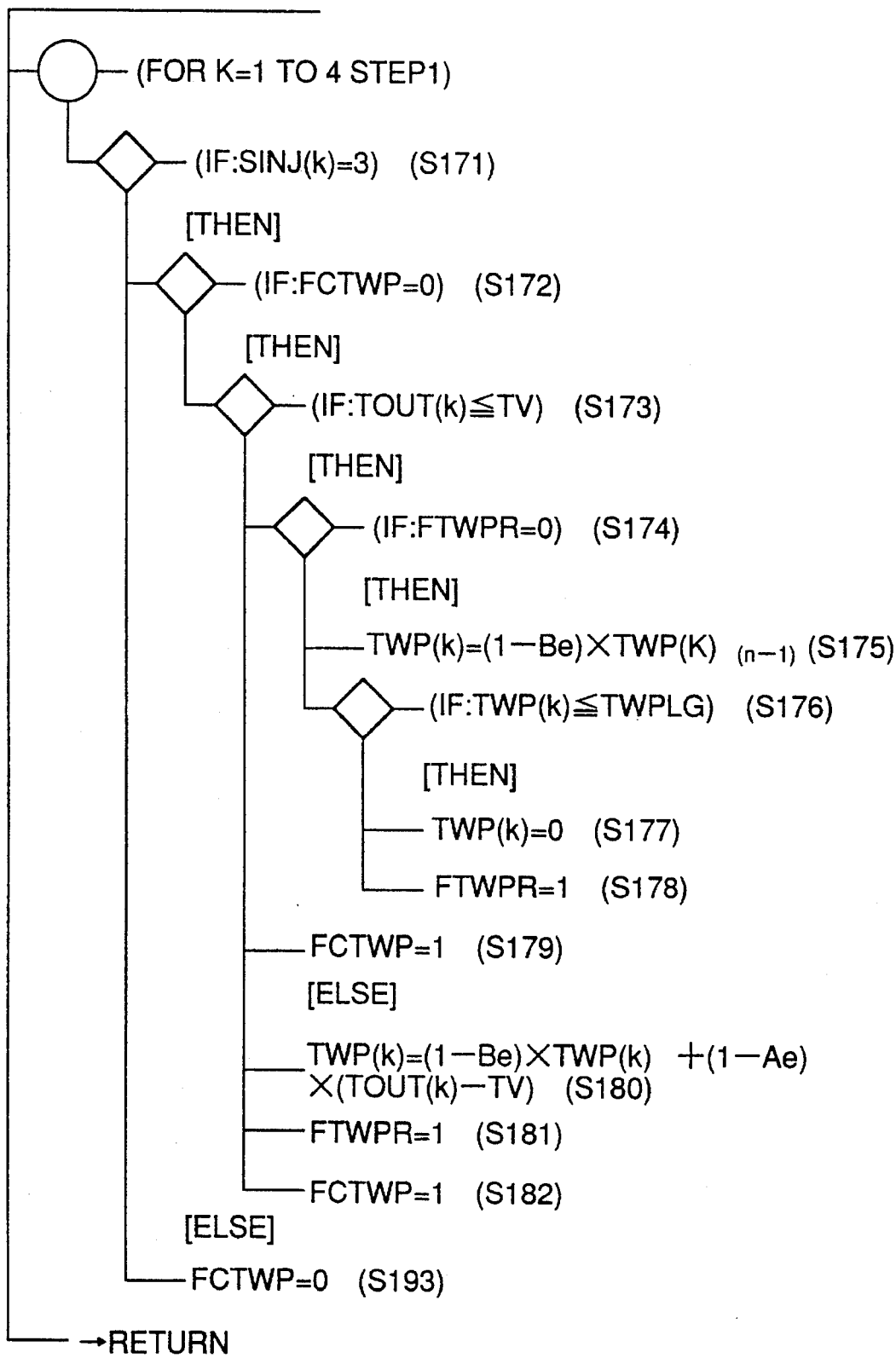
FIG. 39 shows a flowchart of a TWP-determining routine.

FIG. 39 shows a TWP-determining routine for determining the amount TWP of adhering fuel, which is executed for each cylinder whenever the crankshaft rotates through a predetermined angle (e.g. 30 degrees).

First, it is determined at a step S171 whether or not the status number SINJ(k) (see FIG. 4) is equal to "3", which indicates termination of fuel injection.

If SINJ(k) is not equal to 3, a calculation-permitting flag FCTWP is set to "0" to allow the calculation of the adhering amount TWP to be started in a subsequent loop, whereas if SINJ is equal to 3, it is determined at a step S172 whether or not the flag FCTWP is equal to "0". If FCTWP is equal to "0", it is determined at a step S173 whether or not the final fuel injection period TOUT(k) is smaller than the ineffective time period TV. If TOUT(k)≦TV, which means that no fuel is to be injected, it is determined at a step S174 whether or not a flag FTWPR is equal to "0", which means that the adhering amount TWP(k) of fuel is not negligible or zero. If FTWPR is equal to "0" and hence the adhering amount TWP of fuel is not negligible or zero, the program proceeds to a step S175, where the adhering amount TWP(k) of fuel in the present loop is calculated by the use of Equation (33):

$$TWP(k)=(1-Be) \times TWP(k)(n-1) \qquad (33)$$

where TWP(k)(n−1) represents an adhering amount of fuel calculated in the immediately preceding loop.

Then, it is determined at a step S176, whether or not the adhering amount TWP(k) of fuel is equal to or smaller than a predetermined very small value TWPLG. If TWP(k)≦TWPLG, it is judged that the adhering amount TWP(k) is negligible or zero, so that the adhering amount TWP(k) is set to "0" and the flag FTWPR is set to "1" at a step S178. Then, at a step S179, the flag FCTWP is set to "1" to indicate completion of the calculation of the adhering amount TWP of fuel, followed by terminating the program.

On the other hand, if TOUT(k)>TV at the step S173, which means that fuel is to be injected, so that the program proceeds to a step S180, where the adhering amount TWP(k) is calculated by the use of Equation (34):

$$TWP(n)=(1-Be) \times TWP(k)(n-1)= (1-Ae) \times (TOUT(k)-TV) \qquad (34)$$

where TWP(k)(n−1) represents the immediately preceding value of the adhering amount TWP(k). The first term on the right side represents an amount of fuel which has not been carried off from the adhering fuel and remains on the inner wall surface of the intake pipe during the present cycle, and the second term on the right side represents an amount of fuel corresponding to a portion of injected fuel which has not been drawn into the combustion chamber and newly adhered to the inner wall surface of the intake pipe 2.

Then, the flag FTWPR is set to "1" to indicate that the adhering amount TWP of fuel is still present at a step S181, and further the flag FCTWP is set to "1" to indicate completion of the calculation of the adhering amount TWP of fuel at a step S182, followed by terminating the program.

[II] Air-fuel ratio control

Figure 40:
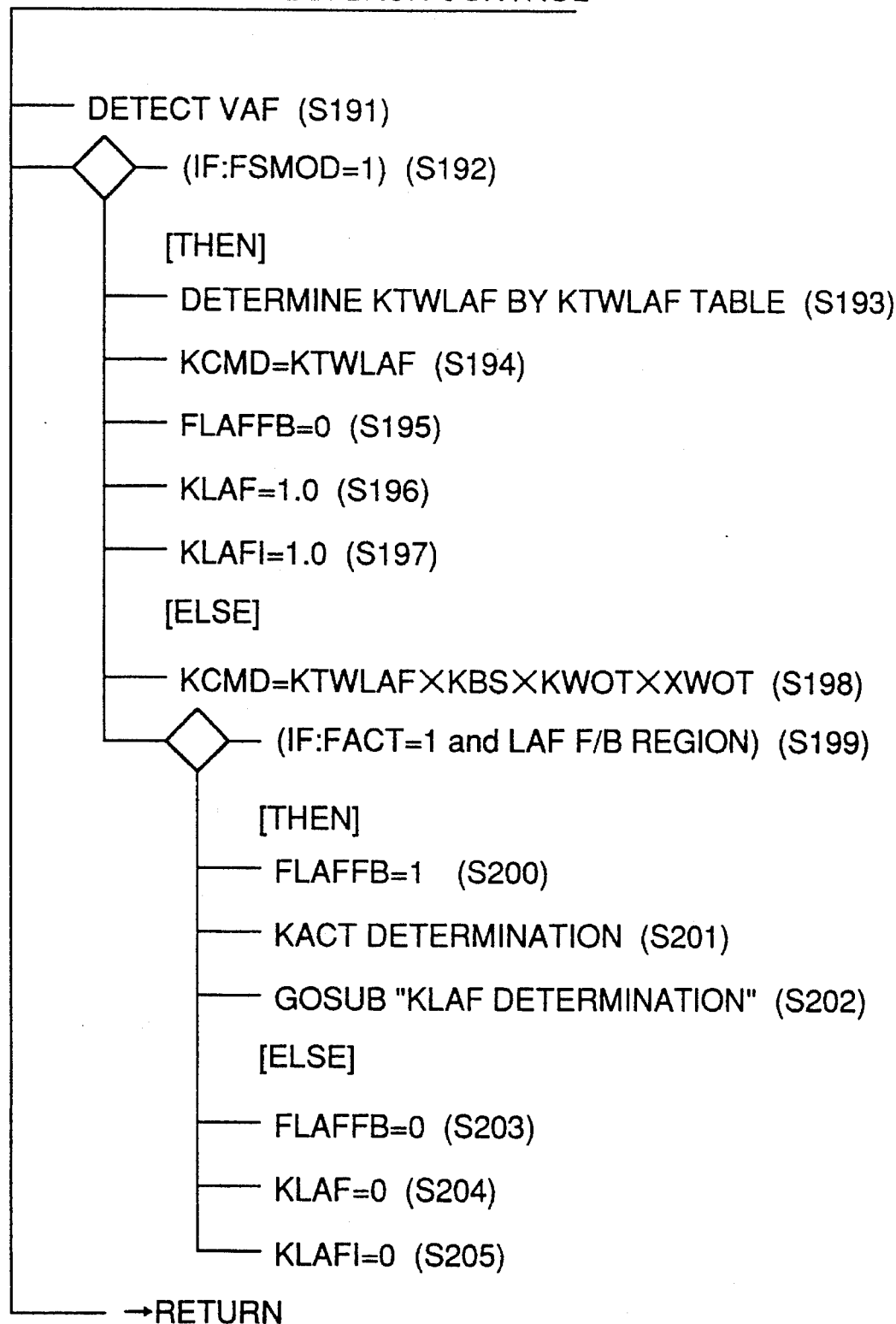
FIG. 40 shows a flowchart of an air-fuel ratio feedback control routine.

FIG. 40 shows an air-fuel ratio feedback control routine, which is executed in synchronism with generation of each TDC signal pulse.

First, at a step 191, the output voltage VAF from the LAF sensor 24 is read, and then at a step 192, it is determined whether or not the flag FSMOD is equal to "1", i.e. whether the engine is in the starting mode. If FSMOD is equal to "1", i.e. if the engine is in the starting mode in which the engine is at a low temperature, a desired air-fuel ratio coefficient KTWLAF for low engine temperature is determined at a step S193 by retrieving a TKWLAF map according to the engine coolant temperature TW and the intake pipe absolute pressure PBA, and then a KTWLAF value is set to a desired air fuel ratio coefficient KCMD at a step S194. Then, a flag FLAFFB is set to "0" to inhibit the air-fuel ratio feedback control at a step S195, and an air-fuel ratio correction coefficient KLAF and an integral term (I-term) KLAFI thereof are both set to "1.0" at respective steps S196 and S197, followed by terminating the program.

On the other hand, if FSMOD is not equal to "1" at the step S192, i.e. if the engine is in the basic operating mode, the desired air-fuel ratio coefficient KCMD is determined in a manner responsive to engine operating conditions by the use of Equation (35):

$$KCMD=KTWLAF \times KBS \times KWOT \times XWOT \qquad (35)$$

where KBS represents a correction coefficient for correcting the air-fuel ratio according to a selected shift gear position of a transmission, not shown, connected to the engine such as a fifth speed position, a fourth speed position, or a third speed position, KWOT a correction coefficient for enriching the air-fuel ratio when the engine is in a wide-open-throttle operating condition in which an accelerator pedal, not shown, is fully stepped on, and XWOT a correction coefficient for increasing the amount of fuel to cool the engine when the engine coolant temperature is high.

Then, it is determined at a step S199 whether or not a flag FACT is equal to "1" and at the same time the engine is in a region suitable for preforming the air-fuel ratio feedback control. The flag FACT is set to "1" when the LAF sensor 24 has been activated. When the engine is in the region suitable for performing the feedback control, it means that it is in a region other than a predetermined low temperature region, a predetermined high temperature region, a predetermined low engine speed region, a predetermined high engine speed region, a leaning region, and a fuel cut region at deceleration.

If the flag FACT is equal to "1" and at the same time the engine is in the region suitable for the air-fuel ratio feedback control, the flag FLAFFB is set to "1" at a step S200 to indicate that the air-fuel ratio feedback control is permitted.

Then, at a step S201, a calculation is made of an equivalent ratio KACT (14.7/(A/F); hereinafter referred to as "the detected air-fuel ratio coefficient") of the air-fuel ratio (A/F) detected based on the output voltage VAF from the LAF sensor 24 which is read at the step S191. Then, at a step S202, a KLAF-determining routine, described hereinafter with reference to FIG. 41, is executed to determine the air-fuel ratio correction coefficient KLAF, followed by terminating the program.

On the other hand, if it is determined at the step S199 that the LAF sensor 24 has not been activated (FACT≠1) or the engine is not in the region suitable for performing the feedback control, the program proceeds to a step S203, where the flag FLAFFB is set to "0" and the air-fuel ratio correction coefficient KLAF and the I-term thereof KLAFI are both set to "1.0" at steps S204 and S205, respectively, followed by terminating the program.

FIG. 41 shows details of the KLAF-determining routine executed at the step S202 of the FIG. 40 routine, which is executed in synchronism with generation of each TDC signal pulse.

At a step S211, a calculation is made of a difference ΔKAF between the immediately preceding value KCMD(n−1) of the desired air-fuel ratio KCMD and the present value KACT(n) of the detected air-fuel ratio coefficient KACT.

Then, at a step S212, it is determined whether or not the flag FLAFFB was equal to "0" in the immediately preceding loop, i.e. whether or not the air-fuel ratio feedback control was inhibited in the immediately preceding loop. If the flag FLAFFB was equal to "0" in the immediately preceding loop, i.e. if the air-fuel ratio feedback control was not carried out in the immediately preceding loop, the program proceeds to a step S213, where the immediately preceding value KAF(n−1) of the difference ΔKAF is set to the present value ΔKAF(n). That is, since the air-fuel ratio feedback control was not executed in the immediately preceding loop, the immediately preceding value KCMD(n−1) calculated in the immediately preceding loop does not exist, so that the immediately value ΔKAF(n−1) is set to the present value ΔKAF(n) at the step S213, followed by the program proceeding to a step S214.

At the step S214, a count value NITDC, referred to hereinafter, of a counter, not shown, for counting a thinning-out variable NI for thinning out TDC signal pulses is set to "0", and then the program proceeds to a step S215. The count value NITDC is counted to allow the air-fuel ratio KLAF to be updated whenever TDC signal pulses are generated in a number equal to the thinning-out variable NI set according to operating conditions of the engine.

Further, if it is determined at the step S212 that the flag FLAFFB was not equal to "0" in the immediately preceding loop, i.e. if the air-fuel ratio feedback control was carried out in the immediately preceding loop, the program jumps over to the step S215.

At the step S215, it is determined whether or not the count value NITDC is equal to "0". If NITDC=0, steps S216 to S224 are executed to determine the air-fuel ratio correction coefficient KLAF.

Figure 42:
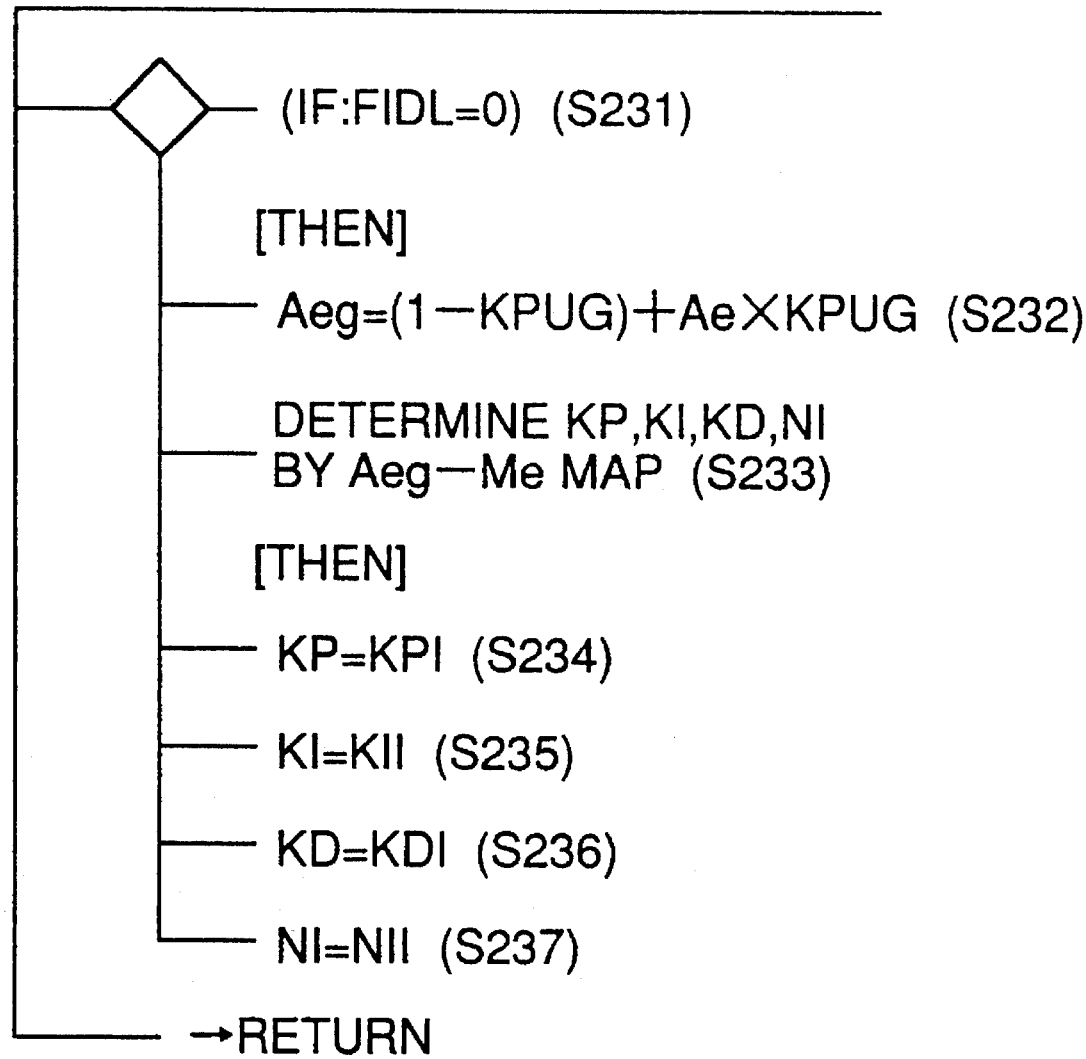
FIG. 42 shows a flowchart of a gain coefficient-determining routine.

That is, at a step S216, a gain coefficient-determining routine shown in FIG. 42 is executed to determine gain (rate of change) coefficients KP, KI and KD of the respective proportional term (P-term), integral term (I-term) and differential term (D-term) of the feedback control, and the aforementioned thinning-out variable NI.

More specifically, at a step S231 of the FIG. 42 routine, it is determined whether or not a flag FIDL is equal to "0". If FIDL=0, i.e. if the engine is idling, the program proceeds to a step S232, where an actual fuel supply ratio Aeg, which is the ratio of an amount of fuel actually supplied to the combustion chamber by injection and purging to a desired amount of fuel to be supplied to the combustion chamber:

$$Aeg = (1-KPUNG) + Ae \times KPUG \qquad (36)$$

where (1−KPUG) represents the ratio (contribution degree) of an amount of evaporative fuel (butane) to a total amount of the fuel components supplied to the combustion chamber, and Ae a ratio (contribution degree) of an amount of injected fuel (gasoline) to the total amount of the fuel components. The sum of these ratios provides the ratio of the fuel supply amount by injection and purging to the amount of fuel actually supplied to the combustion chamber during the present cycle, i.e. the actual fuel supply ratio Aeg.

Then, at a step S233, the gain coefficients KP, KI, KD and the thinning-out variable NI are determined by retrieving an Aeg-Me map.

The Aeg-Me map is set, e.g. as shown in FIG. 43, such that predetermined map values are provided in a manner corresponding to predetermined values Aeg0 to Aeg3 of the actual fuel supply ratio Aeg and predetermined values Me0 to Me2 of the reciprocal of the engine rotational speed Ne. The gain coefficients KP, KI, KD and the thinning-out variable NI are determined by retrieving the Aeg-Me map, and additionally by interpolation, if required.

Thus, the gain coefficients of the feedback control corresponding to the actual fuel supply ratio Aeg are calculated, whereby it becomes possible to control the air-fuel ratio to a desired value even if a large amount of evaporative fuel is supplied to the combustion chamber of the engine.

On the other hand, if it is determined at the step S231 that the flag FIDL is not equal to "0", i.e. if the engine is idling, gain coefficients KPI, KII and KDI, and the thinning-out variable NII suitable for idling are read out from the memory means, and set to the gain coefficients KP, KI, KD and the thinning-out variable NI, followed by the program returning to the FIG. 41 main routine.

Then, at steps S217 to S219 of the FIG. 41 main routine, the gain coefficients KP, KI and KD determined at the step S216 are used to calculate present values of the P-term (KLAFP), I-term (KLAFI) and D-term (KLAFD) of the air-fuel ratio correction coefficient KLAF by the use of Equations (37) to (39):

$$KLAFP(n) = \Delta KAF(n) \times KP \qquad (37)$$

$$KLAFFI(n) = \Delta KAF(n) \times KI + KLAF(n-1) \qquad (38)$$

$$KLAFD(n) = (\Delta KAF(n) - \Delta KAF(n-1)) \times KD \qquad (39)$$

At a step S220, limit check of the I-term KLAFI is carried out. More specifically, the value of the I-term KLAFI is compared with predetermined upper and lower limit values LAFIH and LAFFIL. If the KLAFI value is larger than the predetermined higher limit value LAFIH, the former is set to the latter, while the KLAFI value is smaller than the predetermined lower limit value LAFIL, the former is set to the latter.

At a step S221, the P-term KLAFP, the I-term KLAFI, and the D-term KLAFD are added together to calculate the air-fuel ratio correction coefficient KLAF, and then the count value NITDC is set to the thinning-out variable Ni obtained by the gain coefficient-determining routine of FIG. 42 at a step S222, and then the difference ΔKAF(n) calculated in the present loop is set to the immediately preceding value ΔKAF(n−1) at a step S223.

Then, at a step S224, similarly to the limit check of the I-term KLAFI at the step S220, limit check of the air-fuel ratio correction coefficient KLAF is carried out by comparing the calculated value thereof with predetermined upper and lower limit values, followed by terminating the program.

Further, it is determined at the step S215 that the count value NITDC is not equal to "0", the program proceeds to a step S225, where the count value NITDC is decreased by a decremental value of "1". Then, at steps S226 to S228, the present values of the P-term KLAFP, I-term KLAFI and D-term KLAFD are set to the respective immediately preceding values, and then the present value KLAF is set to the immediately preceding value at a step S229. Further, at a step S230, the present value of the difference ΔKLAF is set to the immediately preceding value of same, followed by terminating the program.

[III] Ignition timing control

As previously described, according to the prior art, the optimum ignition timing varies with the ratio of the amount of evaporative fuel to the total amount of fuel supplied to the engine, in other words, with the injection fuel ratio KPUG. Therefore, in the present embodiment, the ignition timing control is performed in a manner responsive to the injection fuel ratio KPUG.

Figure 44:
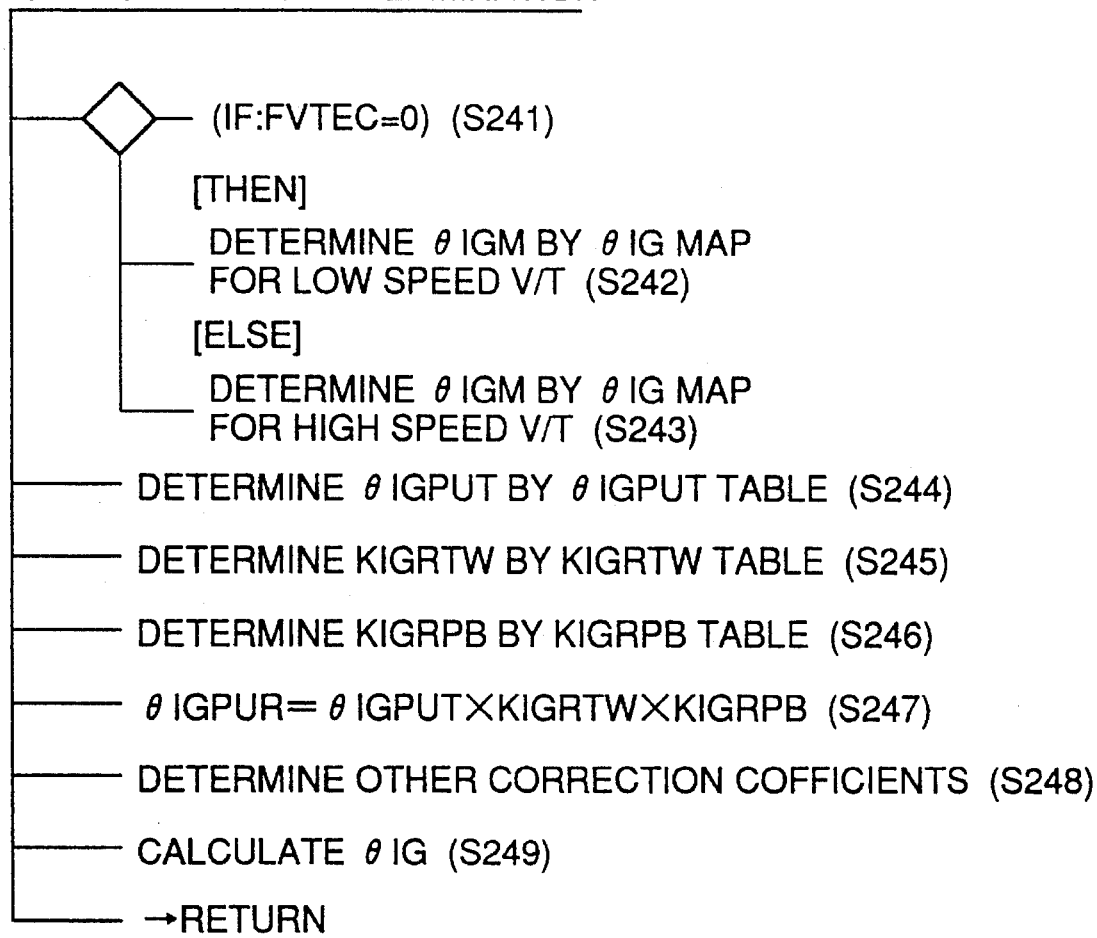
FIG. 44 shows a flowchart of an ignition timing-determining routine.

FIG. 44 shows an ignition timing-determining routine, which is executed in synchronism with generation of each TDC signal pulse.

First, it is determined at a step S191 whether or not the aforementioned flag FVTEC is equal to "0", i.e. whether the valve timing is set to the low speed V/T. If FVTEC=0, i.e. if the valve timing is selected to the low speed V/T, the program proceeds to a step S242, where a basic ignition timing θIGM suitable for the low speed V/T is determined by retrieving a θIG map suitable for the low speed V/T. On the other hand, if FVTEC="1", i.e. if the valve timing is selected to the high speed V/T, the program proceeds to a step S243, where a basic ignition timing θIGM suitable for the high speed V/T is determined by retrieving a θIG map suitable for the high speed V/T. The θIG map, which is stored in the ROM of the memory means 5c, consists of two maps, a θIGML map suitable for the low speed V/T and a θIIGMH map suitable for the high speed V/T, and the basic ignition timing θIGM is determined by retrieving the θIG map, and additionally by interpolation, if required.

Then, at a step S244, an injection fuel ratio-dependent correction coefficient θIGPUT is determined by retrieving a θIGPU table.

Figure 45:
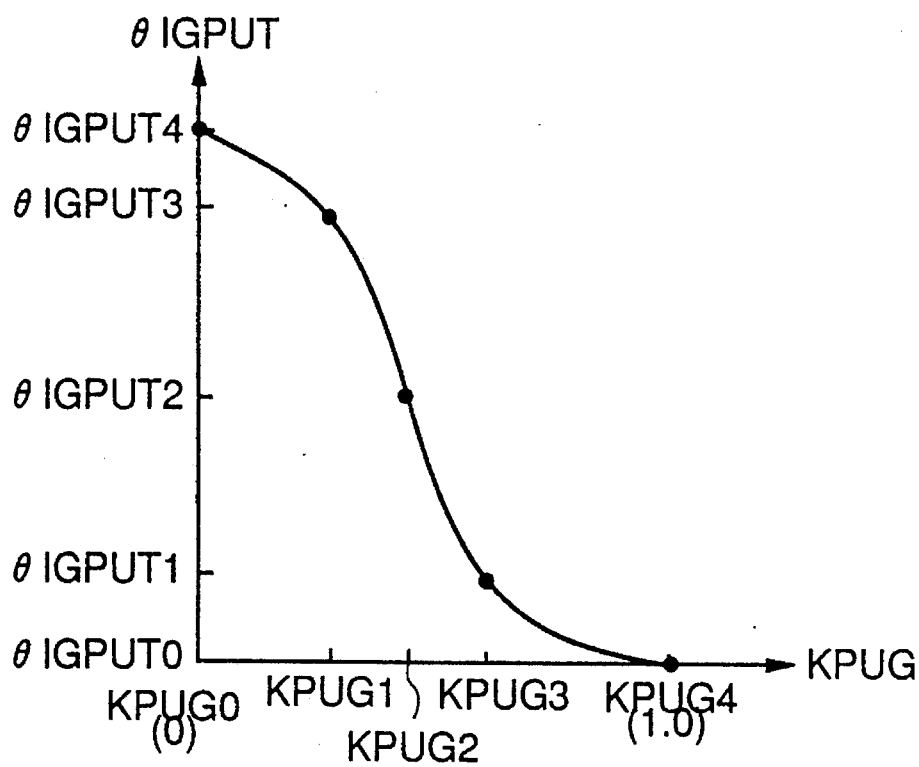
FIG. 45 shows a θIGPU table.

The θIGPU table is set, e.g. as shown in FIG. 45, such that table values θIGPUT0 to θIGPUT4 are provided in a manner corresponding to predetermined values KPUG0 to KPUG4 of the injected fuel ratio KPUG.

As is understood from FIG. 45, the θIGPU table is set such that the θIGPUT value assumes a smaller value as the injection fuel ratio KPUG increases. The injection fuel ratio-dependent correction coefficient θ IGPUT is determined by retrieving the θIGPU table, and additionally by interpolation, if required.

Thus, the ignition timing is corrected in a retarding direction to a larger degree by setting the correction coefficient θIGPUT to a larger value as the injected fuel ratio KPUG is smaller, i.e. as the evaporative fuel ratio is larger.

Then, at a step S245, an engine coolant temperature-dependent correction coefficient KIGRTW is determined by retrieving a KIGRTW table.

Figure 46:
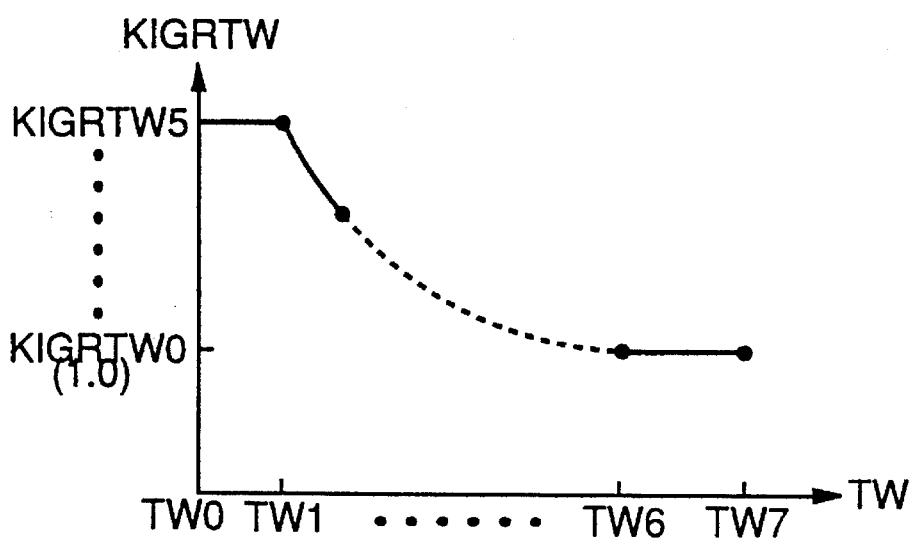
FIG. 46 shows a KIGRTW table.

The KIGRTW table is set, e.g. as shown in FIG. FIG. 46, such that table values KIGRTW0 to KIGRTW5 are provided in a manner corresponding to predetermined values TW0 to TW7 of the engine coolant temperature TW.

As is understood from FIG. 46, the KIGRTW table is set such that the correction coefficient KIGRTW is set to a smaller value as the engine coolant temperature TW is higher. The engine coolant temperature-dependent correction coefficient KIGRTW is determined by retrieving the KIGRTW table, and additionally by interpolation, if required.

Thus, the ignition timing is corrected in the retarding direction to a larger degree by setting the correction coefficient KIGRTW to a larger value as the engine coolant temperature TW is lower.

Then at a step S246, an intake pressure-dependent correction coefficient KIGRPB is determined by retrieving a KIGRPB table.

Figure 47:
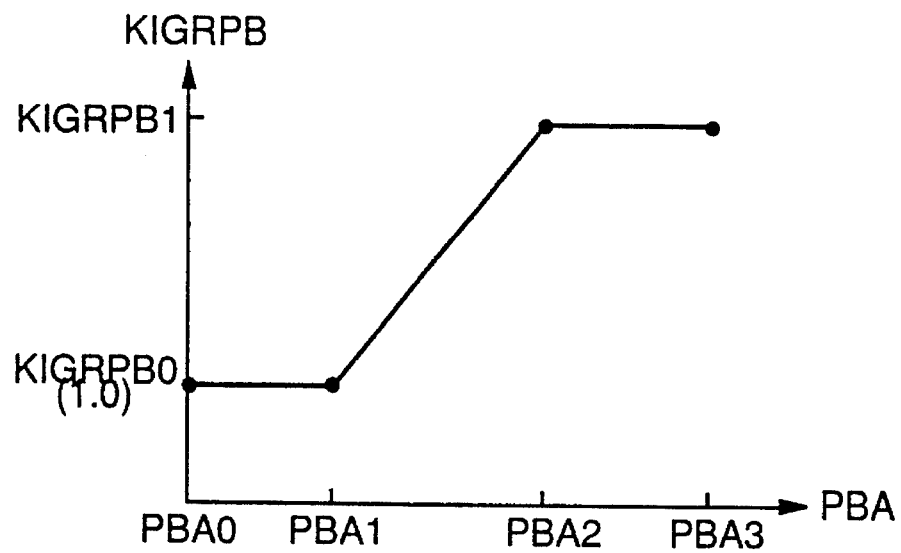
FIG. 47 shows a KIGRPB table.

The KIGRPB is set, e.g. as shown in FIG. 47, such that table values KIGRPB0 to KIGRPB1 are provided in a manner corresponding to predetermined values PBA0 to PBA3 of the intake pipe absolute pressure PBA. The intake pressure-dependent correction coefficient KIGRPB is determined by retrieving the KIGRPB table, and additionally by interpolation, if required.

At a step S247, the retarding correction coefficient θIGPUR is calculated by the use of Equation (37):

$$\theta IGPUR = \theta IGPUT \times KIGRTW \times KIGRPB \tag{37}$$

Then, at a step S248, other correction coefficients θIGCR such as an advancing correction coefficient are calculated, and then finally the ignition timing θIG is calculated by the use of Equation (38) at a step S249, followed by terminating the program:

$$\theta IG = \theta IGM + \theta IGCR - \theta IGPUR \tag{38}$$

Thus, the ignition timing is corrected in the retarding direction based on the injection fuel ratio KPUG and the engine coolant temperature TW, and spark ignition of the cylinders is effected at the corrected optimum ignition timing, which makes it possible to prevent degradation of exhaust emission characteristics and driveability of the engine even if a large amount of evaporative fuel is supplied to the combustion chamber of the engine 1.

Figure 48:
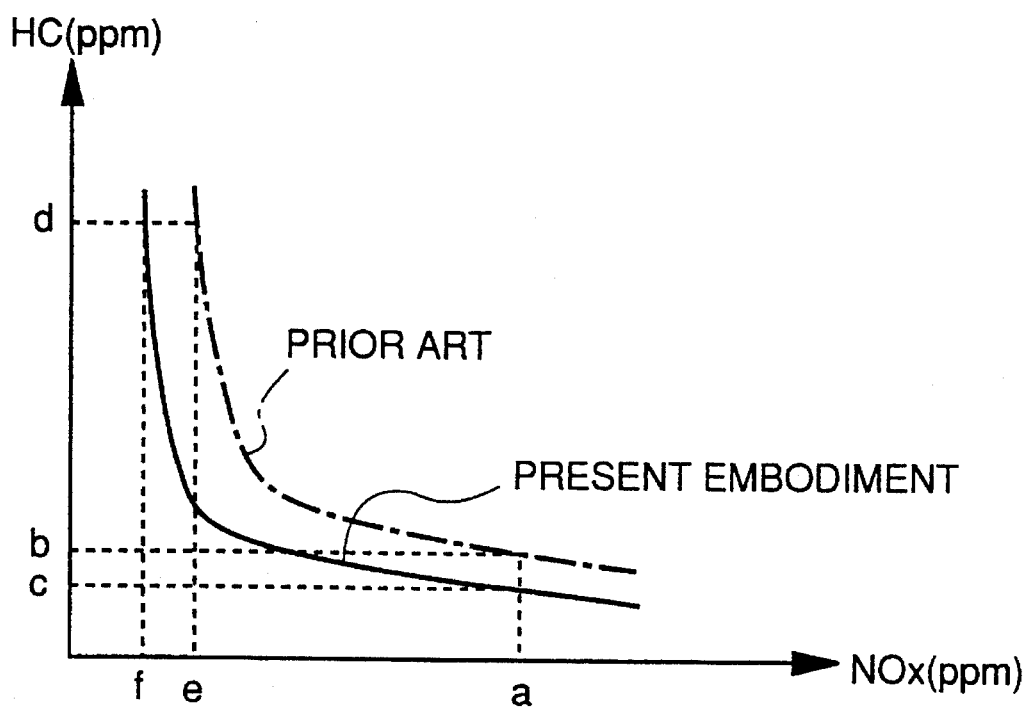
FIG. 48 is a diagram showing the exhaust emission characteristics exhibited by the embodiment in comparison with those of the prior art.

FIG. 48 shows an example of exhaust emission characteristics achieved by the present embodiment, plotted in comparison with those by the prior art.

As is clear from FIG. 48, the present embodiment can reduce the emission of HC to c ppm when the emission of NOx is a ppm, while the prior art emission of HC is b ppm under the same NOx emission condition. Further, the present embodiment can reduce the emission of NOx to f ppm when the emission of HC is d ppm, while the prior art emission of NOx is e ppm under the same HC emission condition. The present embodiment is thus advantageous in the emission characteristics over the prior art.

This invention is not limited to the embodiment described heretofore, but various modifications and variations thereto are possible without departing from the scope of the invention defined by the appended claims. For example, although in the above described embodiment, the correction coefficients θIGPUT, KIGRTW, KIGRPB, and θIGCR are commonly used for the low speed V/T and the high speed V/T, this is not limitative, but they may be separately determined depending on the selected one of the low speed V/T and the high speed V/T, if required.

What is claimed is:

1. A control system for an internal combustion engine having an intake passage having an inner wall surface, a fuel tank, at least one fuel injection valve, at least one combustion chamber, and an evaporative emission control system, said evaporative emission control system including a canister for adsorbing evaporative fuel generated from said fuel tank, a purging passage connecting between said intake passage and said canister, and a purge control valve for controlling a flow rate of a gas containing said evaporative fuel and purged through said purging passage into said intake passage, wherein said gas containing said evaporative fuel purged from said canister is supplied to said combustion chamber for combustion together with fuel injected by said fuel injection valve, the control system comprising:
 air-fuel ratio-detecting means for detecting an actual air-fuel ratio of an air-fuel mixture supplied to said engine;
 operating condition-detecting means for detecting operating conditions of said engine including at least the rotational speed of said engine and load on said engine;
 desired air-fuel ratio-calculating means for calculating a desired air-fuel ratio of said air-fuel mixture to be supplied to said engine based on results of detection by said operating condition-detecting means;
 correction coefficient-calculating means for calculating an air-fuel ratio correction coefficient for correcting said actual air-fuel ratio toward said desired air-fuel ratio in a feedback manner in response to said actual air-fuel ratio detected by said air-fuel ratio-detecting means;
 desired fuel supply amount-calculating means for calculating a desired amount of fuel to be supplied to said combustion chamber based on results of detection by said operating condition-detecting means; and
 actual fuel ratio-calculating means for calculating a ratio of an actual amount of fuel supplied to said combustion chamber to said desired amount of fuel to be supplied to said combustion chamber, by taking into account at least an amount of said evaporative fuel supplied to said combustion chamber;
 said correction coefficient-calculating means including change rate-setting means for setting a rate of change of said air-fuel ratio correction coefficient based on results of calculation of said actual fuel ratio-calculating means.

2. A control system according to claim 1, including injected fuel ratio-calculating means for calculating a ratio of an amount of fuel injected by said fuel injection valve, to a total amount of fuel supplied to said combustion chamber, carried-off fuel ratio-calculating means for calculating a ratio of an amount of fuel carried off from fuel adhering to said inner wall surface of said intake passage to a total amount of said fuel adhering to said inner wall surface, and wherein said actual fuel ratio-calculating means calculates said actual fuel ratio based on said ratio of said injected fuel and said ratio of said amount of said carried-off fuel.

3. A control system according to claim 2, including total fuel amount-calculating means for calculating a total amount of fuel to be supplied to said combustion chamber based on results of detection by said operating condition-detecting means, evaporative fuel amount-calculating means for calculating an amount of evaporative fuel drawn into said combustion chamber, and required fuel amount-determining means for determining an amount of fuel required to be injected by said fuel injection valve, based on results of calculation by said evaporative fuel amount-calculating means, and wherein said injected fuel ratio-calculating means calculates said ratio of injected fuel based on results of calculation by said total fuel amount-calculating means and results of determination by said required final amount-determining means.

4. A control system according to any of claims 1 to 3, wherein said evaporative emission control system includes a flowmeter arranged in said purging passage, and wherein said amount of evaporative fuel supplied to said combustion chamber is determined at least based on an output from said flowmeter.

5. A control system according to claim 1
 further comprising:
 injected fuel ratio-calculating means for calculating a ratio of an amount of fuel to be injected by said fuel injection valve to a total amount of fuel to be supplied to said combustion chamber;
 said operating condition-detecting means detecting operating conditions of said engine including an engine coolant temperature; and
 ignition timing-controlling means for controlling ignition timing of said engine based on results of calculation by said injected fuel ratio-calculating means and results of detection by said operating condition-detecting means.

6. A control system according to claim 5, wherein
 the control system further includes total fuel amount-calculating means for calculating a total amount of fuel to be supplied to said combustion chamber, based on results of detection by said operating condition-detecting means, evaporative fuel amount-calculating means for calculating an amount of evaporative fuel drawn into said combustion chamber, and required fuel amount-calculating means for calculating an amount of fuel to be injected by said fuel injection valve, based on results of calculation by said evaporative fuel amount-calculating means,
 said injected fuel ratio-calculating means calculating said ratio of said amount of fuel to be injected by said fuel injection valve to said total amount of fuel to be supplied to said combustion chamber, based on results of calculation by said total fuel amount-calculating means and results of calculation by said required fuel amount-calculating means.

7. A control system according to claim 5 or 6, wherein said evaporative emission control system includes a flowmeter arranged in said purging passage, said injected fuel ratio-calculating means calculating said ratio of said amount of fuel to be injected by said fuel injection valve to said total amount of fuel to be supplied to said combustion chamber, at least based on an output from said flowmeter.

* * * * *